United States Patent [19]

Hayden et al.

[11] Patent Number: 4,953,159
[45] Date of Patent: Aug. 28, 1990

[54] AUDIOGRAPHICS CONFERENCING ARRANGEMENT

[75] Inventors: Charles C. Hayden, Fair Haven; Frederick A. Schmidt, Middletown; Mark D. Studebaker, Red Bank, all of N.J.

[73] Assignee: American Telephone and Telegraph Company, Murray Hill, N.J.

[21] Appl. No.: 293,028

[22] Filed: Jan. 3, 1989

[51] Int. Cl.[5] .............................. H04Q 11/04
[52] U.S. Cl. ...................... 370/62; 379/204; 379/53; 370/67; 370/85.1
[58] Field of Search .................. 370/62, 66, 67, 85.1, 370/85.7, 95.1; 379/53, 54, 202, 204, 205

[56] References Cited

U.S. PATENT DOCUMENTS

| 3,370,127 | 2/1968 | Courtney . | |
|---|---|---|---|
| 3,912,874 | 10/1975 | Botterell et al. | 179/18 |
| 4,115,849 | 9/1978 | Johnson et al. | 340/147 |
| 4,475,189 | 10/1984 | Herr et al. | 370/62 |
| 4,507,781 | 3/1985 | Alvarez, III et al. | 370/104 |
| 4,550,224 | 10/1985 | Winchell | 370/62 |
| 4,653,045 | 3/1987 | Stanley et al. | 370/62 |
| 4,734,907 | 3/1988 | Turner | 370/60 |
| 4,736,407 | 4/1988 | Dumas | 379/96 |

OTHER PUBLICATIONS

"Information Week", Mar. 31, 1986, Northern Telecom Releases Teleconferencing Program, D. ben–Aaron, p. 22.

Brochure of Northern Telecom, "Meeting Communication Services on the Meridian DV-1", Copyright 1986 Northern Telecom.

Primary Examiner—Douglas W. Olms
Assistant Examiner—Wellington Chin
Attorney, Agent, or Firm—Frederick B. Luludis

[57] ABSTRACT

An audiographics conferencing arrangement for use in a business communication system allows the conferees to exchange displayed text and/or graphics stored locally in their respective data terminals. The conferees may change the displayed text and/or graphics and such changes are automatically distributed to the other data terminals so that all of the conferees view the same information. Moreover, a data terminal and its associated telephone station set may be included in an audiographics conference connection even though they are not directly served by the business communication system. In addition, one of the conferees may establish concurrent with the original audiographics conference connection a second audiographics conference connection with one or more other data terminals and transfer information obtained from one conference connection to the other conference connection.

39 Claims, 37 Drawing Sheets

FIG. 20

ROUTING TABLE

| TYPE | PORT (a) | CH.NO. (b) | PORT (c) | CH.NO. (d) | PORT | CH.NO. (e,f) | ... | PORT | CH.NO. |
|------|------|--------|------|--------|------|--------|-----|------|--------|
| CNF. | 2 | 1 | 3 | 2 | 4 | 1 | ... | | |
| STAT | 2 | 2 | 3 | 3 | 4 | 2 | ... | | |
| CTL. | 2 | 3 | | | | | ... | | |
| COMM.| 2 | 4 | | | | | | | |
| CNF. | 3 | 2 | 2 | 1 | 4 | 1 | ... | | |
| STAT | 3 | 3 | 2 | 2 | 4 | 2 | ... | | |
| CNF. | 4 | 1 | 2 | 1 | 3 | 2 | ... | | |
| STAT | 4 | 2 | 2 | 2 | 3 | 3 | ... | | |
| ... | | | ... | | | ... | | ... | ... |
| CNF. | 2 | 5 | 5 | 4 | | | | | |
| STAT | 2 | 6 | 5 | 5 | | | | | |
| CTL. | 2 | 7 | | | ... | | | ... | ... |
| ... | | | | | | | | | |
| CNF. | 5 | 4 | 2 | 6 | | | | | |
| STAT | 5 | 5 | 2 | 7 | | | | | |
| ... | | | ... | | | | | ... | ... |

(x marks CNF./STAT group at port 4; y marks CNF./STAT/CTL. group at port 2)

AUDIOGRAPHICS CONFERENCING ARRANGEMENT

TECHNICAL FIELD

The invention relates to business communication systems and more particularly to an audiographics conferencing arrangement for use in such systems.

BACKGROUND OF THE INVENTION

Business communication systems presently have the capability to establish a so-called audiographics conference call among a plurality of telephone station sets and associated display terminals. In such arrangements, the voice connections are established in conventional fashion. The data connections are established, on the other hand, by having each participant "log into" a central computer. Thereafter, the conferees may each view on the display of their respective display terminals a document stored in the central computer. If one of the conferees edits the document by making changes thereto, then the central computer distributes such changes to the other conferenced display terminals.

One limitation of such prior conferencing arrangements is that the distribution of data is controlled by a central resource, rather then by the conferenced terminals. As such, no facility is provided to allow one of the conferees to bring up on the display of his/her terminal a document stored in the conferee's terminal, and share that document with the other conferees.

Another limitation of such prior conferencing arrangements is their inability to include in a conference connection display terminals which they do not directly serve. What this means is that a prospective conferee not directly served by such prior business communication systems may only participate in the audio portion of the conference connection. As such, that conferee cannot view the document displayed on the display terminals of the other conferees, even though the conferee may have the facility to do so, i.e. a display terminal.

The aforementioned limitations are particularly noticeable whenever the conferees require additional information not in their possession. In such an instance, the originator of the conference session using so-called softkeys displayed on the screen of his/her terminal may place a telephone call to the person having the information. If that person is directly served by the respective business communication system, then the originator may add that person's station set and display terminal to the conference connection. As such, the newly added conferee may bring up a centrally stored document on his/her display terminal, and edit the document to include the sought-after information for distribution to the other conferees. If, on the other hand, the person having the sought-after information is not directly served by the communication system, but may be connected thereto via, for example, the public switched network, then the originator can only add that person's station set to the conference connection. As such, the conferees obtain a verbal account of the sought-after information, rather than receiving a copy thereof for display on their respective terminals.

A further limitation occurs in the instance where it may not be desirable to add a person to an established conference connection to obtain sought-after information. To avoid adding such a person to an established conference connection, prior conferencing arrangements require one of the conferees, preferably the originator, to place his/her conference connection on hold, and then establish a telephone call to the telephone station set of the person having the sought-after information. Upon obtaining a verbal account of the sought-information, the originator must then terminate the telephone call and remove the hold condition. Thereafter, the originator may verbally share the sought-after information with the other conferees. A better approach would be one which allows the originator to establish a second conference connection to obtain a so-called hard copy of the sought-after information for storage in the originator's terminal and distribution to the other conferees.

SUMMARY OF THE INVENTION

The limitations associated with prior audiographics conferencing arrangements are obviated by providing a conferencing arrangement in which, in accordance with an aspect of the invention, a file (e.g., document, graphics, etc.) which is stored in a conferee's data terminal and which the conferee brings up on the display of the data terminal is automatically distributed to the other conferees for display on their data terminals. Accordingly, the conferees view the same file and operate on that file, rather than one centrally stored in the business communication system. In addition, in accordance with an aspect of the invention, if any one of the conferees changes (edits) a displayed file, then such changes are automatically distributed to the other conferees so that the information displayed on those data terminals may be updated in accord with such changes.

In accordance with a further aspect of the invention, one or more of the conferenced data terminals and their associated telephone station sets may be ones not directly served by the communication system, but which can be connected to the latter via, for example, the public switched network.

In accordance with still a further aspect of the invention, the conferee which originates the audiographics connection may establish a second audiographics conference connection with other data terminals and their associated station sets. As such, the originating conferee is simultaneously connected to two independent conference connections. In addition, as an aspect of the invention, the originating conferee may transfer information obtained from one conference connection to the other conference connection, and vice-versa.

BRIEF DESCRIPTION OF THE DRAWING

In the drawing:

FIG. 20 illustrates the layout of a routing table used in the routing of data packets;

GENERAL DESCRIPTION

Figure 1:
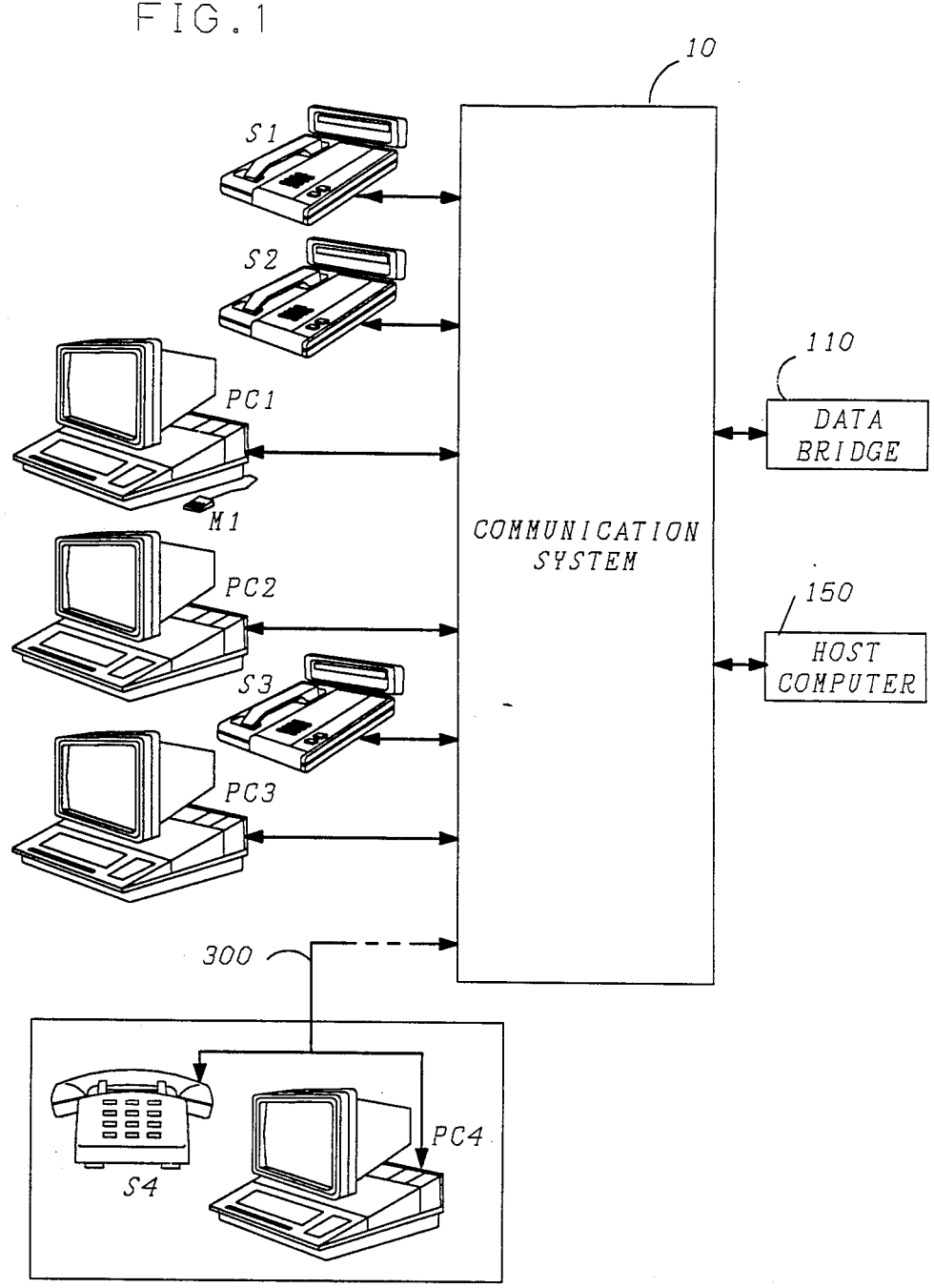
FIG. 1 is a simplified block diagram of a business communication system in which the present invention is illustratively implemented.

FIG. 1 shows a broad block diagram of business communication system 10 which serves a plurality of telephone station sets and data terminals. Such data terminal may be, for example, personal computers as shown in the FIG. A detailed discussion of communication system 10 is provided below. However, it suffices to say at this point that communication system 10 is a so-called digital private branch exchange adapted to establish a "telephone" connection between two or more of the station sets it serves, such as station sets S1 and S2, and to establish a connection between a number of personal computers, such as PC1 and PC3. (In the following discussion it is assumed that PC1 is associated with station set S1, PC2 is associated with station set S2, and so on).

Connected to system 10 is data bridge 110 which can be, for example, a computer, such as the AT&T Model 3B2 computer. Data bridge 110 is used, in accordance with an aspect of the invention, to interface the originator of an audiographics conference connection with communication system 10, in the manner discussed below in detail. Data bridge 110 is also used to provide a digital link (conference connection) among a plurality of digital devices, e.g., PCs, at the direction of the originator. The station sets associated with such conferenced PCs are, on the other hand, linked, or conferenced together via particular circuitry contained in communication system 10. Once an audiographics conference connection is established, the PCs may then exchange text and/or graphics for display on their respective screens.

In particular, a user positioned at a PC, for example, PC1, desiring to establish an audiographics conference connection among a plurality of station sets and associated PCs may do so by executing conferencing software in PC1 using a keyboard K1 or mouse M1 associated with PC1. (It will be assumed herein that the conference connection will include station sets S2 and S4 as well as their associated PCs.) The conferencing software presents a widowing interface to the user whereby various tasks that need to be performed to establish an audiographics conference connection are displayed as separate screen areas called windows, as will be shown below in detail. One such window is a so-called conferee window which is displayed when the user executes the aforementioned software. The user, or originator, using keyboard K1 enters in respective fields of the conferee window the (a) telephone number associated with a so-called hunt group of data bridge 110 RS-232C port circuits, (b) telephone numbers associated with station sets S1, S2 and S4, (c) telephone numbers associated with personal computers PC1, PC2 and PC4, and (d) names of the conferees positioned at those PCs.

When the fields have been filled in, PC1 then displays a request for the user to enter the telephone number associated with a data bridge 110 control port. When the user at PC1 does so, PC1 sends to system 10 the number that the user has entered. Communication system 10, in turn, establishes a telephone connection between PC1 and the data bridge 110 control port. When Data bridge 110 answers the call, it exchanges a so-called initialization sequence with PC1, in which data bridge 110, in accordance with an aspect of the invention, assigns to PC1 a number of logical data channels each multiplexed over the connection established by communication system 10. The channels assigned to PC1 are a (a) conference channel for transmitting text and/or graphics, (b) control channel for transmitting control messages, (c) status channel for transmitting the status of the audiographics conference connection, and (d) communication channel for exchanging messages with data bridge 110.

As will be discussed below, conference and status channels are also assigned to PC2 and PC4 when they are added to the audiographics conference connection. Thus, in accordance with an aspect of the invention, the conferenced PCs exchange text and/or graphics over their respective conference channels and exchange status information over their respective status channels via data bridge 110. As such, it is the conferenced PCs which control the distribution of data, rather than a centralized facility, as it is done in prior arrangements.

Continuing, PC1 responsive to being assigned conference and control channels displays a so-called status/control window containing the names priorly inputted by the user at PC1. The status/control window also displays a station set icon and PC terminal icon for each displayed name. At this point, the originator may establish the audiographics conference connection by pointing a screen cursor, for example, the screen mouse cursor, to the station set icon representing station S1, and then operating the so-called mouse control button. The user then points the mouse cursor to a field representing a call function and again operates the mouse control button. PC1 responsive thereto sends to communication system 10 via data bridge 110 and in the control channel assigned to PC1 the telephone numbers associated with those station sets. Communication system 10, in turn, establishes a voice connection between stations S1 and S2. The user at PC1 then causes station S4 to be conferenced with stations S1 and S2, in a similar manner. Completing that task, the user at PC1 may then establish a data conference connection among PC1, PC2 and PC4.

Briefly, the user establishes a data conference connection by pointing the screen mouse cursor to the displayed terminal icon representing PC2 and operating the mouse control button. When the user does so, PC1 directs system 10 via the aforementioned path to establish a connection between a data bridge 110 hunt group port circuit and PC2. When the connection is established data bridge 110 and PC2 perform the aforementioned initialization sequence, in which status and conference channels are assigned to PC2. After PC2 has been connected to data bridge 110, PC1 transmits to PC2 via data bridge 110 and in the status channel assigned to PC1 information indicative of the status of the connection, i.e., the names of the conferees and the status of their respective station sets and PCs.

Once the user at PC1 is satisfied that PC2 is linked with PC1 via data bridge 110, the user may then direct communication system 10 to establish a connection between PC4 and data bridge 110. It is noted that unlike prior arrangements, PC4 may be included in the conference connection even though it is not directly served by communication system 10. Accordingly, the user at PC1 causes PC4 to be connected to data bridge 110 similar to way PC2 was connected to data bridge 110. As will be discussed below, the connection between PC4 and data bridge includes outside telephone line 300 and a path through the public switched network.

Once the audiographics conference connection is established, the conferees may then exchange text and/or graphics via their respective PCs and assigned conference channels, as mentioned above. For example, if the user, or conferee at PC2 displays text and/or graphics stored in the memory of PC2, then such text and/or graphics is automatically transmitted to the other conferees for display on their respective PCs, the transmission being via the PC2 conference channel and data bridge 110. If, thereafter, one of the conferees changes (edits) the displayed text and/or graphics, then such changes are automatically transmitted to the other conferees for display on their respective PCs. Thus, in accordance with an aspect of the invention, each conferee views the same text and/or graphics and any changes made thereto by any one of the conferees.

As an aspect of the invention, the originator (the user positioned at PC1) may establish a second audiographics connection independent of the original audiographics conference connection. As will be seen below, the user establishes the second connection similar to the way the aforementioned audiographics conference connection was established. In particular, the user at PC1 establishes the second, or subconference connection by first entering in PC1 a predetermined request. PC1 responsive thereto initiates the aforementioned initialization sequence with data bridge 110. As a result of this initialization sequence, data bridge 110 assigns to PC1 conference and status channels that will be use in conjunction with the subconference audiographics connection. In addition, PC1 displays a second conferree window having a number of fields for entering the names of the persons that will be involved in the subconference connection as well as their associated telephone numbers.

After the user at PC1 has entered the requested information, PC1 displays a second control/status window displaying the names that the user has entered and displaying icons representing the station sets and PCs to be connected. The user establishes the audio portion of the connection similar to the way the audio portion of the original conference connection was established, i.e., by pointing the mouse cursor to the mouse cursor to the icons representing the station sets that are to be connected together, respectively. Similarly, PC1 responsive thereto sends to system 10 via the PC1 control channel and data bridge 110 the telephone numbers associated with stations S1 and S3, thereby causing a telephone connection to be established between those station sets. The user then establishes the graphics, or data portion of the connection by pointing the mouse cursor to the icon associated with PC3 and operating the mouse control button. As before, PC1 sends to system 10 via the PC1 control channel and data bridge 110 an instruction requesting a connection between PC3 and data bridge 110. As will be explained below, when PC3 is connected to data bridge 110 the latter has no way of knowing whether to link PC3 with the connection involving PC1, PC2 and PC4 or to create a second link between PC1 and PC3 only. This problem is handled, in accordance with an aspect of the invention, by arranging PC1 so that it instructs data bridge 110 via the PC1 communication channel to establish a independent link between PC1 and PC3.

Once the subconference connection has been established, the users at PC1 and PC3 may then exchange text and/or graphics via their respective conference channels and data bridge 110. In addition, the user at PC1 may cause the text and/or graphic received from PC3 to be distributed to PC2 and PC4 via data bridge 110, as will be explained below in detail. Thus, in accordance with an aspect of the invention, information associated with one audiographics connection may transferred to a second or different audiographics connection. (As will be discussed below, the second connection could have involved host computer 150 rather than PC3.)

Thereafter, the user at PC1 may terminate the subconference connection by sending to system 10 instructions to do so, as will be explained below. The user may then terminate the original audiographics conference connection in a similar fashion.

DETAILED DESCRIPTION

Figure 2:
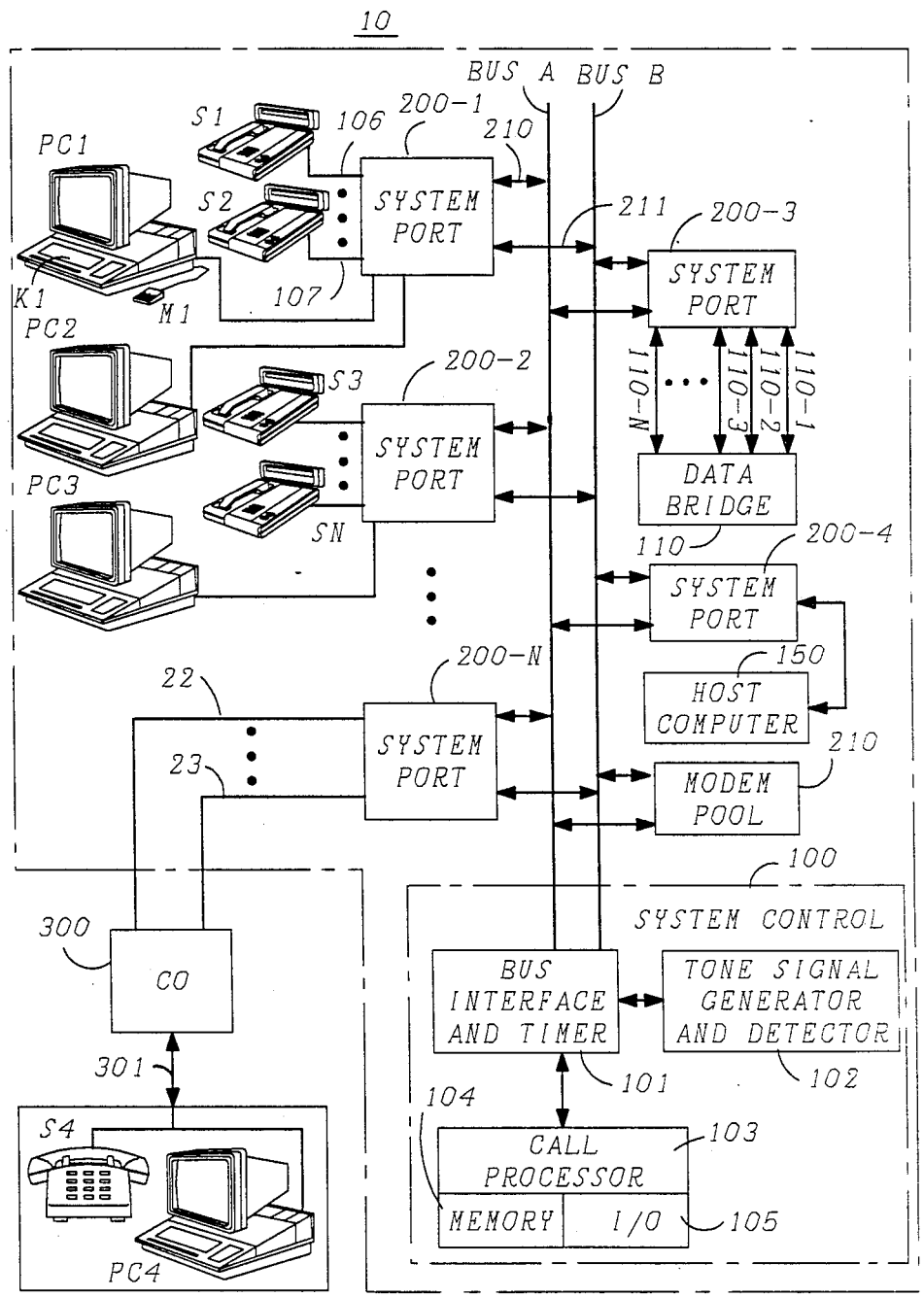
FIG. 2 is a more detailed block diagram of the business communication system depicted in FIG. 1.

FIG. 2 shows a more detailed block diagram of business customer communication system 10, which combines the usual features with the present invention. Specifically, control of system 10 is distributed among a plurality of system ports 200-1 through 200-N, with each system port, such as system port 200-1, serving a number of facilities, such as telephone station sets S1 and S2. It is seen from FIG. 2, that a system port may also serve other facilities, such as PCs, data bridge 110, host computer 150, etc. The system ports, in turn, are served by a digital bus system having time division multiplexed buses A and B and a common system control 100. Common system control 100 includes, inter alia, bus interface and timer 101, call processor 103, tone signal generator and detector 102, and I/O control 105. Call processor 103 operates to take in stimuli from various system facilities, such as station sets and CO lines, via their respective port circuits and to establish a connection between the facilities, as discussed below. System bus A and bus B are time division multiplexed busses, each having illustratively 256 time slots. Interface 101 is used to interface processor 103 with system bus A and B. Tone signal generator and detector 102 circuit generates digital versions of the various call progress tones and digit tones that are used within the system of FIG. 2, such digit tones being converted to analog tones before they are supplied to a station set or CO line. One such arrangement for generating and distributing such tones within a communication system of the type shown in FIG. 1 is disclosed in U.S. Pat. No. 4,535,454 issued Aug. 13, 1985 to C. A. Buzzard et al, which is hereby incorporated by reference.

Associated with call processor 103 is memory 104, which is used to store, inter alia, the program which directs the operation of the system. Memory 104 is also used to store records associated with respective system facilities. Stimuli, such as telephone digits received from a facility, such as, for example, station set S1, are stored in its respective record. The record is used by processor 103, operating in conjunction with the stored program, to track the functional status of the respective facility upon receiving a new stimuli therefrom.

A call connection between various facilities, such as station sets, a station set and a CO line, or personal computers (PCs) is established in the system by call processor 103 in response to receiving a stimuli from the facility which originates the call, the stimuli being, for example, an off-hook signal in the instance where the facility is a station set followed by the telephone number of the called station.

Specifically, when a calling station goes off-hook the associated system port forms a message noting the identity of the calling station and the fact that the station has gone off-hook. The system port then passes the message to processor 103 via either system bus A or B. Thereafter, the system port passes to processor 103 the digits of the telephone number that it receives from the calling station. Processor 103 upon receiving the last of the telephone digits establishes a connection between the calling station and called station by assigning a system bus time slot to each station. The addresses of the two time slots are then supplied to the system port associated with each station. Thereafter, each system port transfers signals (messages) that it receives from its associated station to the system bus during the time slot assigned to the station and passes to its associated station signals received from the system bus during the time slot assigned to the other station. The manner in which a system port operates to control the movement of digital messages on and off the system bus is discussed in U.S. Pat. No. 4,389,720 issued Jun. 21, 1983 to L. A. Baxter et al, which is hereby incorporated by reference. The manner in which a system port exchanges messages with processor 103 is discussed in U.S. Pat. No. 4,511,969 issued Apr. 16, 1985 to M. J. Koenig et al, which is hereby incorporated by reference.

A call connection may also be established using the well-known technique commonly referred to as third-party call control. In essence, third-party call control causes a call connection to be established between two or more facilities, such as stations S1 and S2, under the direction of a third party. A well-known example of third-party call control is the process in which a call connection is established between two or more parties at the direction of a telephone operator.

Another example of establishing a third-party call control connection entails sending to call processor 103 a message identifying the stations to be connected, i.e., their respective telephone numbers, with a request to establish a connection between the stations. The originator of the call sends the message to processor 103 via a link commonly referred to as a third-party call control link. Processor 103 responsive to receipt of the message causes an alerting signal to be sent to the first station identified in the message via a system bus time slot assigned to that station. The alerting signal, in turn, causes a so-called "call appearance" lamp to be illuminated. When the station goes off-hook its associated system port circuit notifies processor 103 of that fact. Processor 103 responsive thereto then causes the alerting signal to be directed to the second station identified in the message via a system bus time slot assigned to the second station. The call connection is completed when the second station goes off-hook.

Continuing with FIG. 2, data bridge 110, is used, in accordance with an aspect of the invention, to establish an audiographics teleconference connection among a plurality of, digital devices, e.g, PCs, and associated station sets at the direction of one of the PCs. The data portion of the conference connection is established by "bridging" the PCs together via data bridge 110. The associated station sets, on the other hand, do not connect to data bridge 110 but are conferenced together in the manner discussed in the aforementioned Baxter et al patent.

In particular, data bridge 110 includes a plurality of RS-232C port circuits (not shown) which connect to system bus A and B via respective bidirectional communications paths 110-1 through 110-N and system port 200-3. A connection may be established between a PC, such as, for example PC1, and a data bridge 110 RS-232C port by "dialing" the telephone number of the respective RS-232C port. Processor 103 responsive to receipt of the telephone number establishes the connection in the manner discussed above. In addition, a conference connection may be established among a plurality of PCs by merely connecting each PC to a respective data bridge 110 RS-232C port. Thereafter, data bridge 110 responsive to receipt of data via one of the conferenced RS-232C ports broadcasts (multiplexes) the data to the other conferenced RS-232C ports, as will be discussed in detail below. (Hereinafter, the RS-232C port circuits will be referred to by the designation of their respective bidirectional communication paths 110-1 through 110-N).

One of the data bridge 110 RS-232C ports circuits, namely RS-232C port 110-1, is used as a third-party call control link for communicating with call processor 103 via a dedicated system bus A or B time slot. At least another one of the data bridge 110 RS-232C port circuits, namely RS-232C port 110-2, is reserved as a control port for establishing an audiographics conference connection. As will be discussed below in detail, a user positioned at a PC, such as, for example, PC1, and desiring to establish an audiographics conference connection dials the telephone number assigned to RS-232C port 110-2. Processor 103 responsive thereto establishes a connection between PC1 and RS-232C port 110-2. Data bridge 110, responsive to the connection, exchanges a sequence of initialization messages with PC1. As a result of the initialization sequence, data bridge 110 assigns to PC1 the aforementioned logical channels.

(It is to be understood by the art that multiple conference connections involving different parties may be established by replacing RS-232C port 110-2 with a hunt group of such ports. Thus, a PC which originates a conference connection would then be connected to an idle RS-232C port of the hunt group, rather than to RS-232C port 110-2.)

It is noted that hereinafter, an RS-232C port, such as RS-232C port 110-2, may be alternatively referred to as just port 110-2.

With the foregoing in mind, we turn now to a detailed discussion of establishing an audiographics conference connection.

Specifically, a user positioned at a PC, for example, PC1, and desiring to establish an audiographics teleconferencing connection with, for example, PC2 and PC4.

Figure 3:
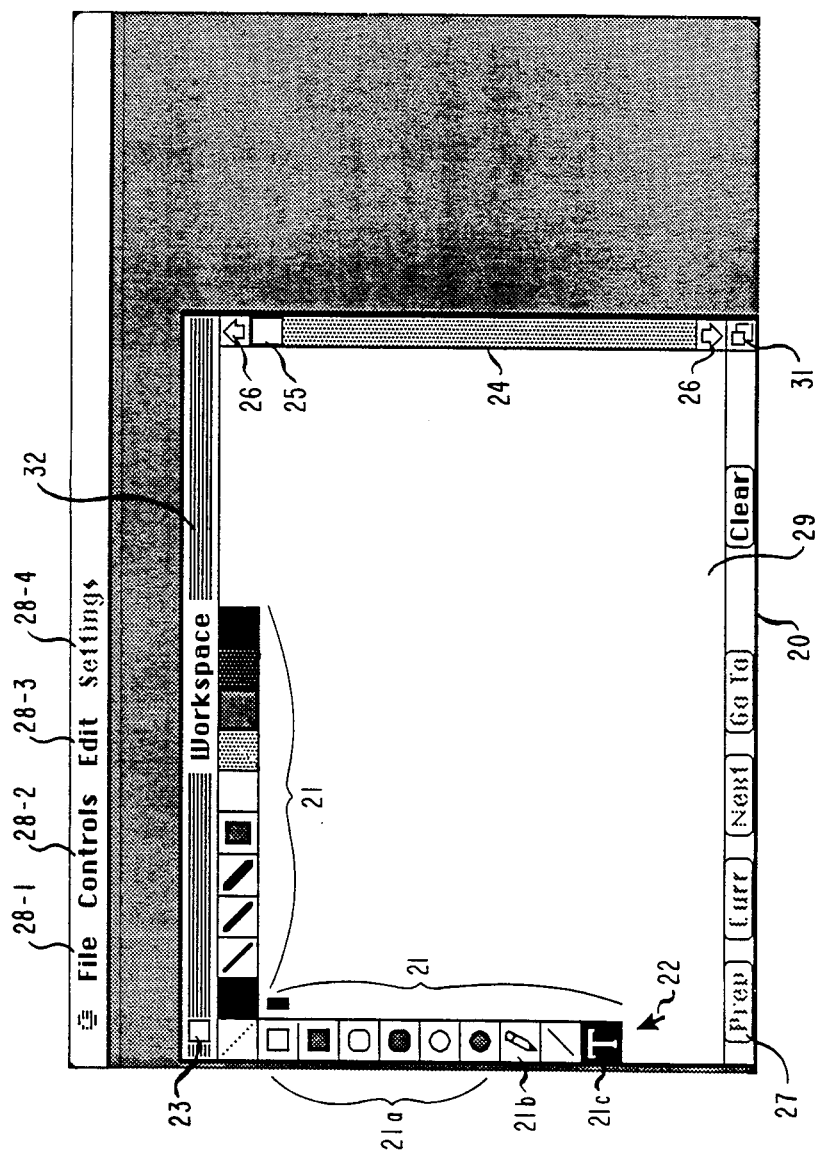
FIGS. 3–18 show various "windows" displayed by the personal computers of FIGS. 1 and 2 as their operations proceed in accordance with the invention.

Referring, then, to FIG. 3, there is shown a so-called workspace window 20 that is displayed on the display of PC1 after PC1 has been turned on and has performed some initial tasks, including the "booting" of the operating system from a so-called hard disk contained within PC1 and the user has executed the conference software via a keyboard K1 or mouse M1 associated with PC1.

The workspace window 20 displays, inter alia, various icons and function keys. A user may enter notes and/or graphics in the active, or content area 29 of window 20 using the PC keyboard and drawing icons collectively designated 21, respectively. The manner in which icons 21 are used to "draw" an image on the display of a PC is well known and will not be discussed herein. Box icon 23 is used to close or erase window 20. Slide bar icon 24 and icon 25 are used to scroll through a page of a file by an amount equal to the content area 29 when the page is too large to be displayed therein at one time. Icon 26 is use to scroll through a file line by line and icon 31 is used to increase or decrease the area (size) of window 20.

The file control keys labeled "Prey", "Curr", "Next" and "Go To" and collectively designated 27 may be used to display the previous, current, next or specified page of a file displayed in content area 29. The file control key labeled "Clear" erases whatever is displayed in content area 29.

The screen display also includes four pull-down menus 28-1 through 28-4 which are always displayed at the top of the screen during a conference session. The "file" menu 28-1 displays a menu of file related actions, which may be selected by the user, as discussed below. The "Edit" menu 28-3 displays a menu of well-known file editing commands such as, for example, cut, paste, copy, etc. The "Settings" menu 28-4 displays a menu of data transmission parameters, such a baud rate, parity, etc., which the user may set by highlighting the desired parameter and entering its value. The "Controls" menu 28-2, which is the key that the present invention is most closely associated with, displays a menu of conference commands, as will be shown below.

Thus, the user is provided with a number of capabilities with respect to whatever window is currently being displayed and worked with. For example, the user may activate a particular icon, menu or object by merely causing it to be highlighted. The highlighting may be controlled via movement of mouse M1 (FIG. 2) in such a way that its associated screen cursor 22 points to the icon, menu or object in question and operating a mouse control button (not shown) associated with mouse M1. It is assumed at this point that the user has moved mouse cursor 22 to the Controls menu 28-2 and has operated the mouse control button in order to display the Controls menu 35 as shown in FIG. 4.

(Hereinafter, the term "points to" and the variants of that term is meant to include other terms that are understood by the art and which define similar functions. For example, it is to mean highlighting a displayed icon, object or command by moving the mouse cursor to the icon or command and operating the mouse control key, or even as one would point to a displayed icon, object or command using the PC keyboard buttons.)

Figure 4:
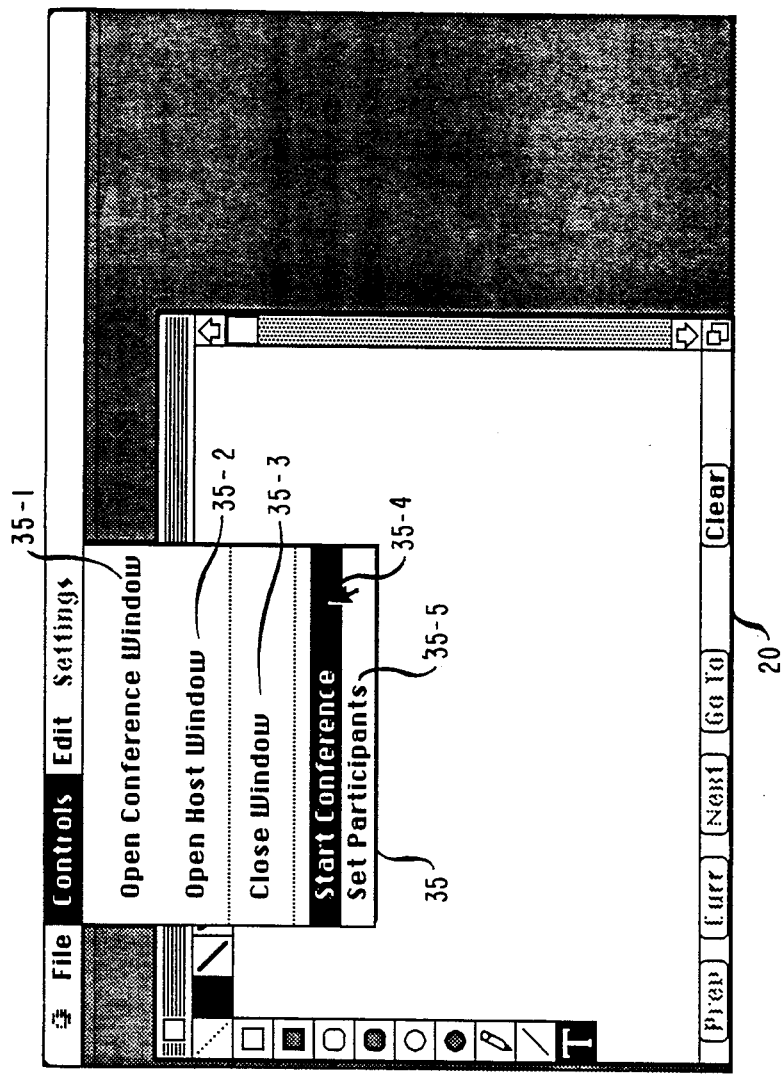

Menu 35 shown in FIG. 4 presents the user with illustratively five conference commands, or objects. The object Open Conference Window 35-1 is used to establish, in accordance with an aspect of the invention, a second audiographics conference connection after the original audiographics conference connection has been established, as will be discussed below in detail. The object Open Host Window 35-2 is used to bring up a so-called host window. The user then interacts with the host window to establish a connection to a so-called host computer, such as, for example, host computer 150, and interact with the latter, as will be discussed below. The object Close Window 35-3 is used to close the currently active window. The object Start Conference 35-4 is the mechanism that is used to start a conference session and brings up a so-called conferee selection window on the screen of the user's PC. The user then inputs via the PC keyboard the names of the conferees and their respective voice and data telephone numbers as well as the telephone number associated with RS-232C ports 110-3 through 110-N. It is noted that port circuits 110-3 through 110-N constitute a so-called hunt group and therefore share the same telephone number. Thus, when the telephone number of the hunt group is "dialed" or is included in a third-party call control message, processor 103 selects the first available one of the ports 110-3 through 110-N for the desired connection. Continuing, the object noted as Set Participants 35-5 may be used to enter the names and telephone numbers of the conferees at a point in time prior to invoking the object Start Conference Window 35-3. Thereafter, the user may cause the priorly entered names and telephone numbers to be entered in the conferee selection window when the latter is brought up on the screen of the user's PC.

Figure 5:
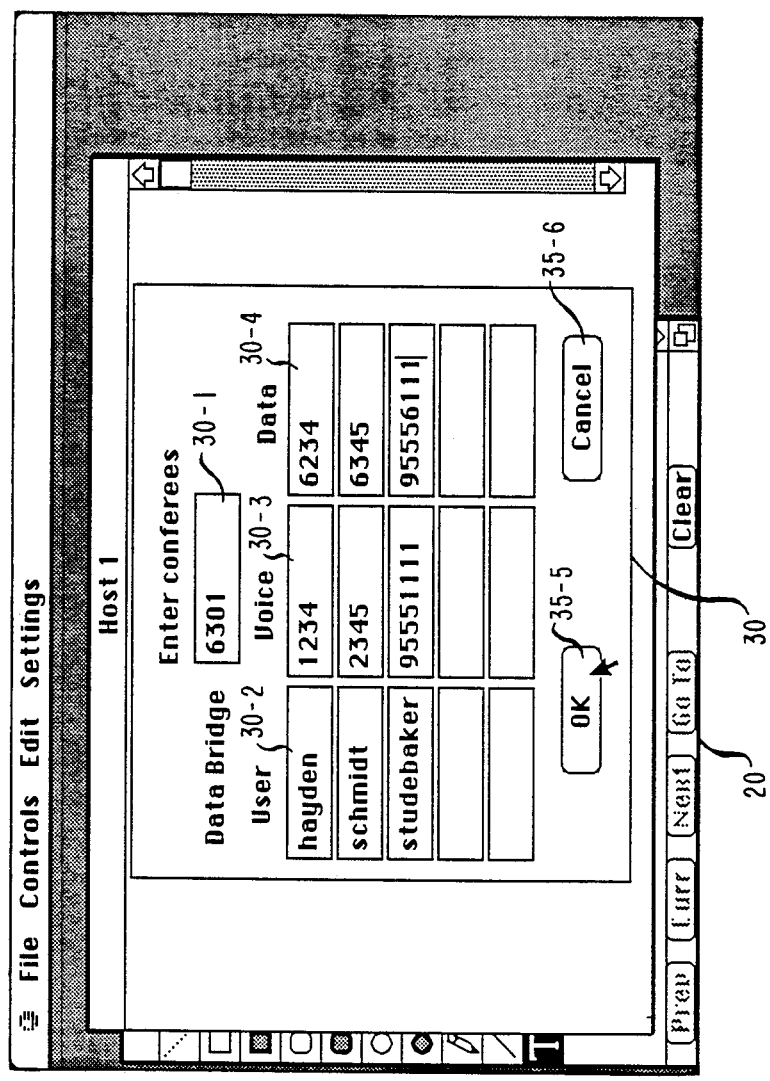
Figure 6:
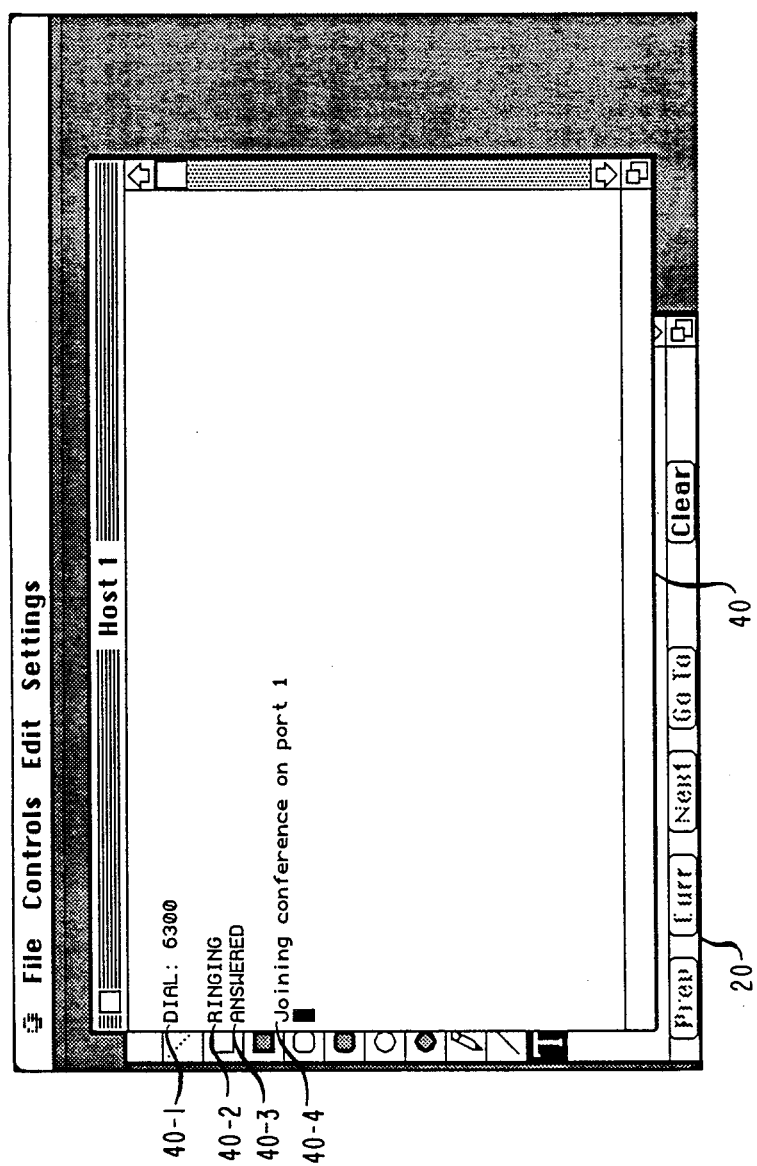

Turning now to FIG. 5, there is shown conferee selection window 30 that is brought up on the screen (display) of PC1 when the user thereat points to the object Start Conference 35-4. It is seen that window 30 displays a number of fields which the user fills in by entering the information called for by each field using the PC1 keyboard. (Alternatively, the information called for by the fields of window 30 could be entered from a file priorly prepared in connection with invoking the object Set Participants 35-5, as mentioned above.) Specifically, the user enters in field 30-1 the hunt group telephone number of RS-232C ports 110-3 through 110-N, which, in the present illustrative example of the invention, is assumed to be the number 6301. The user then enters the name, station telephone number and data telephone number of each of the conferees in respective ones of the three columns of fields 30-2 through 30-4, as shown in FIG. 5. In the present example, the names of the user positioned at PC1, PC2 and PC4 are assumed to be Hayden, Schmidt and Studebaker, respectively. The information inserted in the various fields of window 30 may be either stored in memory or erased from the display by pointing to field 30-5 or 30-6, respectively. PC1 responsive to the user pointing to the former field, stores the information and displays a host or terminal emulation window 40, as shown in FIG. 6.

When terminal emulation window 40 is brought up on the screen of PC1, the user thereat responsive to the dial prompt 40-1 enters the telephone number of RS-232C control port 110-2, which in the present example is assumed to be the number 6300. PC1 responsive to the entry passes the telephone number to system port 200-1. System port 200-1, in turn, supplies the number to processor 103 via the system bus. Processor 103 responsive to recipt thereof establishes a connection between PC1 and RS-232C control port 110-2 in the manner discussed above, i.e., by assigning system bus A or B time slots to PC1 and Port 110-2, respectively. Thereafter, processor 103 returns messages to PC1 via the system bus and assigned time slot indicating the progression of the connection, i.e., that an alerting signal (ringing) is being supplied to RS-232C port 110-2, as shown at 40-2, and indicating that RS-232C port 110-2 has responded to the alerting signal, as shown at 40-3. Data bridge 110 upon answering the call sends to PC1 via port 110-2 and the system bus a message acknowledging the connection, as shown at 40-4. PC1 and data bridge 110 then enter a handshake mode by exchanging the aforementioned sequence of initialization messages.

Specifically, data bridge 110 initiates the sequence by sending to PC1 a message containing a first predefined initialization code (INITA) and the address of the conference channel that PC1 is to use for the transmission of text and graphics. PC1 acknowledges receipt thereof by returning a second predefined initialization code (INITB) and displaying a conference window 50 overlaying workspace window 20. Upon receipt of the acknowledgement, data bridge 110 sends to PC1 a second INITA message containing the address of the control channel that PC1 is to use. PC1 acknowledges receipt thereof by sending an INITB to data bridge 110 and by displaying a control/status window 60 overlaying conference window 50. Data bridge 110 sends two additional INITA messages to PC1 containing the addresses of the communication and status channels, respectively, that PC1 is to use during the conference connection. PC1 responsive to each such message returns an INITB message, as mentioned above.

Thereafter, each message that PC1 sends to data bridge 110, and vice-versa, contains the address of the respective channel. For example, a message pertaining to information that is displayed in conference window 50 contains the address of the conference channel assigned to PC1. A message pertaining to the status of the conference connection, on the other hand, contains the address of the status channel and so on. It is to be understood that the assigned logical channels are multiplexed onto the system bus connection between PC1 and data bridge 110, as mentioned above.

Figure 7:
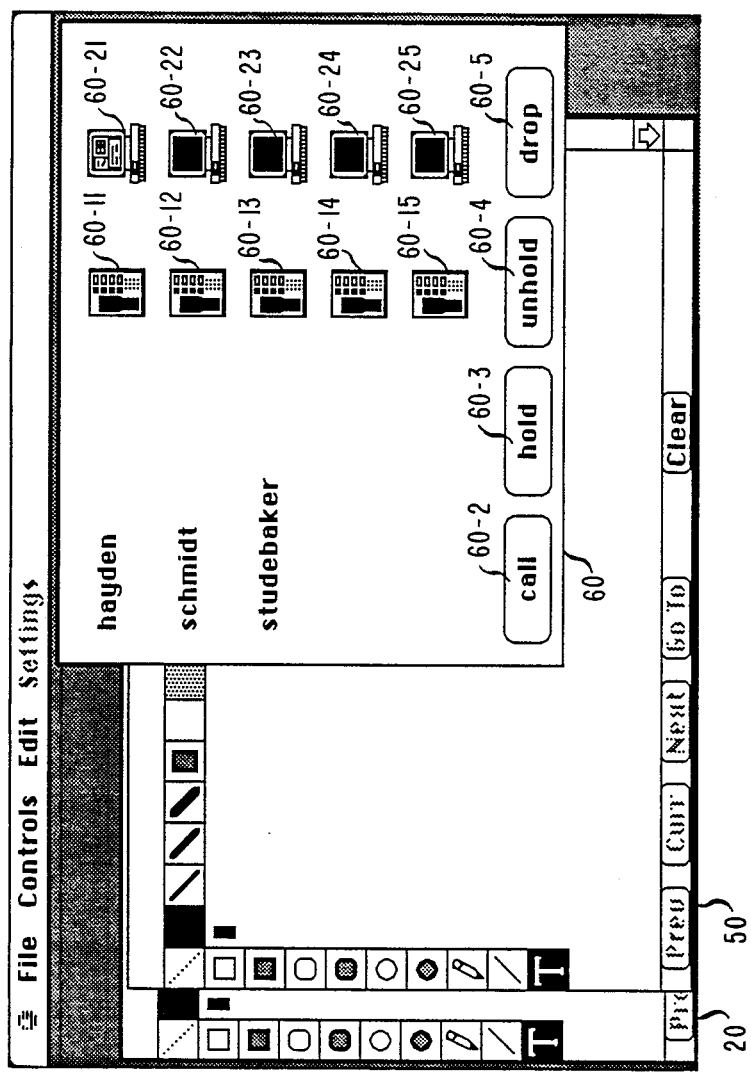

Turning then to FIG. 7, there is shown conference window 50 overlaying workspace window 20 and control window 60 overlaying conference window 50. It is mentioned at this point that a user may enter personal notes in workspace 20 during the conference session. Entries made in workspace window 20 are not transmitted to the other conferenced PCs. However, entries made in conference window 50 are transmitted to the other conferenced PCs, as will be discussed below.

It is seen from FIG. 7, that a number of icons 60-11 through 60-15 each representing a station set and a like number of associated icons 60-21 through 60-25 each representing a PC are displayed in control window 60. The names of the conferees that were previously inputted are displayed to the left of respective station set icons 60-11 through 60-13. Also displayed in control window 60 are four buttons 60-2 through 60-5 representing respective telephone functions. For example, call button 60-2 is used to place a telephone call to either a station set or PC. Hold button 60-3 is used after a call connection has been established to place a station, such as station S2, on hold. Button 60-4 is used to remove the hold state and button 60-5 is used to terminate, or drop, a connection between station S1 and another conferenced station set, for example, station set S2.

The user at PC1 establishes an audiographics teleconference connection by first establishing, for example, the audio portion of the connection, i.e., a voice connection among stations S1, S2 and S4. In practice, a voice connection is first established between stations S1 and S2. Station S4 is then added to the connection, or vice-versa. The user at PC1 establishes a connection between stations S1 and S2 by pointing to station set icon 60-12 and then pointing to call button 60-2, as shown in FIG. 8.

Figure 8:
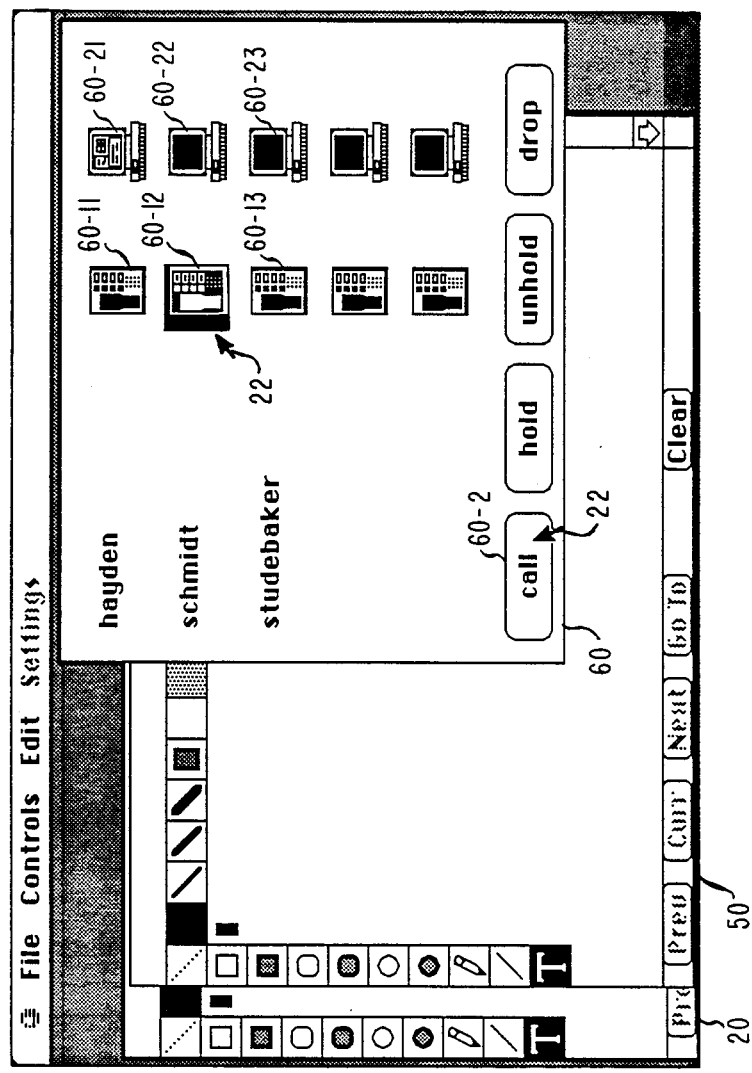

It seen from FIG. 8 that station set icon 60-12 associated with the name Schmidt is shown as inverse video as a result of the user pointing to that icon. PC1 responsive to the user selecting that icon, sends to data bridge 110 a third-party call control message containing, inter alia, the telephone numbers of station sets S1 and S2 previously inputted by the user and the address of the control channel assigned to PC1. Data bridge 110, in turn, passes the message to processor 103 via the aforementioned third-party call control link.

(The format of such third-party call control messages is similar to the format of third-party call control messages discussed in the AT&T publication entitled *5ESS Switch ISDN Basic Rate Interface-5E4 Generic Program* and identified as AT&T Pub 5D5-900-301 dated 1985, which may be obtained by contacting the AT&T Customer Information Center, 2855 North Franklin Road, P.O. Box 19901, Indianapolis, Ind. 46219, and which is hereby incorporated by reference.)

(Hereinafter, in the interest of brevity, reference to PC1 sending a third-party call control message to processor 103, and vice-versa, will mean to include sending the message to data bridge 110 in the control channel assigned to PC1 via system port 200-1 and the system bus time slot assigned to PC1, in which the message is then removed from the system bus by system port 200-3 for passage to data bridge 110 via RS-232C port 110-2. Data bridge 110 then sends the message to processor 103 via the third-party call control link, comprising RS-232C port 110-1, system port 200-3 and the system bus time slot reserved for RS-232C port 110-1. It is be understood that a message from processor 103 to PC1 is sent over substantially the same path but in reverse order.)

Figure 9:
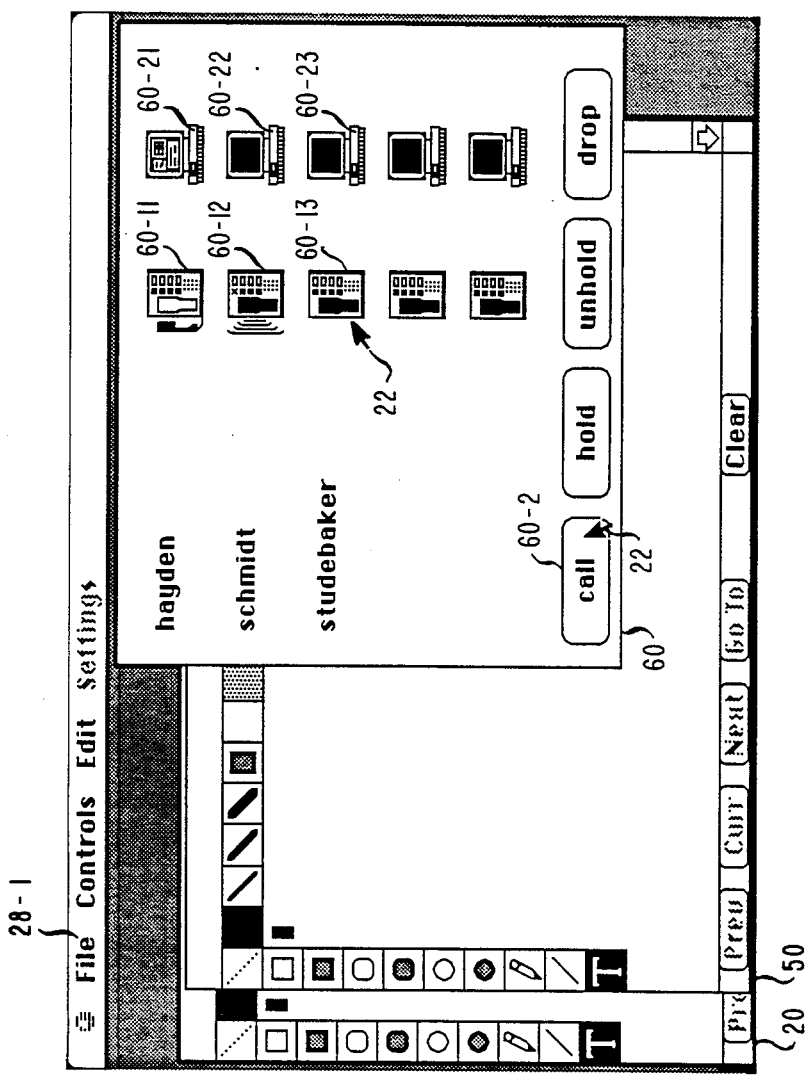

Continuing, processor 103 responsive to receipt of the message establishes a call connection between station sets S1 and S2 by assigning system bus A or B time slots to station sets S1 and S2 and sending the identity of the time slots to system port circuits 200-1 and 200-2, respectively, as discussed above. In addition, processor 103 sends an alerting signal, for example, a ringing signal, to station S1. The user at station S1 responsive to the alerting signal causes station S1 to go off-hook by removing the handset from the station S1 telephone cradle. When station S1 goes off-hook, system port 200-1 forms a message indicative of that fact and sends it to processor 103. Processor 103 responsive to receipt of that message sends an alerting signal to station S2 via the system bus A or B time slot assigned to station S2 to alert the user, i.e., the person named Schmidt, of the incoming call. In addition, processor 103 sends to PC1 a message indicating that station S1 has gone off-hook and a message indicating that ringing is being sent to station S2. PC1 responsive to receipt of the messages changes the station set icon 60-11 to show that station S1 has gone off-hook and changes icon 60-12 to show that ringing is being supplied to station S2, as depicted in FIG. 9.

Similarly, processor 103 upon being notified by system port 200-2 that the user at station S2 has answered the call by causing that station to go off-hook, sends a message to that effect to PC1. PC1 responsive to receipt of the message updates control/status window 60 to reflect the off-hook status of station S2, as is similarly shown in FIG. 9 for icon 60-11.

At this point, the user positioned at PC1 proceeds to add station S4 to the connection. The user does this, as mentioned above, by pointing to icon 60-13 and then pointing to call button 60-2. PC1 responsive thereto sends to processor 103 a third party call control message directing processor 103 to place the call connection between stations S1 and S2 on hold and to establish a call connection between stations S1 and S4.

Briefly processor 103 establishes a connection between station S4 and system 10 by first selecting an available trunk circuit (not shown) connected to an outside telephone line, for example, line 22 connected to central office CO 300 (FIG. 2). Processor 103 then outpulses the station set S4 telephone number contained in the third-party call control message received from PC1. In addition, processor 103 connects the selected trunk to tone detector circuit 102 via system port 200-N and an assigned system bus A or B time slot. When CO 300 receives the last digit of the station S4 telephone number it then establishes a connection to station S4 via one of the telephone lines of bidirectional communication path 301 (FIG. 2). CO 300 then applies so-called ringing voltage to the line to alert station S4 of the incoming call. In addition, CO 300 sends to system 10 via line 22 a ringing signal (tone) as an indication that station S4 is being alerted. The ringing tone is detected by tone detector 102 which reports that fact to processor 103. Processor 103 responsive to the detection of ringing tone from CO 300, sends to PC1 via data bridge 110, in the manner discussed above, a message noting that station S4 is being alerted. PC1 responsive to receipt of the message changes station icon 60-13 to show that station S4 is being alerted.

Currently, the public switched network does not return to a calling station a so-called answer supervision signal indicating that the called station has answered the call, i.e., has gone off-hook. As a result of this limitation, system 10 has no way of detecting when station S4 goes off-hook. To deal with this problem, most business communication systems, such as system 10, assume that the called station will go off-hook within a predetermined period of time—illustratively 10 seconds—following the application of ringing voltage to the telephone line. Accordingly, processor 103 waits 10 seconds following detection of ringing tone by tone detector 102 and at the end of 10 seconds notifies PC1 via the third-party control link that station S4 has answered the call. PC1 then sends a third-party call control message to processor 103 requesting that the call connections between stations S1 and S2 and between S1 and S4 be conferenced together. PC1 responsive to that message adds the time slot assigned to station S4 (telephone line 22) to the connection between stations S1 and S2. In addition, processor notifies PC1 via the third-party control link that station S4 has been added to the connection. PC1, in turn, changes window 60 to show station icon 60-13 in an off-hook state. (The way in which system 10 conferences voice connections is discussed in the aforementioned Baxter et al patent.)

Once stations S1, S2 and S4 have been conferenced together, the user (Hayden) at PC1 may then cause PC2 and PC4 to be connected to an available RS-232C port 110-3 through 110-N, thereby completing the audiographics conference connection. The user does this similar to the way that he/she caused stations S2 and S4 to be conferenced with station S1. When PC2 and then PC4 are connected to data bridge 110, PC1 highlights the display portion of icons 60-22 and 60-23, respectively, as is depicted for icon 60-21 in FIG. 9.

Specifically, to cause PC2 to be connected to data bridge 110 all that the user (Hayden) at PC1 needs to do is to point to PC icon 60-22 and then point to call button icon, or field 60-2. PC1 responsive thereto sends to processor 103 a third party control message containing, inter alia, the telephone number (6301) reserved for the RS-232C ports 110-3 through 110-N and the telephone number (6345) for PC2, which the user at PC1 priorly inputted when window 30 was displayed (FIG. 5). Processor 103 responsive to receipt of the message connects PC2 to data bridge 110 in the manner discussed above. Processor 103 then sends to PC1 a third-party call control message indicating that PC2 has been connected to port 110-3 of data bridge 110. PC1 responsive to receipt of the message highlights PC icon 60-22 to reflect the current status of PC2, in the manner mentioned above.

When PC2 is connected to RS-232C port 110-3, PC2 exchanges the initialization sequence with data bridge 110, thereby causing PC2 to display a conference window and a status window (not shown) overlaying the conference window. Data bridge also assigns to PC2 a conference channel for the transmission and reception of data (text and graphics) displayed in the conference window and a status channel for the transmission and reception of information indicative of the status of the audiographics teleconference connection, as mentioned above. The conference and status windows displayed on the screen of PC2 are substantially identical to conference window 50 and status control window 60 shown in FIG. 9, respectively. Following the initialization sequence, PC2 sends to data bridge 110 via the PC2 status channel a message requesting a status update. Data bridge 110, in turn, broadcasts the message to PC1 via the status channel assigned to PC1. PC1 responsive to receipt of the request returns to data bridge 110 via the status channel assigned to PC1 a message indicating the names of the conferees (Hayden, Schmidt and Studebaker) and the status of station icons 60-11 through 60-13 and PC icons 60-21 through 60-23. Data bridge 110, in turn, broadcasts the message to PC2 via RS-232C port 110-3 and the status channel assigned to PC 2. PC2, in turn, changes status window 60 displayed on the screen of PC2 to conform to the way the window is displayed on PC1.

At this point, the user positioned at PC1 proceeds to add PC4 to the connection. As explained above, the user does this by pointing to PC icon 60-23 and then pointing to call button icon 60-2. PC1 responsive thereto forms the necessary third-party call control message containing, inter alia, the telephone number of PC4 and aforementioned hunt group telephone number and sends the message to processor 103, in the manner discussed above. Processor 103 responsive to receipt of the message, causes system port 200-N to seize an outgoing trunk connected to one of the CO telephone lines, for example, telephone line 23, and sends to CO 300 the PC4 telephone number contained in the third-party call control message. Since the third-party call control message contains the telephone number (6301) for data bridge 110, processor 103 treats the call as a data call and interposes a modem selected from modem pool 210 (FIG. 2) between an available data bridge 110 port, for example, RS-232C port 110-4, and the selected outgoing trunk of system port 200-N and, hence, telephone line 23. CO 300 responsive to receipt of the PC4 telephone number, establishes a connection between line 23 and PC4.

When PC4 is so connected it exchanges the aforementioned initialization sequence with data bridge 110, thereby causing data bridge 100 to assign conference and status channels to PC4. PC4, in turn, displays a conference window 50 and status window 60 on its screen and requests a status update, as was similarly discussed above in connection with PC2.

Figure 10:
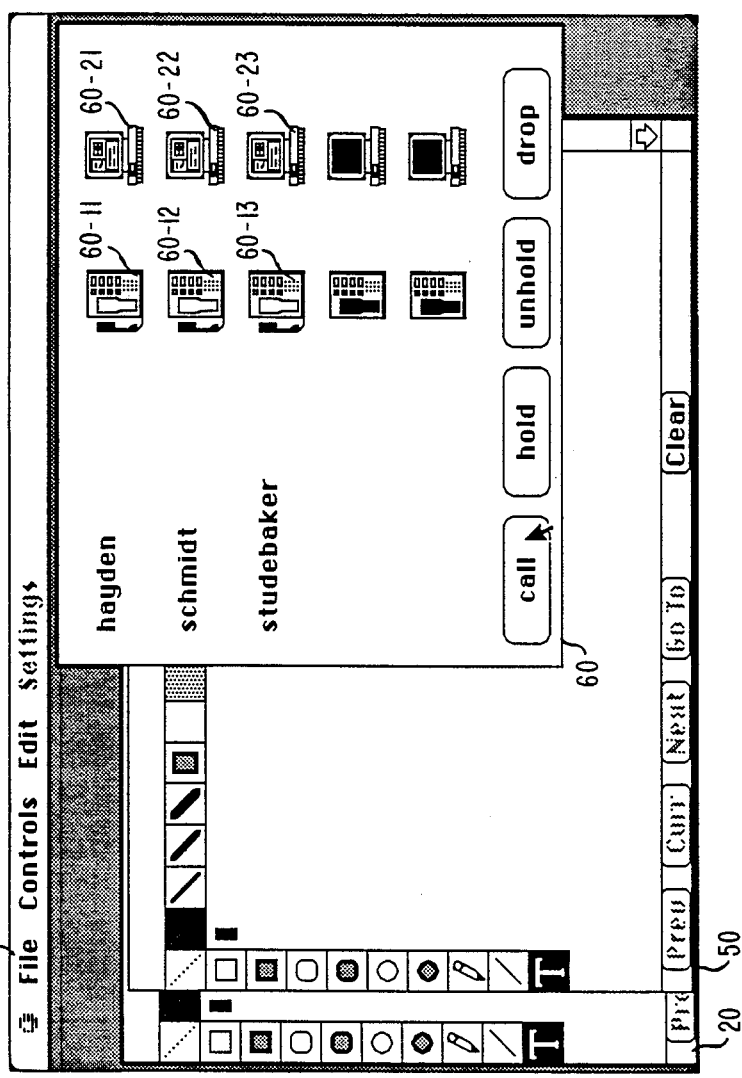

At this point, the audiographics conference connection has been established, as evidenced by the display of status window 60 on the display of each conferenced PC, as shown in FIG. 10 for PC1. Thereafter, the conferees may begin to exchange text and/or graphics by making such entries in conference window 50 displayed on their respective PCs. However, before doing so, each user (conferee) should move conference window 50 to the foreground overlaying windows 60 and 20, respectively.

In a preferred embodiment of the invention, each conferenced PC maintains separate data structures for text and graphics that may be displayed in conference window 50. For example, text is stored in a memory array comprising 40 lines of eighty characters each line and graphics is stored in a so-called bit-map graphics field. Thus, when the audiographics connection is established and a user begins to enter text and/or graphics in conference window 50 it is stored in the forty-line memory array or bit-map graphics field, as the case may be.

Figure 11:
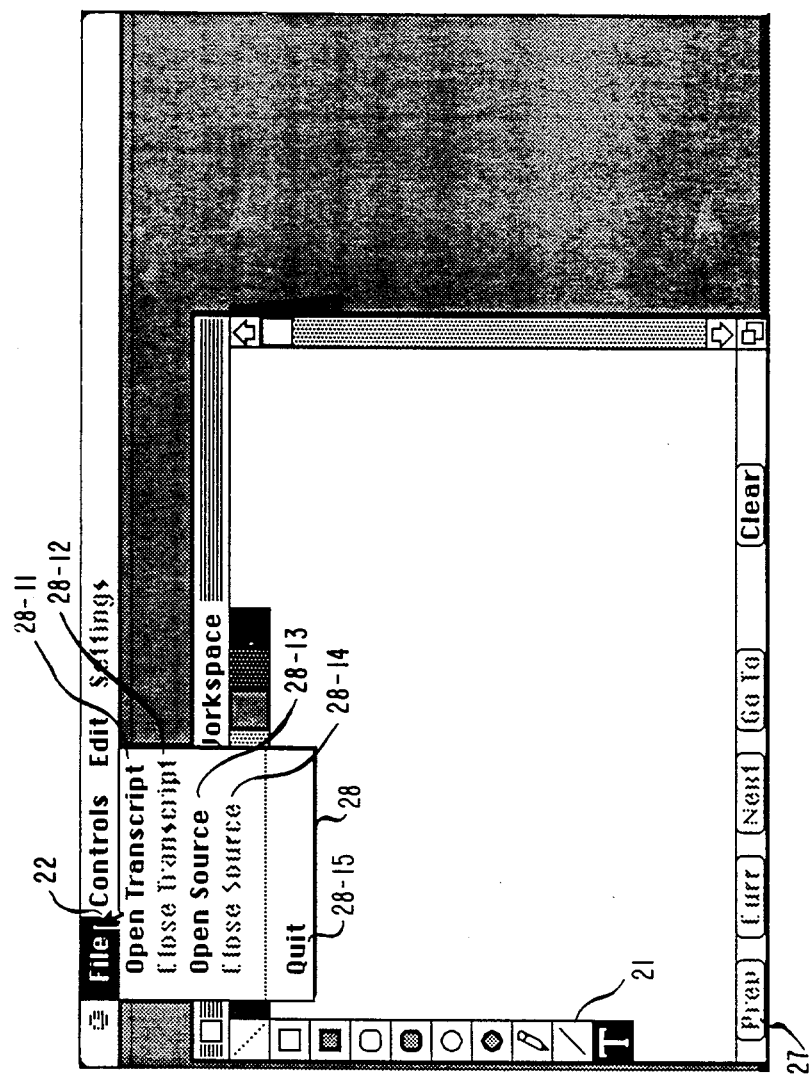

Accordingly, a user may enter text in conference window 50 by typing it in using the PC keyboard. Text contained in a file stored in the user's PC may also be entered in the conference window. To enter text from a file, the user points to file key 28-1 which displays a menu of file commands as shown in FIG. 11. The user then points to Open Source file command 28-13 to locate the file that the user desires to display in conference window 50. The user's PC responsive thereto displays in a temporary window (not shown) overlaying conference window 50 the names of the files stored in the memory of the PC. The desired file is then displayed in conference window 50 when the user points to its name. When the user does so, the temporary window is erased from the screen of the PC and the selected file is linked to conference window 50. In this respect, the linked file may be considered as being an extension of conference window 50. In addition, function keys 27 displayed along the bottom of conference window 50 are highlighted by displaying them in darker print in the manner shown for the CLEAR key. The user may then cause the first page of the selected file to be displayed in conference window 50 by pointing to the function key labeled NEXT. It is noted that the user may unlink the file from window 50 by pointing to the Close Source command 28-14.

A conferee may, in accordance with an aspect of the invention, retain a transcript of the text that is displayed in conference window 50 during the course of the audiographic conference connection. A conferee may create such a transcript by merely pointing to Open Transcript command 28-11. Thereafter, text that is displayed in conference window 50 is automatically entered in the transcript file, which is stored in the memory of the conferee's PC. The conferee may thereafter access the transcript file by, for example, pointing to Open Source command 28-13 and proceeding in the manner explained above. Thus, the transcript file retains a record of all text that is displayed in conference window 50, even though the text may have been erased from that window during the course of the audiographics conference connection. A transcript file may be closed at any time during the conference connection by merely displaying file menu 28 and pointing to Close Transcript command 28-12. Text entered in the transcript file up to that point is stored as a file in the memory of the conferee's PC. Text that is thereafter entered and displayed in conference window 50 is not entered in the transcript file. It is noted that graphics displayed in the conference window is not saved in the transcript file. The reason for this is that presently there is no personal computer industry standard for mixing text and graphics in the same file. The user may erase menu 28 at any time by pointing to QUIT command 28-5.

Figure 12:
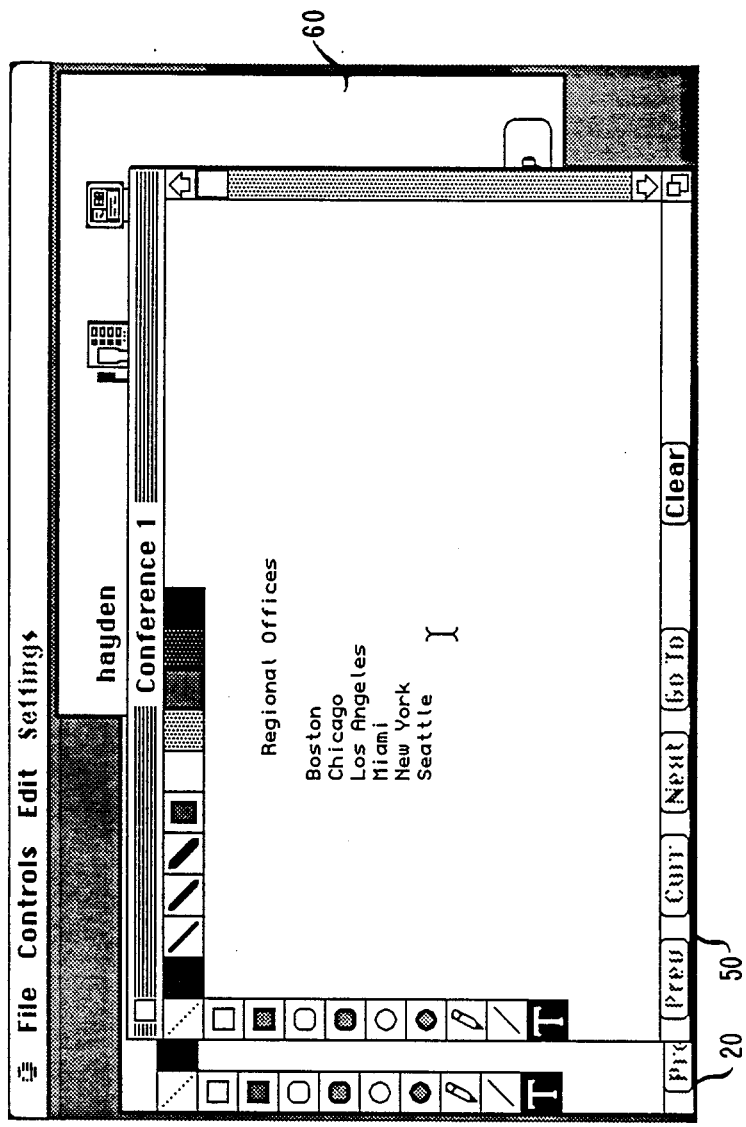

Continuing, it is assumed at this point in the discussion of the present invention that one of the conferees, for example, the conferee positioned at PC1, has entered text in conference window 50, as shown in FIG. 12. As mentioned above, information, i.e., text and/or graphics, displayed in conference window 50 is stored in the forty line buffer and bit map, respectively, and is distributed to the other conferees via data bridge 110 for display in the conference window 50 that is brought up on the screen of their PCs. In accordance with an aspect of the invention, the conferees may then interactively edit or change the information displayed in their respective conference windows 50 and such changes are automatically distributed to the other conferenced PCs. Each PC responsive to receipt of such changes automatically modifies the information displayed in its conference window to be in accord therewith. Thus, each conferee views the same information throughout the conference session.

Figure 13:
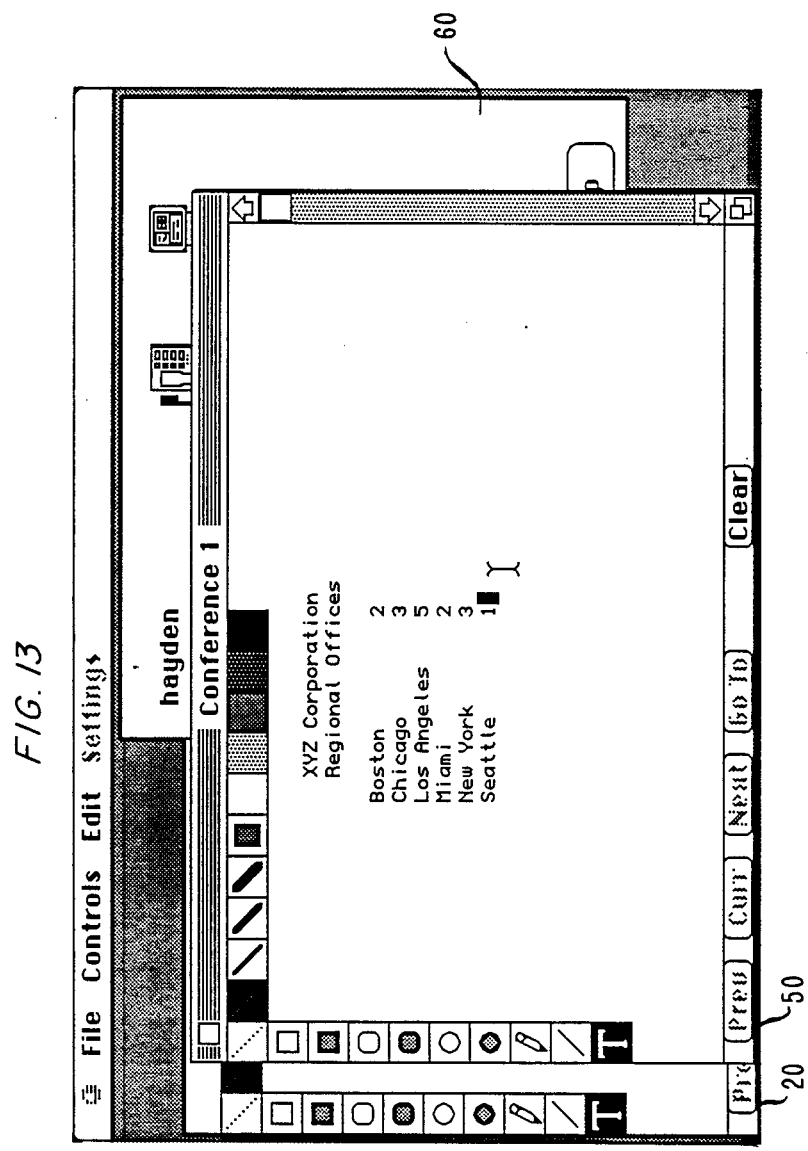

For example, if the conferee positioned at PC2 edits the contents of conference window 50 by "typing in" a corporate name and the number of sales offices within the named regions, as shown in FIG. 13, then PC2 responsive thereto sends to data bridge 110 in the conference channel assigned to PC2 the typed input together with editing instructions as a message(s). Data bridge 110, in turn, stores the message(s) in buffers reserved for the conference channels assigned to the other conferenced PCs. Thereafter, data bridge 110 unloads the message(s) from each buffer and sends it to PC1 and PC4 via their respective conference channels. PC1 and PC4 responsive to receipt of the message(s) change the information in the conference window 50 displayed on their respective screens in accordance with the instructions contained in the message(s).

Figure 14:
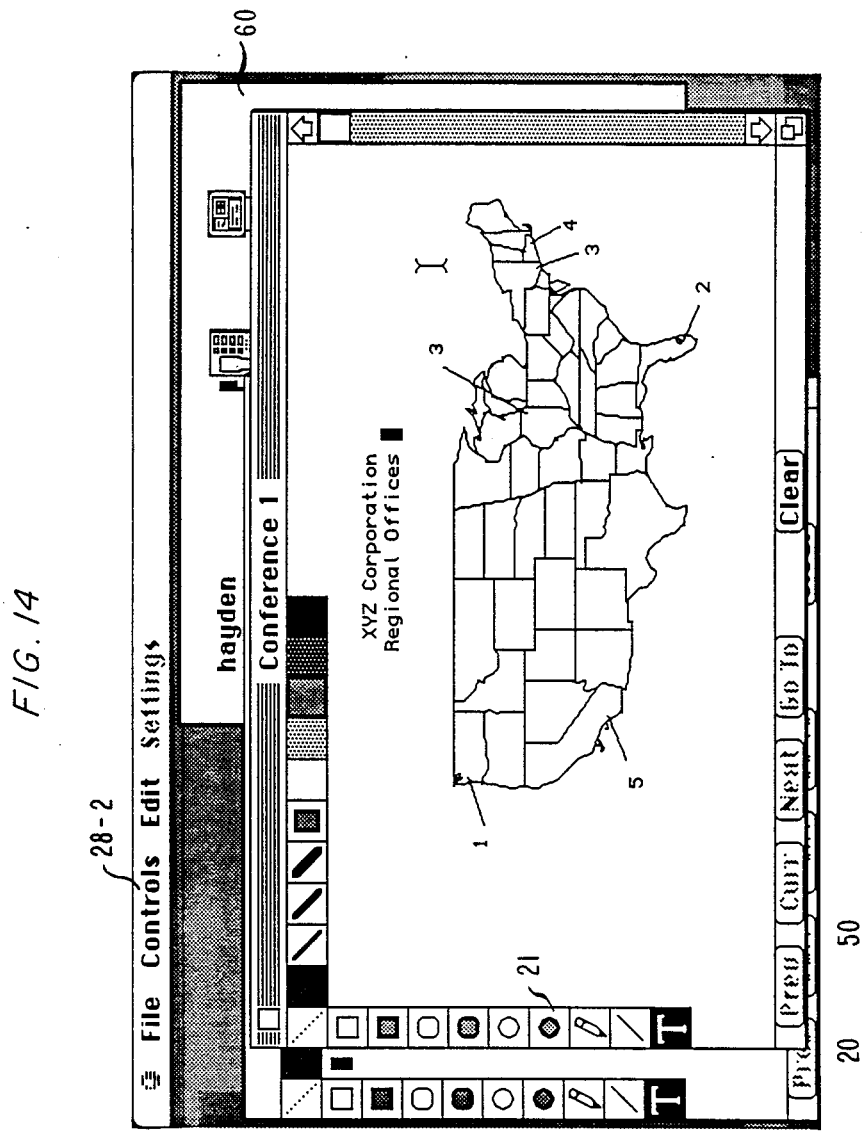

Anyone of the conferees may further edit conference window 50 and any changes made therein are automatically brought up in the conference window 50 displayed on the screens of the other conferenced PCs in the manner discussed above. For example, assuming that responsive to a discussion among the conferees via the conferenced audio connection, the conferee positioned at PC4 edits conference window 50 by, for example, replacing (erasing) the names of the sales offices and associated numbers from conference window 50 with a map of the U.S. containing the locations of the respective sales offices, as shown in FIG. 14. The conferee positioned at PC4 may enter a rendition of a map of the United States by either drawing it in using drawing tools 21 or pasting it in from a file containing such a rendition. PC4 responsive to such editing stores the graphics in its bit-map graphics field, and transmits the contents of the bit-map field as a message(s) to the other conferenced PCs via the PC4 conference channel and data bridge 110. It is noted that PC does not transmit the entire contents of its bit-map field, but transmits only the individual graphic characters and their respective locations in the field. For example, in the case where the user has pasted in an image or drawing, only the bit-map graphics information corresponding to the pasted-in drawing is transmitted.

During a conference session, a conferee may find it desirable to bring into the conference information that is not readily available to the conferees. For example, if the conferee positioned at PC1 desires to enter in conference window 50 the total dollar sales earned by each of the regional sales offices and such information is stored in the memory of either a personal computer, such as PC3, or host computer 150 (FIG. 2), the conferee may, nevertheless, obtain such information by establishing, in accordance with the invention, a subconference connection with either PC3 or host computer 150, without having to add that device to the original conference connection, as discussed above.

Figure 15:
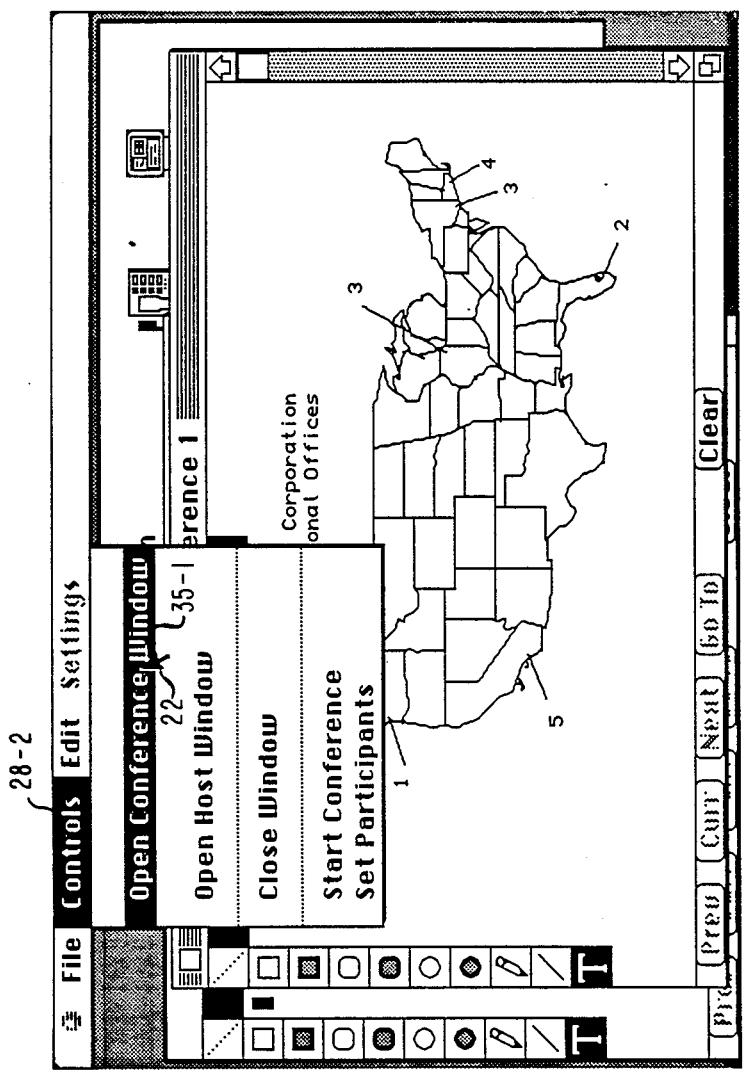

Specifically, in order to establish a subconference connection with PC3, the user at PC1 first points to Controls menu 28-2 to bring up the menu of conference commands, as shown in FIG. 15. The user at PC1 then points to Open Conference window command 35-1. PC1 responsive to the user invoking that command and to the fact that PC1 is currently participating in a conference connection, sends to data bridge 110 via the communication channel assigned to PC1 a control message containing an INITA and the address of the conference channel that PC1 will use during the subconference, or second conference, connection, thereby starting an initialization sequence with data bridge 110. Data bridge 110 responsive to receipt of the INITA returns to PC1 an INITB. PC1 and data bridge 110 then exchange the INITA/INITB sequence twice more during which time PC1 sends to bridge 110 the addresses of the second control channel and second status channel that PC1 will use during the subconference connections. As a result of the initialization sequence PC1 displays a conferee selection window 32 overlaying the windows brought up for the original, or main, conference connection, as shown in FIG. 16.

Figure 16:
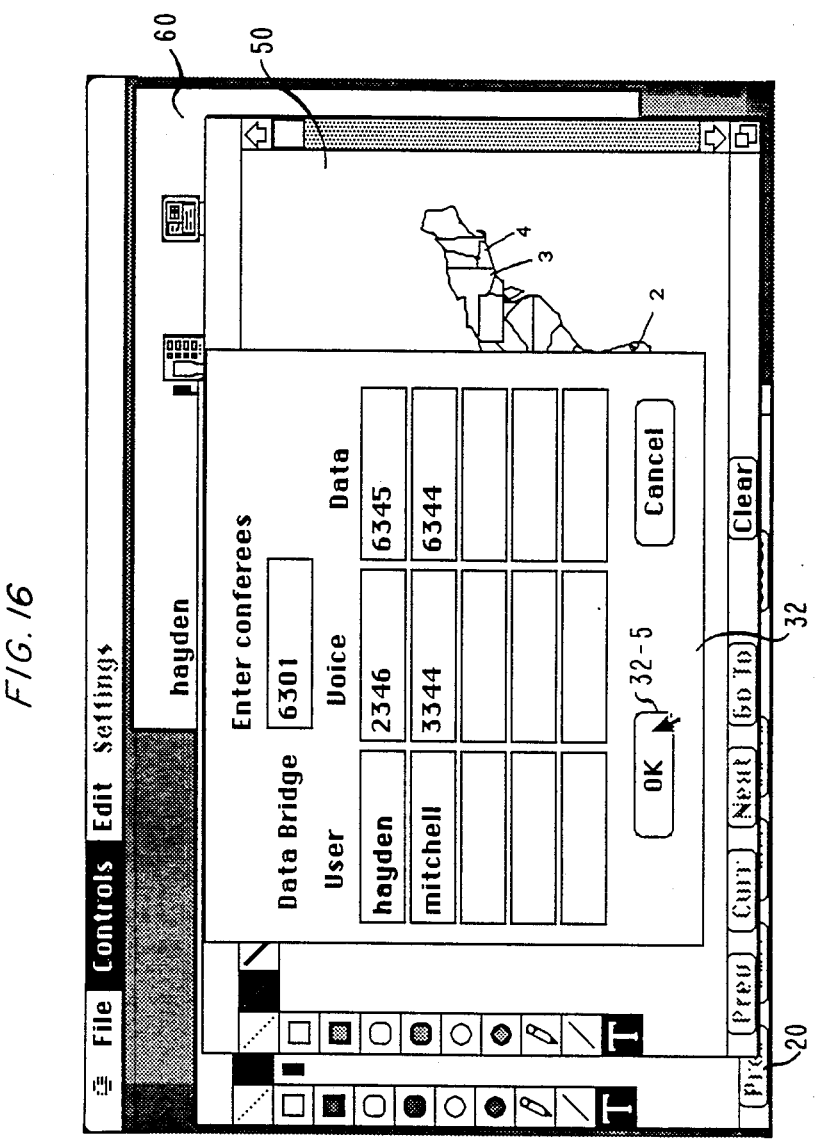
Figure 17:
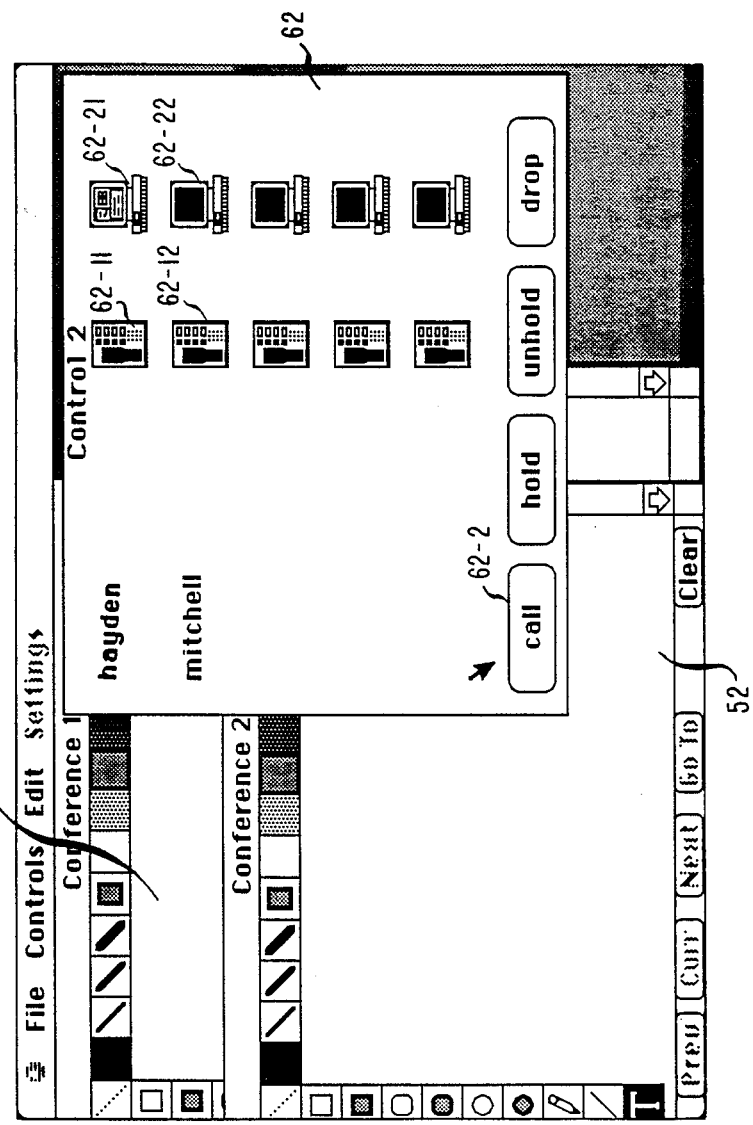

The user at PC1 using the PC1 keyboard then enters in conferee selection window 32 the name of the user at station S3 as well as the telephone numbers of station S3 and PC3, as shown in FIG. 16. When the user is satisfied that the information entered in window 32 is correct, he/she then points to the field 35-5 labeled OK. PC1 responsive thereto erases window 32 and displays a control/status window 62 overlaying a conference window 52 that are to be used for the subconference connection, as shown in FIG. 17. It is seen from FIG. 17, that PC1 in bringin up status/control window 62 has transferred the names that the user entered in window 32 to window 62, as was done when window 60 was brought up on the screen of PC1. It can be appreciated at this point in the discussion that the manner in which a subconference is established is similar to the way that the original conference connection was established.

With the aforementioned in mind, the user at PC1 establishes a voice connection between stations S1 and S3 by pointing to the telephone icon 62-12 associated with station S3 and then pointing to call button 62-2. PC1 responsive thereto forms a third-party call control message containing the telephone numbers of stations S1 and S3 as well as call connection instructions and sends the message to data bridge 110 in the second control channel assigned to PC1. As discussed above, data bridge 110 sends the message to processor 103 via the third-party call control link. Processor 103 upon receipt of the message establishes a connection between stations S1 and S3 in the manner discussed above. At this point it is assumed that the user at station S3 has answered the telephone call and that PC1 has changed station icons 62-11 and 62-12 to reflect the off-hook state of those stations.

In the instance where data bridge 110 is serving more than one audiographics conference connection and, thereafter, detects that one of its idle RS-232C ports, for example, port 110-5, has been seized, the problem arises as to which conference connection the newly seized RS-232C port is to be connected.

This problem is handled by, in accordance with an aspect of the invention, having the originating PC notify data bridge 110 as to the identity of the newly seized RS-232C port, as mentioned above. In particular, when processor 103 connects a PC to an idle data bridge 110 RS-232C, processor 103 returns to the PC which originated the connection via data bridge 110 a message containing, inter alia, the identity of newly connected RS-232C port. The identity could be, for example, the telephone number assigned to the port within the particular hunt group. The originating PC, in turn, sends the telephone number to data bridge 110 via the communication channel assigned to the PC. Data bridge 110 responsive to receipt thereof translates the telephone number into an address identifying the newly connected RS-232C port and stores the address in a record of a routing table that data bridge 110 assigns to that RS-232C port, as will be discussed below in detail.

Thus, when PC3 is connected to, for example, RS-232C port 110-5, data bridge 110 uses the routing table to translate the telephone number that it receives from PC1 into an address identifying port 110-5. The PC connected to RS-232C port 110-5 (PC3) can now be correlated with the conference associated with the originating PC (PC1), in accordance with the invention. Data bridge 110 then exchanges the aforementioned initialization sequence with PC3, thereby resulting in assigning the appropriate conference and status channels to PC3 and thereby causing PC3 to display a conference window and status window on the screen of PC3.

Similarly, when PC3 is added to the conference connection it requests a status update. PC1 responsive thereto, returns via its second status/control channel a message noting the names of the conferees, the status of stations S1 and S3 and the status of PC1 and PC3. PC3 upon receipt of the message via data bridge 110 changes the state of the icons shown in the status window displayed on the screen of PC3, the icons being depicted in the manner shown in FIG. 10 for the original conference connection.

Figure 18:
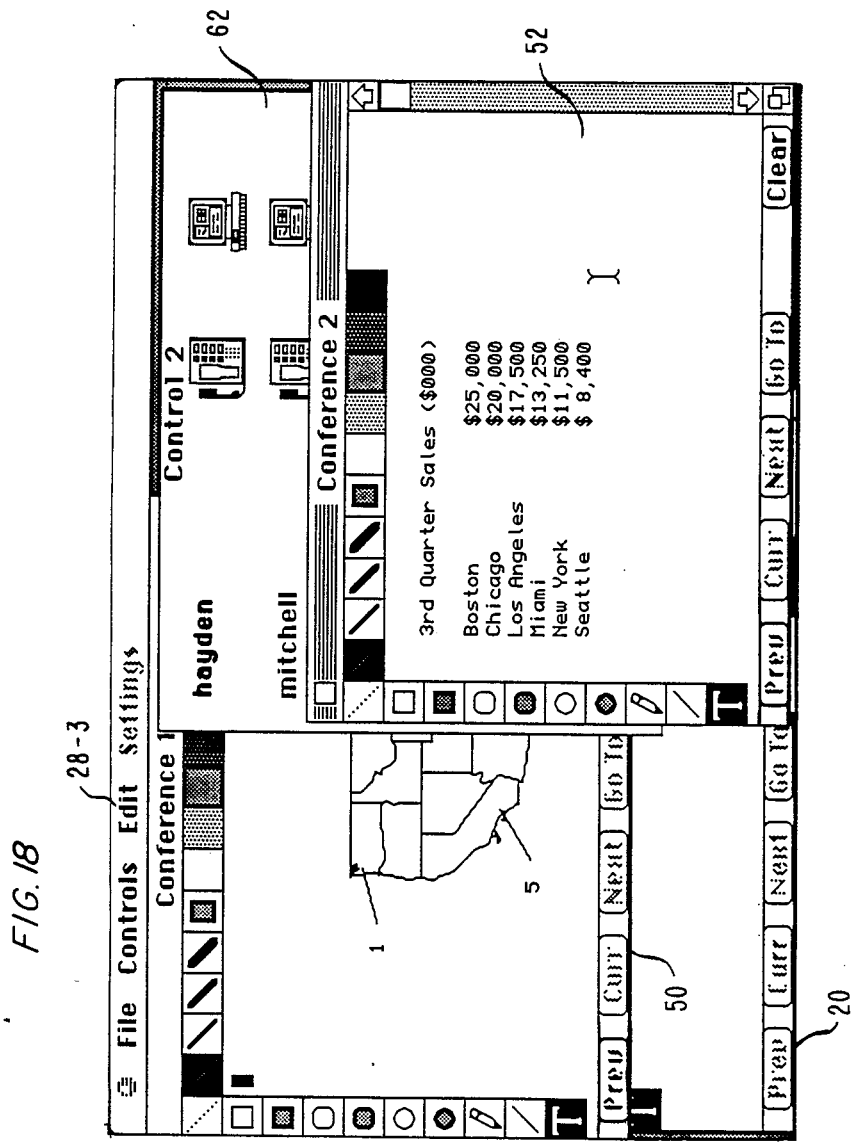

At this point, it is assumed that the user at PC1 has requested that the user at PC3 display the aforementioned sales figures in the conference window brought up on the screen of PC3 and that the user at PC3 has complied with the request. As mentioned previously, a conferenced PC transmits to data bridge 110 any new entry (either text and/or graphics) that is displayed in the PC's conference window. Thus, when the sales figures are displayed in the PC3 conference window, they are sent as a message to data bridge 110 for distribution to the other members of the subconference connection, namely PC1. PC1 responsive to receipt to the message displays the information contained therein in conference window 52, as shown in FIG. 18.

Having obtained the sought-after information, the user at PC1 may then transfer the contents of window 52 to conference window 50 using the editing functions (cut, paste, etc.) that are displayed when the user points to edit function key 28-3. When the user does so, PC1 sends to data bridge 110 the information that is newly displayed in the PC1 conference window 50. As mentioned above, data bridge 110 then broadcasts the information to PC2 and PC4 via the conference channels assigned to those PCs. Having thus obtained the desired information from PC3, the user at PC1 may thereafter terminate the subconference connection with PC3.

The user terminates the voice connection between stations S1 and S3 by, for example, placing the second telephone line connected to station S1 in an on-hook state. Port circuit 200-2 serving station S1 (FIG. 2) responsive to the on-hook state notifies processor 103 in the manner discussed above. Processor 103, in turn, terminates the voice connection between stations S1 and S3 by sending messages to their respective port circuits canceling the system bus A or B time slots assigned to those stations.

To terminate the data connection of the audiographics subconference connection, the user at PC1 selects control window 62, points to the icon corresponding to PC3, and points to the DROP button. PC1 responsive thereto, sends a third-party call control message to processor 103 via the aforementioned control link requesting that PC3 be disconnected from RS-232C port 110-5. Processor 103, responsive to receipt of the message, disconnects RS-232C port 110-5 and PC3 from system bus A or B. Processor 103 does this by sending messages to system ports 200-2 and 200-3 canceling the system bus time slots assigned to PC3 and port 110-5. Data bridge 110, responsive to port 110-5 being disconnected from the system bus (i.e., being placed in an idle state), cancels the logical channels assigned to PC3 for the subconference. The user at PC1 then closes subconference window 52, thereby causing PC1 to close windows 52 and 62 and to send respective "close" message to data bridge 110.

As mentioned above, the user at PC1 may alternatively establish, in accordance with an aspect of the invention, a data connection to host computer 150. The user establishes a connection to host computer 150 by causing PC1 to display menu 28 and then pointing to Open Host Window command 35-2. PC1 responsive thereto displays the host window, the host window being similar to the window shown in FIG. 6. The user then inputs the telephone number of host computer 150 when prompted to do so. PC1 sends the telephone number to processor 103 via port 200-11 and the system bus. Processor 103 responsive to receipt of the number establishes a system connection between PC1 and host computer 150 in the manner discussed above. Thereafter, PC1 and host computer 150 may communicate with one another via the host window. That is, commands inputted by the user and information returned by host computer 150 in response to the commands are displayed in the host window.

For example, if the information relating to the dollar sales, discussed above, had been stored in the memory of host computer 150 rather than PC3, then the user may obtain that information by establishing a connection to host computer 150. When the connection is established, the user may then direct host computer 150 to download to PC1 the stored information. The user may then transfer the information to conference window 50 in the manner described above, e.g. by "cutting" and "pasting".

To terminate the original, or first, conference connection, the user at PC1 causes control window 60 to be displayed in the foreground overlaying conference window 50. The user then points to one of the icons 60-12, 60-13, 60-22 or 60-24 and operates the mouse control button. The user then points to drop button 60-5 and again operates the mouse control button. Responsive to that action, the system terminates the corresponding voice or data connection and returns the selected icon to its original state, as shown in FIG. 7. The user repeats this procedure to terminate the remaining connections.

Figure 19:
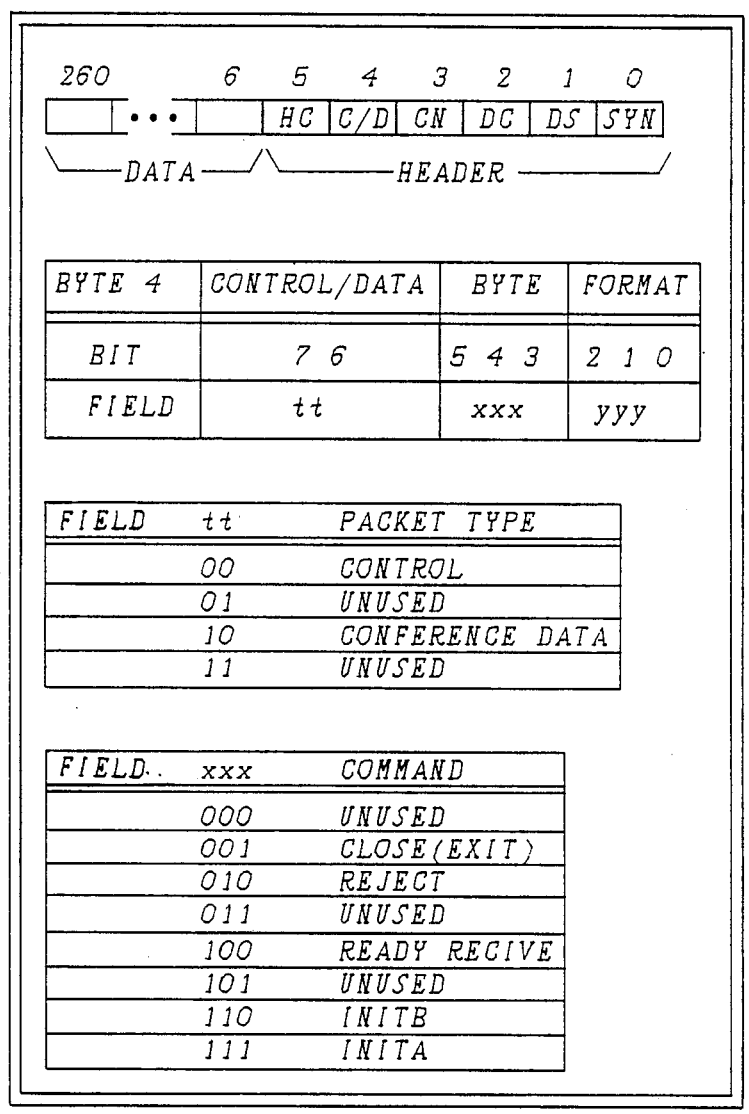
FIG. 19 illustrates the layout of a data packet that is used to exchange information between the personal computers when they are conferenced together in accordance with invention.

Turning now to FIG. 19, there is shown the format of the message that is used in the illustrative embodiment of the invention to transmit data among conferenced PCs via data bridge 110. As shown in FIG. 19, bytes 0 through 5 constitute a so-called packet header, which is used to control the flow of data between a conferenced PC and data bridge 110. Bytes 6 through 260 of a packet are reserved for the actual data, which may be representative of text, graphics, or third-party call control instructions. The number of data bytes in a packet may very from illustratively one through 255 bytes, in which each byte of a packet is composed of—illustratively eight binary bits.

Specifically, byte 0 of the header is a synchronization (SYN) byte composed of a predetermined pattern of binary ones or zeroes and is used to mark the beginning of a packet. Byte 1 (DS) indicates the number of data bytes in the data field. Byte 2 contains the value of a "checksum" that is taken over the data bytes accompanying the header. As is well-known, a receiving device, such as a PC, performs a checksum on the data bytes contained in a packet it receives and then compares the value of the computed checksum with the value of the checksum contained in the packet header. If the checksums compare with each other, then the receiving PC is relatively assured that the data does not contain a so-called transmission error. Otherwise, the receiving device is not so assured and may request a retransmission of the packet, as will be explained below.

Continuing, byte 3 (CN) contains the address, or channel number, of the respective logical channel, i.e., conference, control, status or communication channel. Byte 4(C/D) is a control byte and is discussed below. Byte 5 (HC) contains the value of a checksum taken over bytes 1 through 4.

As shown in FIG. 19, byte 4 is divided into three fields, namely fields yyy, xxx and tt, which are used to control the flow of data and commands between data bridge 110 and conferenced PCs. Specifically, field yyy is used to carry a three-bit packet sequence number (binary 000 through 111) to identify respective packets of a series of packets transmitted by either data bridge 110 or a conferenced PC. The notion of using a sequence number to identify a packet is well-known and will not be discussed herein. However, it suffices to say that if the number contained in the yyy field of a received packet is out of sequence, thereby indicating that an intervening packet(s) was not received, then the receiving device may send a message to the sending device requesting retransmission of the missing packet.

Field tt indicates whether the data field (bytes 6–260) contains a third-party call control message or conference data (text or graphics), in which the value of the tt field is 00 or 10, respectively. It is seen from FIG. 19, that tt field values of 01 and 11 are unused.

Field xxx is used for the exchange of commands between a conferenced PC and data bridge 110, in which case the binary value of field tt would be 00. In particular, the binary value 001 in field xxx is a command which directs data bridge 110 to either "close" a particular channel, i.e. disconnect a particular conferee from the conference connection, or "exit", i.e., to disconnect all conferees from the conference connection. The commands "close" and "exit" are distinguished from one another by inserting in field yyy either the binary value 000 or 001, respectively. The binary value 010 in field xxx is used to reject a particular packet, in which the packet sequence number is identified in field yyy. The binary value 100 in the xxx field is used as an acknowledgement and is transmitted by the receiving device to indicate that it is ready to receive the next packet. Binary values 110 and 111 in the xxx field are used to convey the aforementioned INITB and INITA signals, respectively.

Turning now to FIG. 20, there is shown routing table 70 which is maintained by data bridge 110 to determine the routing of data packets that it receives via individual ones of its RS-2332C ports 110-2 through 110-N. A discussion of routing table 70 will follow the illustrative example of establishing an audiographics conference connection presented above. It is noted that data bridge 110 "fills in" routing table 70 as the data portion of a conference connection is being established. For clarity, the RS-232C ports 110-2 through 110-5 are identified by the addresses, or numbers, 2 through 5, respectively.

Specifically, data bridge 110 reserves two records in table 70 for each port associated with a conference connection. The two records are reserved at the time that data bridge 110 and the PC connected to the port engage in the initialization sequence described above. As shown in FIG. 20, one of the two records is identified as the conference (CNF) record and the other is identified as the status (STAT) record. Each record may contain up to illustratively 18 fields, with a pair of fields identifying a respective channel number assigned to a data bridge 110 port, and, hence, the PC connected to the Port. The CNF and STAT records are used to store the conference and status channel numbers, respectively, that are assigned to each of the conferenced port circuits, as will be discussed below.

Data bridge 110 reserves two additional records for the originator of the conference connection, which in present illustrative example, is port 110-2. These two records are identified in table 70 as the control (CTL) and communication (COMM) channel records, respectively. The CTL and COMM records are used to store numbers assigned to the control and communication channels, respectively, that are used by the originator of conference connection in the manner discussed above. Similarly, the records are "filled in" at the time that data bridge 110 is engaged in exchanging the initialization sequence with PC1, i.e., port 110-2.

In particular, data bridge 110 inserts the address of port 110-2 in field of "a" of the four records that it has assigned thereto and inserts in adjacent field "b" the numbers assigned to the respective logical channels, namely the numbers 1, 2, 3, and 4 as shown in table 70. Similarly, during the time that data bridge 110 is engaged in the initialization sequence with PC2 connected to port 110-3, data bridge 110 inserts in the "a" field of the CNF and STAT records reserved for that port the address of port 110-3. Data bridge 110 then inserts in the "b" field of those records the numbers assigned to the conference and status channels that are to be used by PC3, the numbers being 2 and 3, respectively, as shown in table 70. In addition, data bridge 110 inserts in the "c" field of the port 110-3 CNF and STAT records the address of port 110-2 and inserts in the adjacent "e" field the numbers assigned to the conference and status logical channels used by port 110-2, and, in turn, PC1. Further, data bridge 110 enters in the "c" field of the port 110-2 CNF and STAT records the address of port 110-3 and enters in the adjacent "d" thereof the numbers of the conference and status channels assigned to port 110-3.

It can be appreciated without specifically stating so, that data bridge 110 similarly "fills in" table 70 for port 110-4 during the time that data bridge 110 is conducting the initialization sequence with PC4. The filling in of table 70 for port 110-4 is shown in connection with the CNF and STAT records generally designated "x" and the "e" and "f" fields of the other respective records.

Data bridge 110 uses the entries in table 70 to determine the distribution of a particular packet that it receives from one of the conferenced ports, as mentioned above. For example, data bridge 110 responsive to receipt of a packet from a conferenced PC, for example, PC1, extracts the channel number contained in byte 3 of the packet header to determine the distribution of the packet. Data bridge 110 does this by comparing that channel number with the channels numbers entered in column "b" for port 2 connected to PC1. If the channel happens to be, for example, the number 1, then data bridge scans across the CNF line reserved for port 2 to determine the identities of the ports conferenced with port 2 and their respective channel numbers. After doing so, data bridge 110 stores the packet with the appropriate channel number inserted in the CN field thereof in respective memory buffers reserved for the conference channels of each port conferenced with port 110-2. Thereafter, data bridge 110 unloads the packet from each buffer and sends it to the respective port for transmission to the PC connected thereto.

It is seen from FIG. 20, that a second set of CNF, STAT AND CTL records were reserved for port 2 to handle the distribution of packets associated with the subconference connection between ports 2 and 5 (PCs 1 and 3). In addition, CNF and STAT records were reserved for port 5 (PC3) for the storage of channels numbers assigned to port 5. In this instance, a packet from port 2 bearing the channel number 5 would not be distributed to ports 3 and 4, but would be distributed to port 5 in accordance with the routing information entered in field "d" of the CNF shown at "y". Thus, data bridge 110 would route the packet to port 5 in the manner discussed above.

We turn now to a discussion of the software program which implements the invention in data bridge 110.

Figure 21:
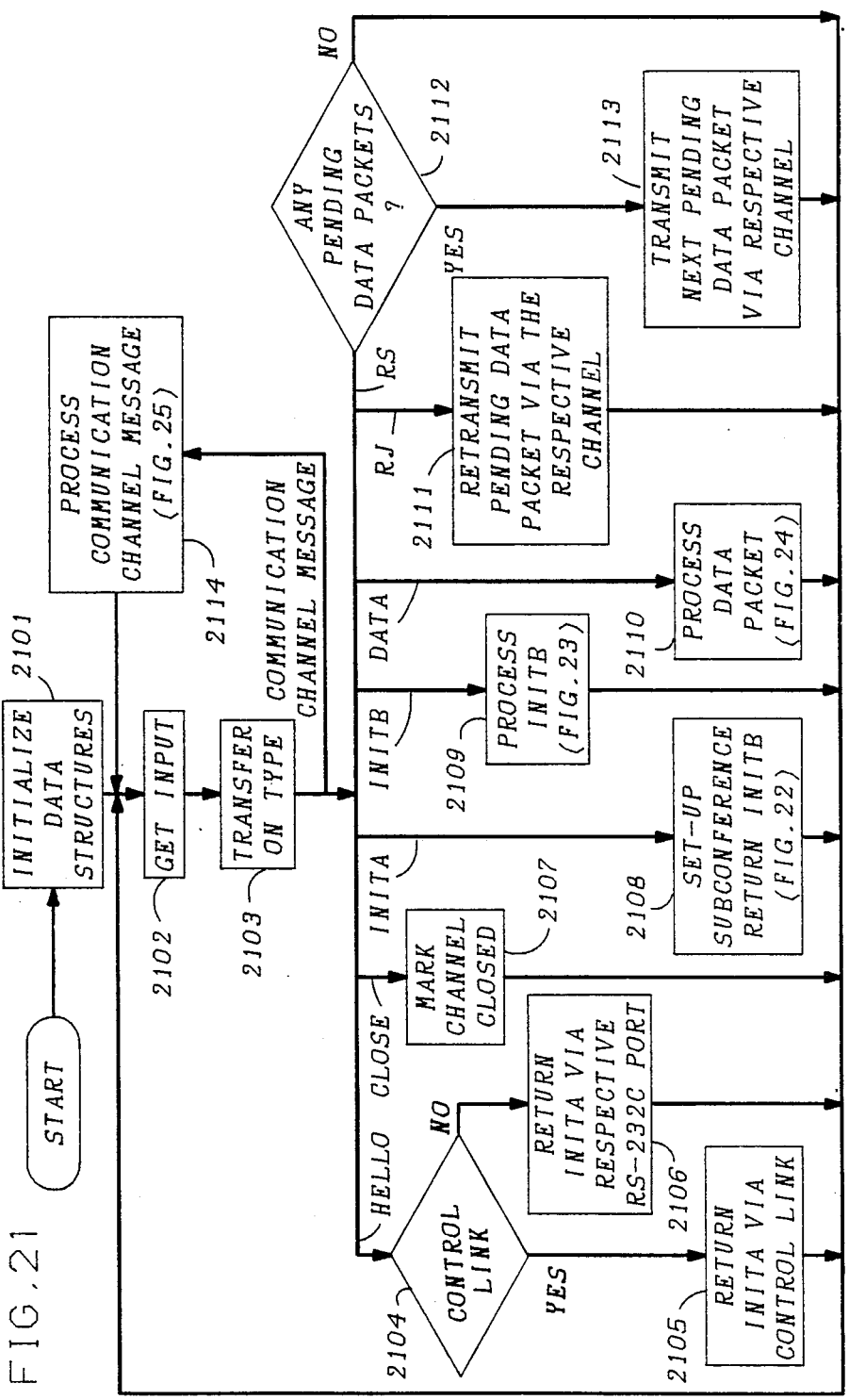
FIGS. 21–25 are flowcharts describing the operation of the data bridge of FIGS. 1 and 2 in relation to, inter alia, establishing an audiographics conference connection and the routing of data packets.

Turning then to FIG. 21, there is shown the flow chart of the program which controls the operation of data bridge 110. In particular, when data bridge 110 is first turned on, the program stored therein proceeds to block 2101. At block 2101, the program initializes various data structures stored in internal memory, such as RAM (not shown), one such data structure being table 70 shown in FIG. 20. The program then proceeds to block 2102 where it waits for receipt of a stimuli (input) from one of the circuits that it serves, e.g., processor 103, or a PC. Such a stimuli could be either a data packet or a message from system port 200-3 indicating that one of the RS-232C ports 110-1 through 110-N has been seized, i.e., has gone from an idle state (on-hook) to a busy state (off-hook). The program proceeds to block 2103 when it receives a stimuli and then transfers to one of a number of different locations in the program based on the nature of the stimuli. For example, the program proceeds to block 2104 if the stimuli happens to be a message from port system 200-3.

Specifically, at block 2104, the program examines the port address contained in the message to identify which one of the RS-232C ports has been seized. The program proceeds to block 2105 if the address identifies RS-232C port 110-1, the third-party call control link. Otherwise, the program proceeds to block 2106, indicating that one of the ports 110-2 through 110-N has been seized. At block 2105, the program acknowledges receipt of the message by sending to processor 103 an INITA via the aforementioned third-party call control link. The program then returns to block 2102. Similarly, at block 2106, the program returns via the newly seized RS-232C port a message containing an INITA and the address of the conference channel assigned to the respective port. The program then returns to block 2102.

If the stimuli, on the other hand, happens to be a data packet, then the program transfers to one of a number of other locations in the program based on the type of message contained in the packet. (As discussed above, the message type is identified by the XXX field of the packet header.)

In particular, the program at block 2103 proceeds to block 2107 if it finds that the packet contains a "close" message. Once at block 2107, the program closes the logical channel identified in the CN field of the packet header. The program does this by clearing entries made in table 70 and various activity lists for that channel and the respective RS-232C port. The program then proceeds to block 2102 to await the next input.

If the program at block 2103 finds that the packet contains an INITA message, which, as mentioned above, is indicative of a request to establish a subconference connection, then it proceeds to block 2108. An expanded version of block 2108 is shown in FIG. 22.

Figure 22:
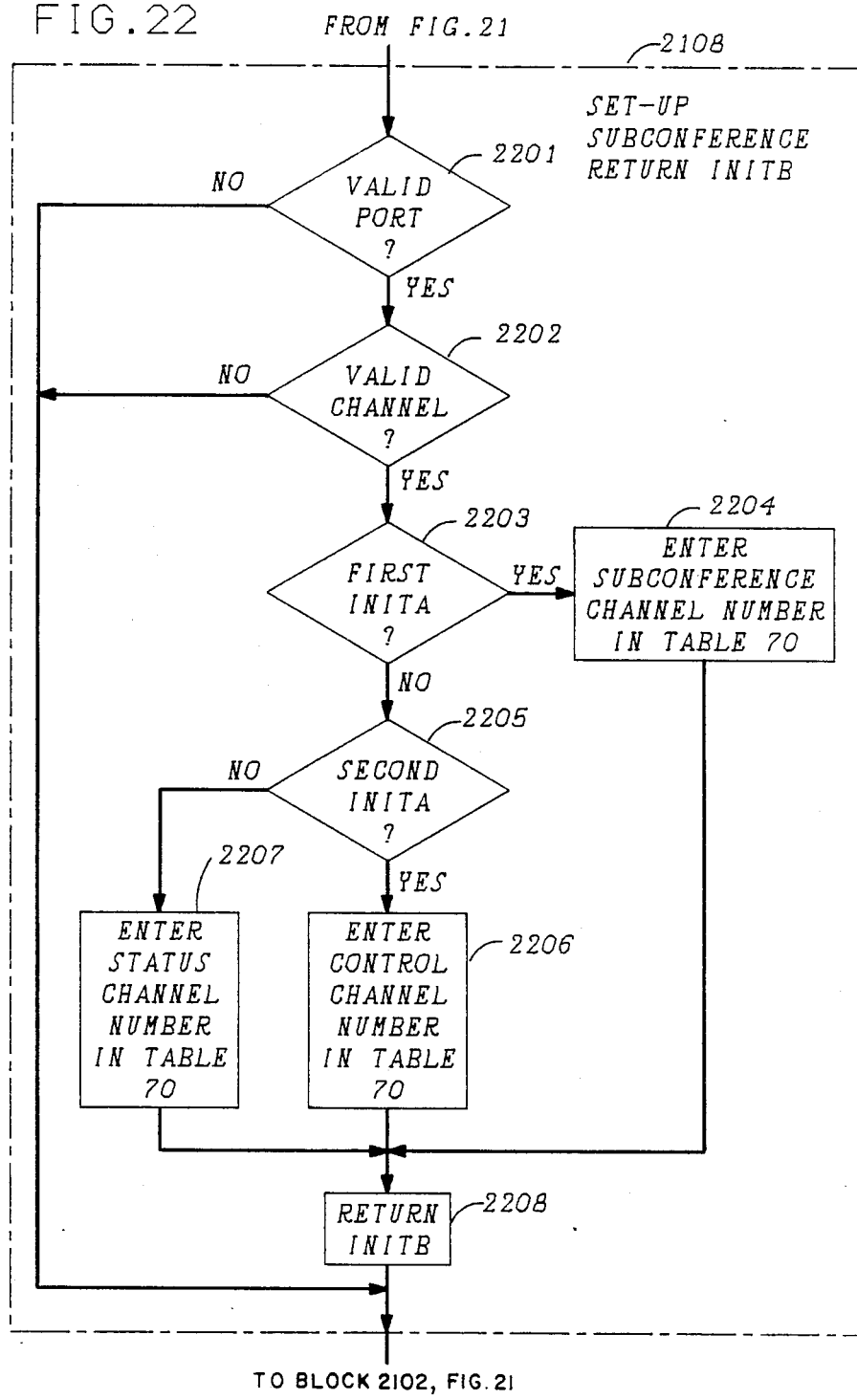

Turning then to FIG. 22, the program at block 2201 determines if the INITA message had been received from an RS-232C port that is connected to an originator of an established conference connection. In the present implementation of the invention, the program makes this determination by comparing the address of the RS-232C port from which the packet was received with the address of RS-232C port 110-2. Alternatively, in the case where RS-232C port 110-2 is replaced with a hunt group of such ports, then the program determines if the address corresponds with the address of one of the ports in that hunt group. In either case, the program proceeds to block 2202 if the addresses compare. Otherwise, it disregards the message and returns to block 2102 of FIG. 21.

At block 2202, the program checks routing table 70 to determine if the channel number contained in the CN byte of the message header matches the communication channel number assigned to the respective RS-232C port. The program proceeds to block 2203 to continue processing the INITA message if it finds that to be the case. Otherwise, it disregards the message and returns to block 2102 of FIG. 21. At block 2203, the program determines if the INITA message is the first such message received via the respective RS-232C port and proceeds to block 2204 if that is the case. Otherwise, it proceeds to block 2205.

At block 2204, the program enters in a table 70 CNF record the address of the respective RS-232C port and the conference channel number contained in the INITA message. The program then proceeds to block 2208 where it acknowledges the INITA by returning to the respective port an INITB message containing in the CN field thereof the number of the conference channel. The program then returns to block 2102 of FIG. 21 to await the next input.

At block 2205, the program proceeds to block 2206 if it determines that the INITA message is the second of such messages. Otherwise, it proceeds to block 2207. At block 2206, the program enters in a Table 70 CTL record the control channel number contained in the INITA message and then proceeds to block 2208. At block 2208, the program returns via the respective RS-232C port an INITB message containing the number of the control (status) channel that will be used during the subconference connection. The program then returns to block 2102 of FIG. 21 when it completes that task.

At block 2207, the program enters in a table 70 STAT record the status channel number contained in the INITA message and then proceeds to block 2208, where it returns the INITB acknowledgement, as discussed immediately above. The program then proceeds to block 2102 of FIG. 21.

If the program at block 2103 of FIG. 21 determines that the packet contains an INITB message, then it proceeds to block 2109. Block 2109 is shown in expanded form in FIG. 23. Before discussing FIG. 23, noted that the program employs a so-called circuit activity list (not shown) stored in the memory of data bridge 110 to track the status (e.g. off-hook or on-hook) of the RS-232C ports and the channel numbers that have been assigned to a port. The addresses of the RS-232C ports are stored in the list and each such address is separated by—illustratively nine—memory locations for the storage of nine respective channel numbers 1 through 9.

Figure 23:
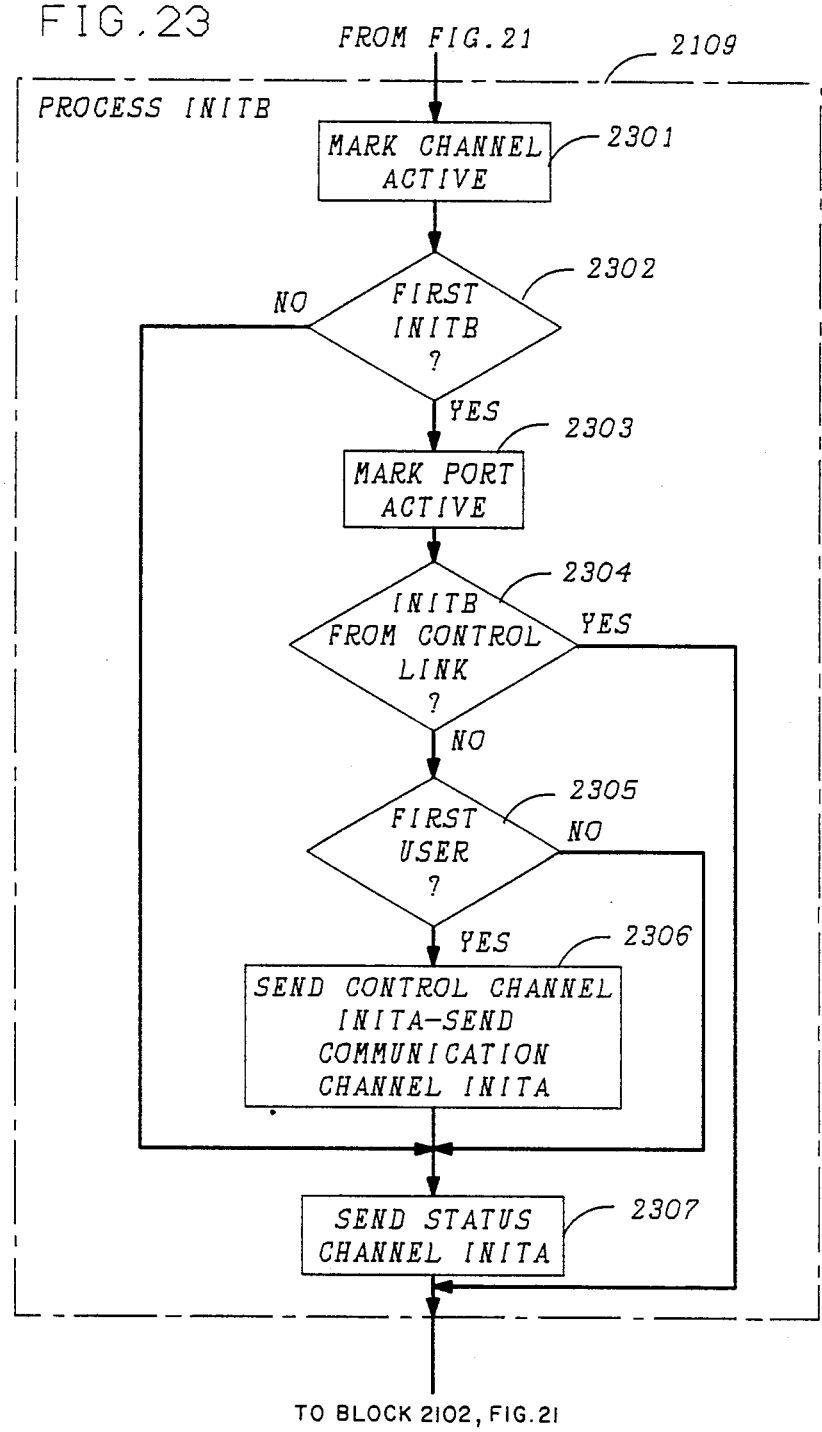

More specifically, when the program proceeds to block 2301 of FIG. 23, it indexes the activity list using the address of the respective port and the channel number contained in the CN byte of the newly received INITB message. The program also marks the channel number stored at the indexed location as being active. The program then proceeds to block 2302 to determine if the present message is the first INITB message that had been received from the respective RS-232C port as of the time that the latter went off-hook. The program makes this determination by checking the number of channel numbers which have been marked active in the activity list for the respective port. The program proceeds to block 2303 if it finds only one such number has been so marked. Otherwise, the program proceeds to block 2102 of FIG. 21 via block 2307.

At block 2303, the program marks the respective port active and proceeds to block 2304 where it determines if the INITB message was received from port 110-1 (i.e. the third-party call control link). If the program finds that to be the case, then it disregards the message and transfers to block 2102 of FIG. 21. Otherwise, it proceeds to block 2305. At block 2305, the program determines if the INITB had been received from the originator of the conference connection. The program makes this determination by checking the address of the respective RS-232C port to see if it corresponds with the address of RS-232C port 110-2. Alternatively, in the case where RS-232C port 110-2 is replaced by a hunt group of RS-232C ports, then the program checks to see if the address of the respective RS-232C port corresponds with the address of a port in that hunt group. In either case, the program proceeds to block 2306 if finds such correspondence. Otherwise, it proceeds to block 2307.

At block 2306, the program sends to the PC connected to the respective RS-232C port a message containing an INITA and the control channel number that the PC is to use during the conference connection. Following that task, the program sends another INITA message containing the communication channel number. The program then proceeds to block 2307.

At block 2307, the program "fills in" table 70 in the manner discussed above, and sends via the respective RS-232C port an INITA message containing the address of the status channel that the PC is to use during the conference connection. The program then proceeds block 2102 of FIG. 21 to await the next stimuli, or input.

Figure 24:
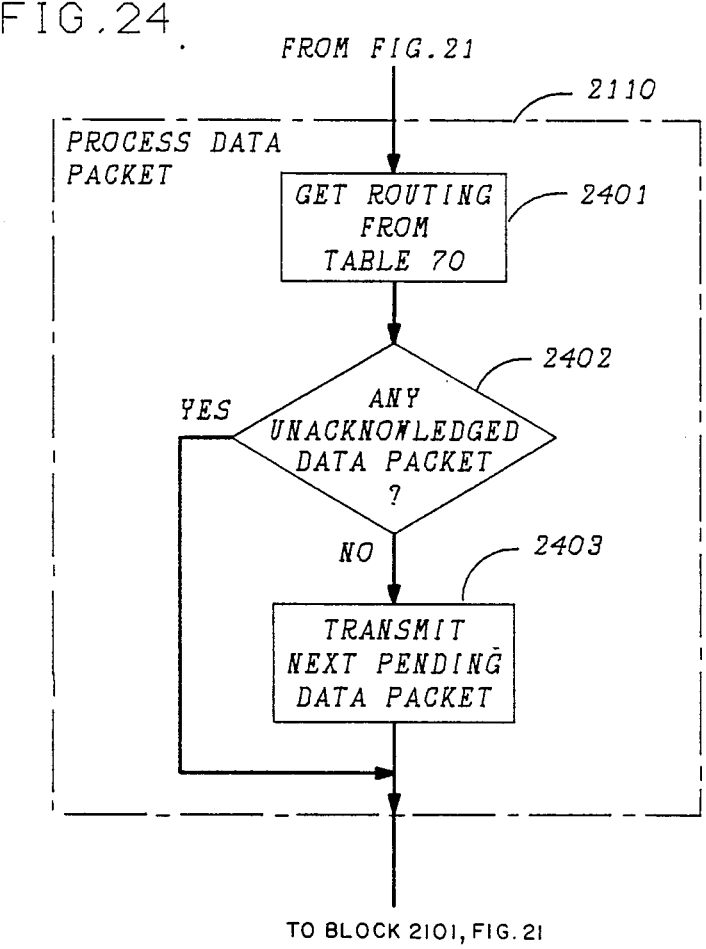

If the program at block 2103 of FIG. 21 determines that the newly arrived packet is a data packet, then it proceeds to block 2110 to process the packet. An expanded version of block 2110 is shown in FIG. 24. Specifically, at block 2401 of FIG. 24, the program determines the routing of the data packet by first checking the tt field of the packet header. If the tt field indicates that the packet is a third-party call control packet, then the program routes the packet to processor 103. The program does this by storing the packet in a buffer reserved for RS-232C port 110-1. If the tt field indicates that the packet is not a control packet, then the program determines the routing of the packet using table 70 based on the address of the RS-232C port from which the packet was received and the address contained in the CN field of the packet header. For example, if the address of the RS-232C port happens to be 2 and the address in the CN field of the packet happens to be 1, identifying the conference channel, then the program stores the data portion of the packet in data buffers reserved for port address 3/channel number 2(PC2 conference channel) and port address 2/channel number 1 (PC4 conference channel), respectively, as determined from the first line of table 70. The program then proceeds to block 2402.

It is noted that blocks 2402 and 2403 consititute a loop in the program to handle the case where the routing information obtained at block 2401 identifies more than one recipient of the newly received data packet.

In particular, if such routing information identifies only one recipient, then the program checks to see if it is waiting for an acknowledgement from that recipient. If that is the case, then the program returns to block 2102 of FIG. 21. Otherwise, the program proceeds to block 2403 where it unloads the data from the buffer reserved for the identified recipient, forms the data into a packet by prepending the appropriate header thereto and sends the newly formed packet to the recipient via the recipient's respective RS-232C port and logical channel obtained at block 2402. The program than proceeds to block 2102 of FIG. 21 to await receipt of the next input. If, on the other hand, the routing information identifies more than one recipient, then the program returns to block 2402 to repeat that task for next identified recipient. The program proceeds to block 2102 of FIG. 21 when the last of the identified recipients has been served.

Continuing with FIG. 21, the program at block 2103 proceeds to block 2111 if it determines that the newly arrived packet contains a packet reject (RJ) message. At block 2111, the program retransmits the data packet whose sequence number compares with the sequence number contained in the newly arrived RJ packet. The program then returns to block 2101 of FIG. 21. The program, on the other hand, proceeds to block 2112 if it finds that the newly received packet contains a ready receive (RR) message. At block 2112, the program checks the data buffer reserved for the RS-232C from which the ready-receive message was obtained and the address of the logical channel identified in the CN field of the message. If the buffer contains data, then the program proceeds to block 2113 where it forms the data into a packet and sends it to the respective recipient. Otherwise, the program returns to block 2102 to await the next input.

At block 2103, the program proceeds to block 2114 if it finds that the contents of the CN byte of the newly arrived packet corresponds with the communication channel number assigned to the RS-232C port from which the packet was received and the packet is not INITA message. Block 2114 is shown in expanded form in FIG. 25.

Figure 25:
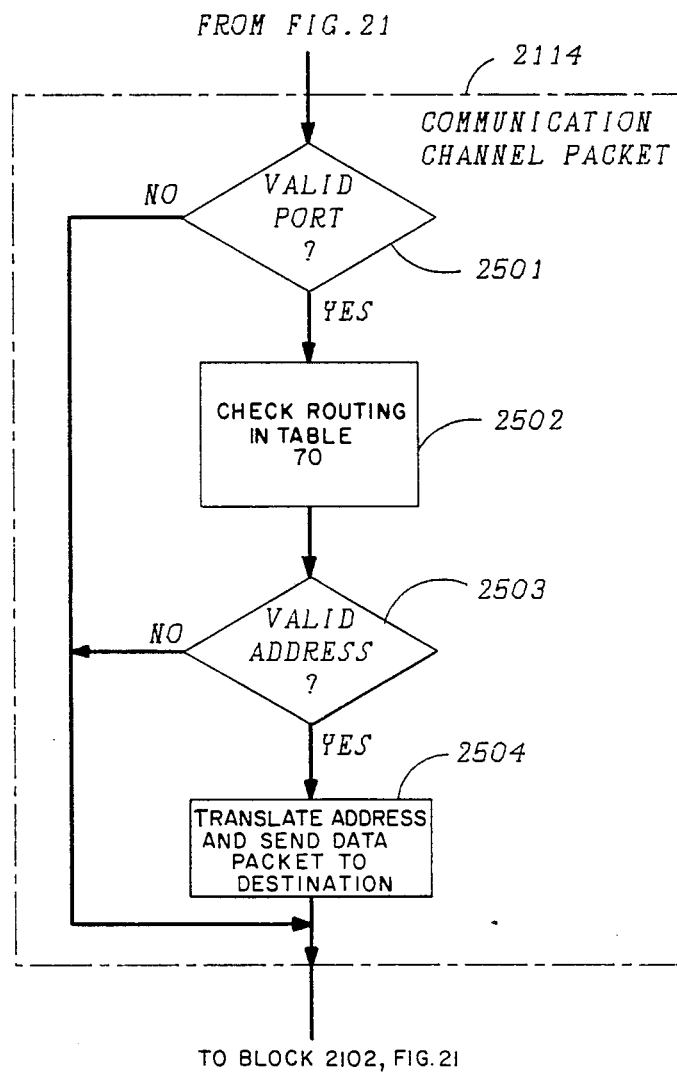

Turning then to FIG. 25, the program at block 2501 checks the address of the respective RS-232C port to see if it is a communication channel connection. The program does this by "looking" for the appropriate entry in table 70. If the port is invalid, then the program returns to block 2102 of FIG. 21. Otherwise, it proceeds to block 2502.

At block 2502, the program translates the received port number into a destination RS-232C port address and then proceeds to block 2503. At block 2503, the program checks to see if the translated address is the address of one the RS-232C ports 110-3 through 110-N. The program proceeds to block 2504 if it finds that to be the case. Otherwise, it considers the newly arrived packet to be invalid and proceeds to block 2102 of FIG. 21. At block 2504, the program establishes a table 70 routing link between the translated RS-232C port address and the address of the RS-232C port which sent the packet, in the manner discussed above in connection with FIG. 20. The program then packages the received data contained in remaining bytes of the communication channel message into a data packet and transmits that packet to the translated port address. The program then returns to block 2102 to await the next input.

Figure 26:
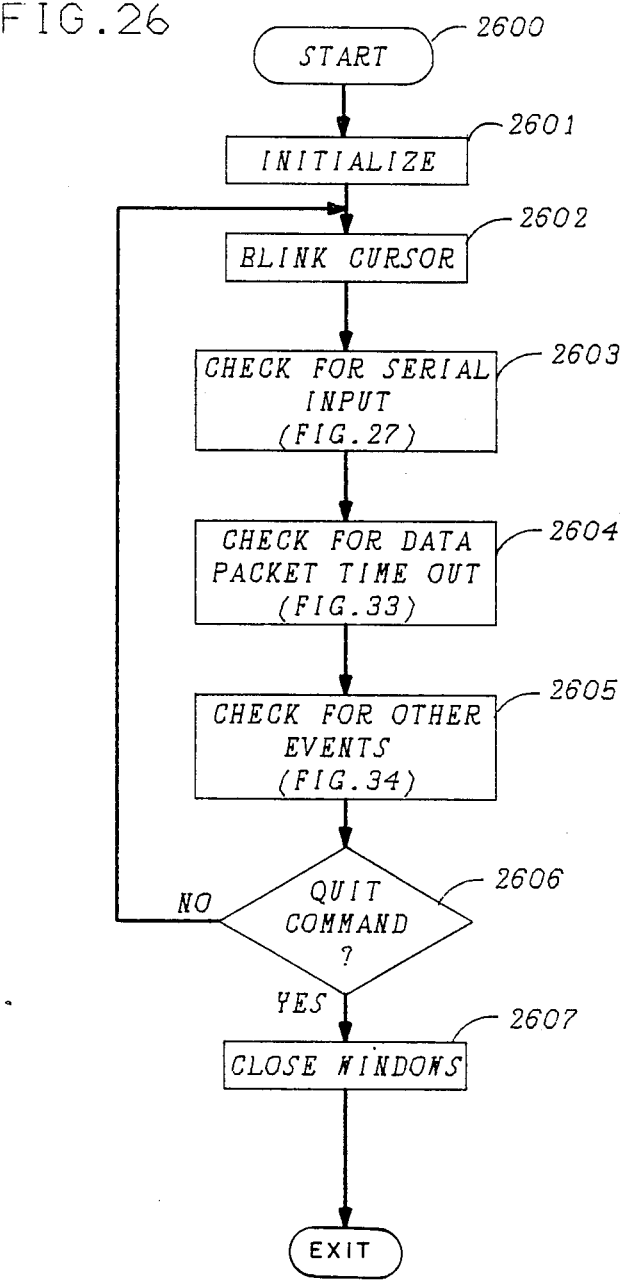
FIGS. 26-37 are flowcharts describing the operation of each of the personal computers of FIGS. 1 and 2 in relations to, inter alia, establishing an audiographics conference connection, processing data packets and displaying text and/or graphics in accordance with the invention.

Illustrated in FIG. 26 is an overview of the software program that is stored in each PC shown in FIGS. 1 and 2. The program begins operation as a result of the user inputting a conference command, as mentioned above. When the program is entered, it proceeds to block 2601 where initializes various pointers and memory locations. For example, it initializes the aforementioned bit-map field and text buffer as well as pointers used to store incoming and outgoing data packets. Memory locations used for the storage of the various channel numbers are also initialized. When the program completes this task, it displays workspace window 20 on the display of the user's computer, as discussed above. The program then proceeds to block 2602.

Block 2602 represents a software routine which displays the screen cursor for a period of one second and then erases the cursor from the screen for a like amount of time, i.e. it causes the screen cursor to "blink". The program does this by checking to see if a period of one second has elapsed since the last time it changed the state of the screen cursor. If that is the case, then the program changes the state of the screen cursor accordingly and refreshes the display. The program then proceeds to block 2603.

Block 2603 represents a software program which interfaces the user's PC with data bridge 110. For example, the program "reads in" a data packet received from data bridge 110, performs error checking on the packet, and processes the packet according to its type. A more detailed representation of Block 2603 is shown in FIG. 27.

Figure 27:
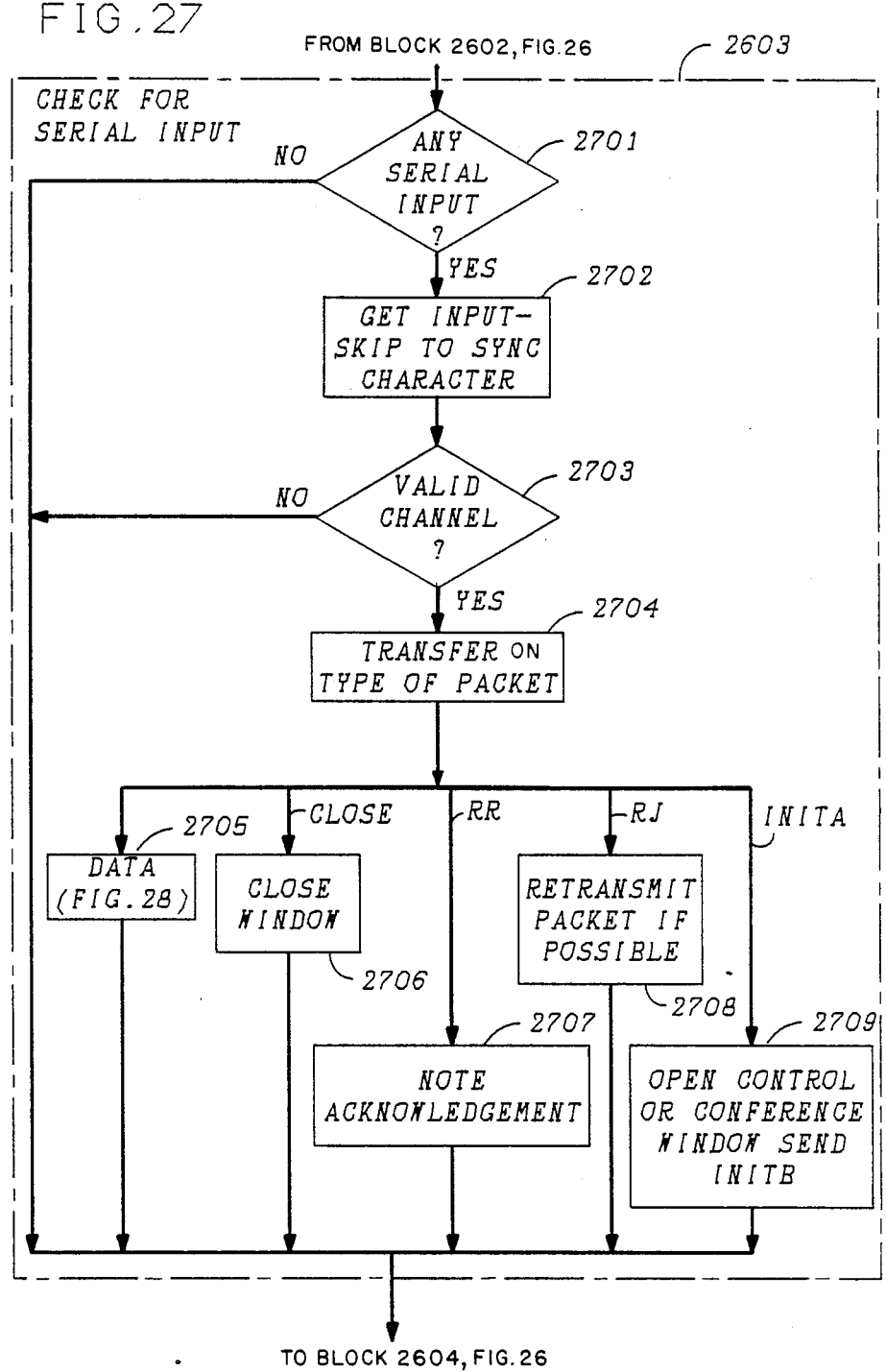

Turning then to FIG. 27, the program at block 2701 scans the input from the associated system port circuit for the reception of a data packet. The program transfers to block 2702. If a data packet is being received. Otherwise, it proceeds to block 2604 of FIG. 26. At block 2702, the program stores the received packet in a buffer and then "looks for" the packet sync field to determine the starting point thereof. Armed with the starting point, the program then unloads the channel number from the packet CN field. The program accepts the packet and proceeds to block 2704 if the unloaded channel number corresponds to one of the channel numbers that have been assigned to the respective PC. The program proceeds to block 2704 if it finds that to be the case. Otherwise, the program disregards the packet and proceeds to block 2604 of FIG. 26.

At block 2704, the program transfers to one of the blocks 2705 through 2709 based on the type of data that is contained in the packet. In particular, the program transfers to block 2709 if the packet contains an INITA. At block 2709, the program opens (displays) a control, conference or status window based on an identifier contained in the INITA packet received from data bridge 110. The program proceeds to block 2604 of FIG. 26 when it completes that task.

If the program finds that the packet contains a packet reject message (RJ), then it proceeds to block 2708 where it retransmits the last packet that it transmitted to data bridge 110. If, on the other hand, the packet contains an RR (ready request) message, then the program proceeds to block 2707 where it transmits the next packet in its buffer, if any. If the program at block 2704 finds that the packet contains a close window command, then the program proceeds to block 2706. At block 2706, the program closes the window associated with the channel number contained in the CN field of the packet. The program proceeds to block 2604 of FIG. 26 from either block 2606, 2607 or 2608. If the packet, on the other hand, contains conference data, then the program proceeds to block 2705. An expanded version of block 2705 is shown in FIG. 28.

Figure 28:
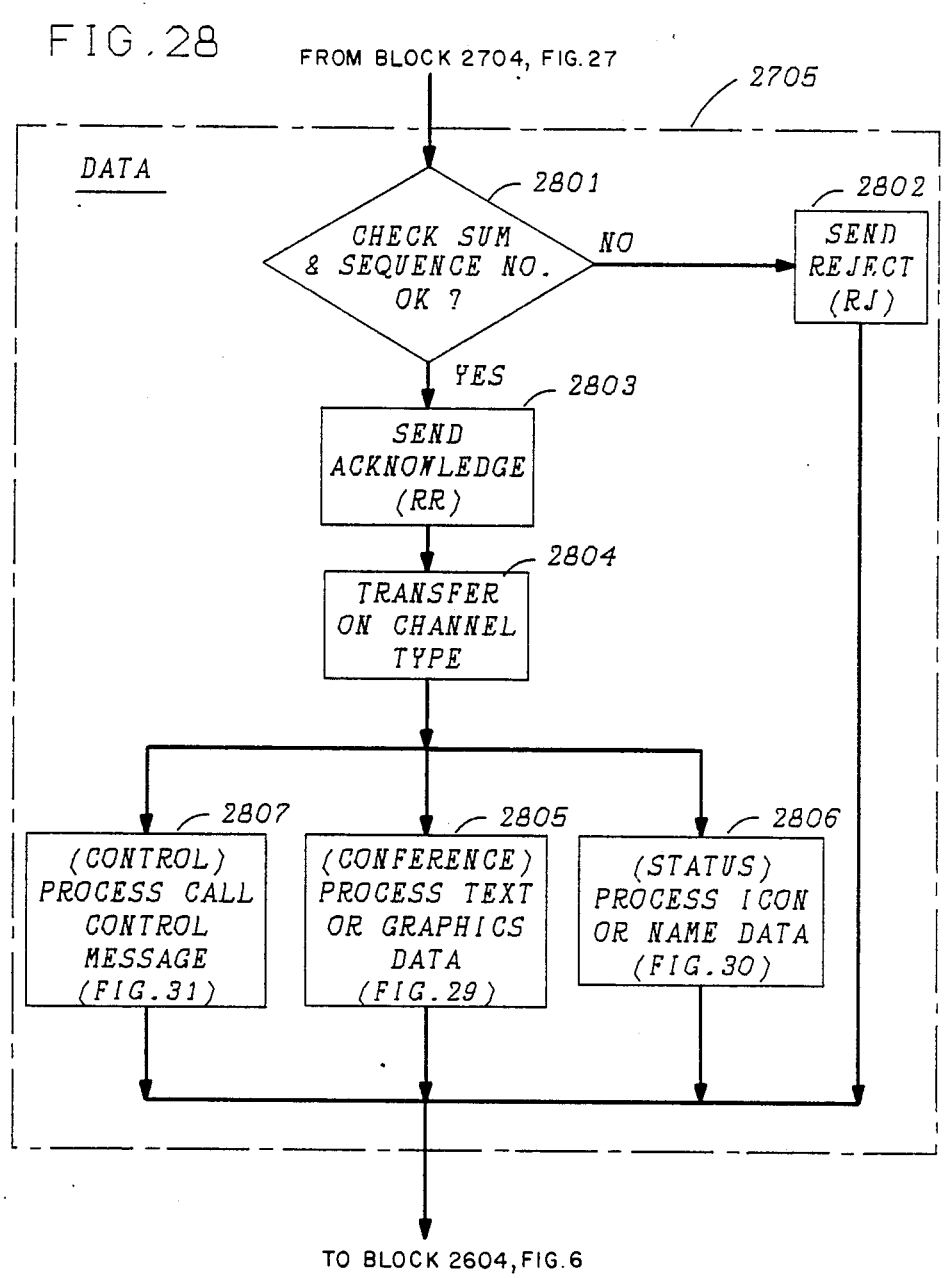

Turning then to FIG. 28, the program at block 2801 performs a checksum on the content of the packet header, and a checksum over the data contained in the data field of the packet. The program also checks the sequence number of the packet, as discussed above. If either checksum fails, or sequence number check fails then the program proceeds to block 2802 where it rejects the packet and notifies data bridge 110 of the rejection in the manner discussed above. Otherwise, the program proceeds to block 2803 where it sends to data bridge 110 a packet acknowledgement (RR). The program then proceeds to block 2804 where it proceeds to one of the blocks 2805 through 2807 based on the channel number contained in the CN field of the packet header. For example, if the channel number corresponds to the PC's conference, status or control channel then the program transfers to block 2805, 2806 or 2807, respectively. A detailed flow chart of each of the blocks 2805 through 2807 is shown in FIGS. 29 through 31, respectively.

Figure 29:
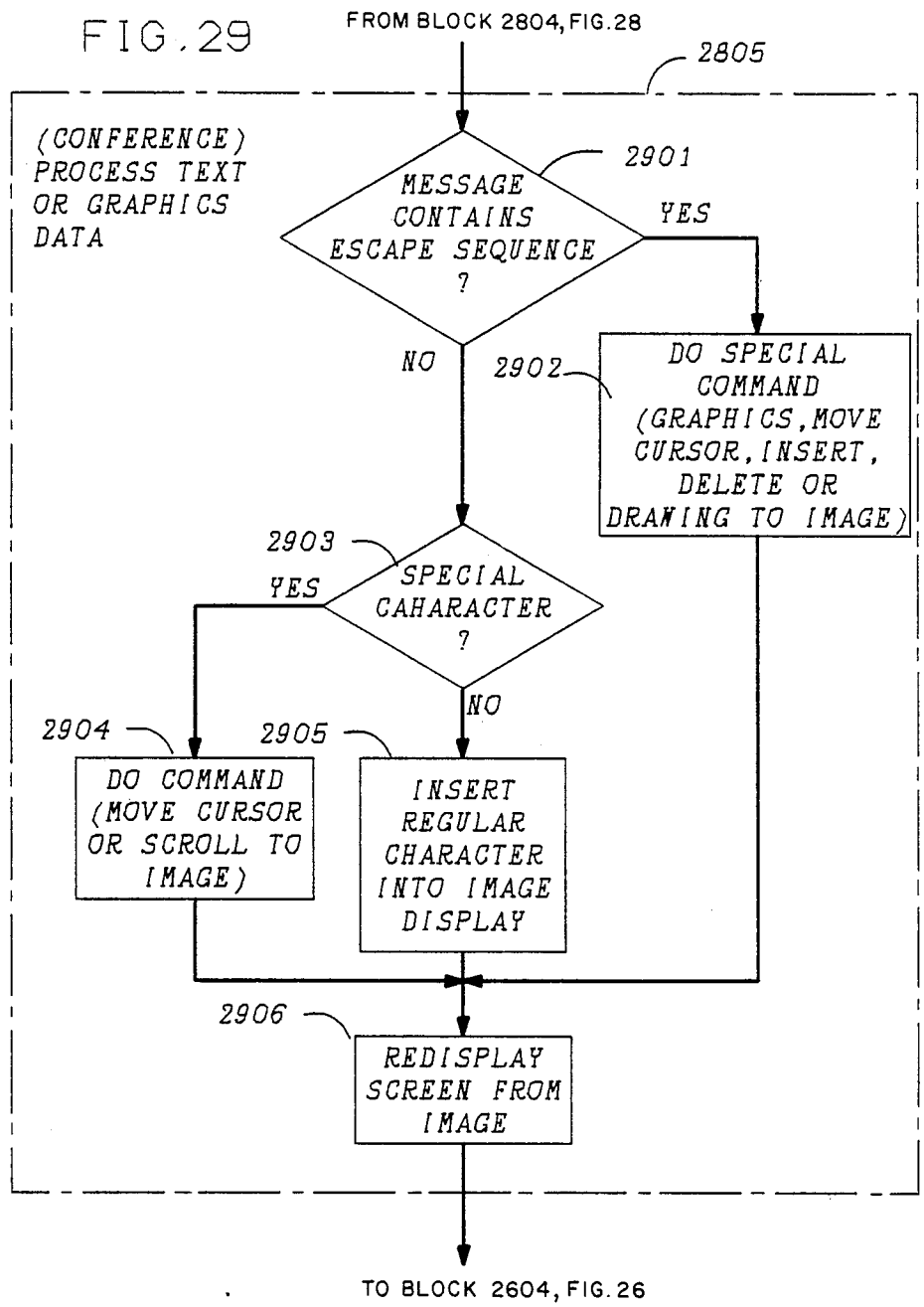

Turning first to FIG. 29, the program at block 2901 checks the data field of the packet to see if it contains a so-called escape sequence, i.e., an instruction representing graphics that is to be drawn in the conference window. The escape sequence could also be an instruction to insert or add a pattern to existing graphics displayed in the conference window. If the program finds that to be the case, then it proceeds to block 2902. Otherwise, it proceeds to block 2903. At block 2902, the program converts the instructions into respective bit-map field memory locations and stores respective picture elements at those locations in order to "draw" the image in the bit-map field. The program then proceeds to block 2906 to refresh the display using the current version of the bit-map field, after which the program proceeds to block 2604 of FIG. 26.

At block 2903, the program determines if the data contained in the packet corresponds to a so-called special character that is to be displayed in the conference window. A special character could be, for example, a simulated carriage return, tab or backspace as represented by the movement of the screen cursor. The program transfers to block 2904 if it finds that to be the case. Otherwise, the program considers the instruction to be directed to drawing a regular character into the bit-map field and proceeds to block 2905. The program at either block 2904 or 2905 processes the instruction in manner discussed in connection with block 2902. The program then proceeds to block 2906 to refresh the display.

Figure 30:
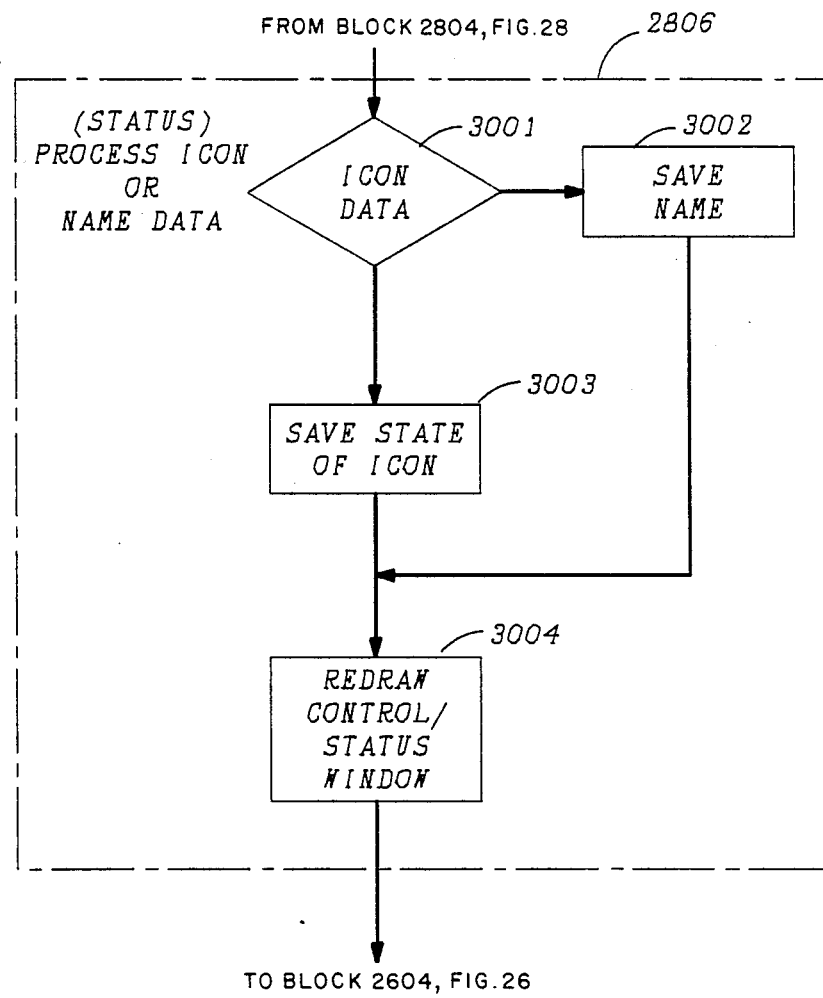
Figure 31:
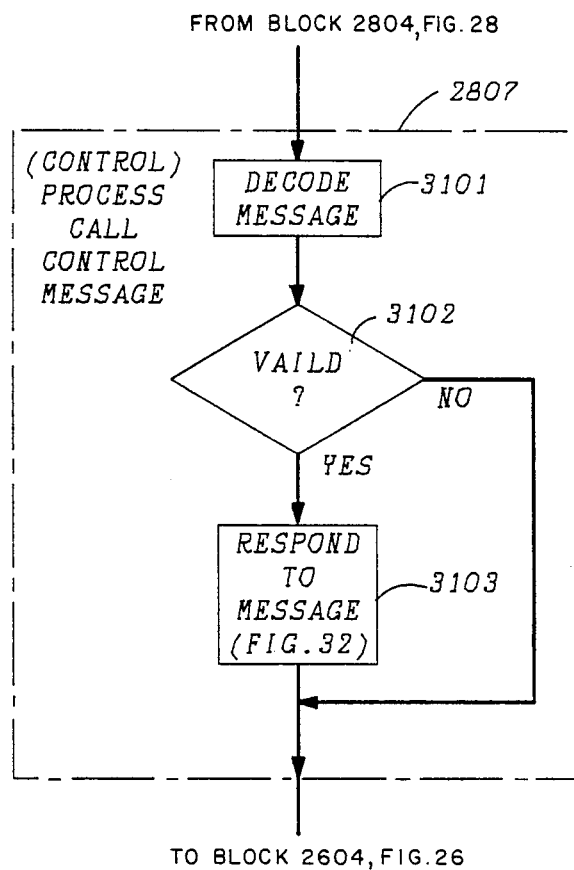

Turning next to FIG. 30, there is shown a detailed version of block 2806 of FIG. 28. The software routine shown in FIG. 28 maintains status window 60 during the course of an audiographics conference connection. To this end, the program inserts the respective names of the conferees in conference window 60 and maintains the state of the associated icons in accordance with instructions contained in the data packet that it is processing. Specifically, at block 3001, the program determines if the packet instruction is directed to one of the status window 60 icons or names. The program proceeds to block 3003 if finds that the instruction pertains to an icon. Otherwise, the program proceeds to block 3002.

At block 3003, the program modifies the bit-map field in accordance with the instructions contained in the packet and proceeds to block 3004. At block 3004, the program refreshes the display using the current version of the bit-map field and text display buffer. The program then proceeds to block 2604 of FIG. 26. At block 3002, the program stores the name in the text display buffer and then proceeds to block 3004.

Turning now to FIG. 31, there is shown a more detailed version of block 2807 of FIG. 28. The flow chart shown in FIG. 31 represents that portion of the program which processes the various third-party call control messages exchanged between the PC which originates the conference connection and call processor 103, as discussed above. In particular, at block 3101, the packet is parsed into predetermined components (header and data field), after which, the program proceeds to block 3102. At block 3102, the program checks the contents of the data field to determine if the field contains a call control message. The program proceeds to block 3103 if it finds that to be the case. Otherwise, it proceeds to block 2604 of FIG. 26. An expanded version of block 3103 is shown in FIG. 32.

Figure 32:
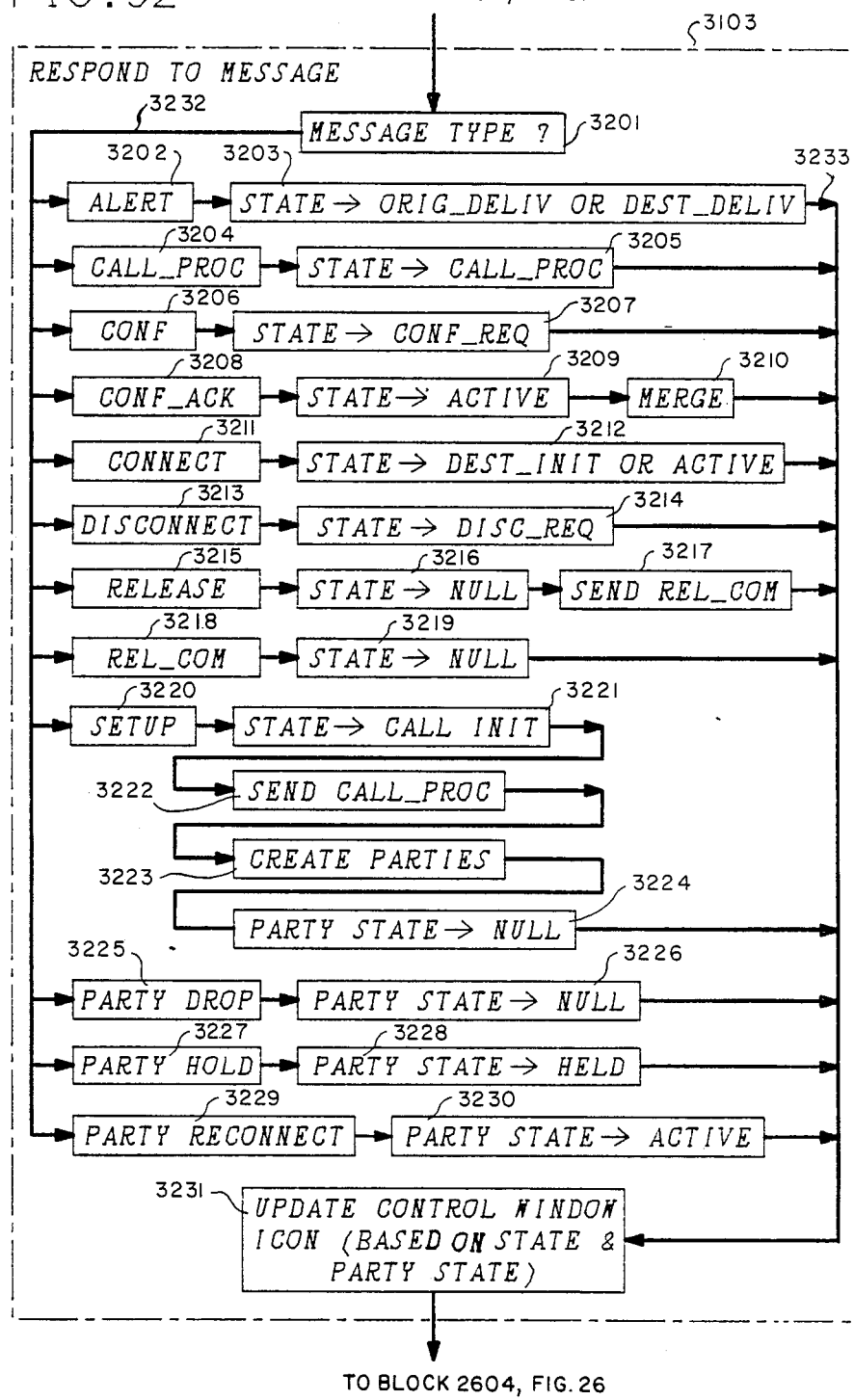

FIG. 32 more or less represents as state diagram which directs the progress of the program based on the information contained in various third-party call control messages. The program classifies each such message at block 3101 and then proceeds to one of the states connected to path 3232 to process the message. That is, in response to each kind of message, the program assigns thereto an internal state. In addition, an internal state may be changed to a new state value based on the classification (type) of a succeeding third-party call control message. As will be pointed out below, a new state value may depend on a prior state value.

In particular, the program proceeds to block 3203 if the message type happens to be a so-called ALERT message. At block 3203, if the prior call state happened to be a so-called NULL state, then the program proceeds to block 3203 where it changes the current call state to ORIG_DELIV and allocates space in an internal table for the conference call. Otherwise, the call state is changed to DESET_DELIV.

If the message type happens to be CALL_PROC, then the program proceeds to block 3204 and at block 3205 changes the call state to CALL_PROC. A message type of CONF, on the other hand, causes the program to proceed to block 3206 and then to block 3207 where it changes the call state to CONF_REQ. In the case of CONF_ACK message type, the program proceeds to block 3208 and then to block 3209 where it changes the call state to ACTIVE. The program then proceeds to block 3210 where it merges (conferences) the two calls into a single call. It is noted that such merging takes place in the internal tables of the program.

The program proceeds to block 3211 in the case where the message type happens to be CONNECT. The program then proceeds to block 3212 where it changes the call state to DEST_INIT if the prior state happened to be ORIG_DELIV. Otherwise, the call state is changed to ACTIVE, and the party state of each conferee of the connection is changed to active. In the case where the message type is DISCONNECT, then program proceeds to block 3213 and thence to block 3214 where it changes the call state to DIS_REQ. A RELEASE message type, on the other hand, causes the program to proceed to block 3215 and then to block 3216 where it changes the call state to NULL. The program also discards the record of the call that it had stored in the aforementioned internal table. In addition, the program sends to data bridge 110 a so-called REL_COM message.

The program proceeds to block 3218 when the message type is REL_COM and then proceeds to block 3219 where it changes the call state to NULL and discards the record of the call stored in the internal table. The program, on the other hand, proceeds to block 3220 when the message type is SETUP and then proceeds to block 3221 where the call state is changed to CALL_INIT. The program also allocates space in its internal table to the call. The program then proceeds to block 3222 where it sends to data bridge 110 a so-called CALL_PROC message. The program then proceeds to block 3223. At block 3223, the program allocates a record in its internal table to the two calls being conferenced together and then proceeds to block 3224. At block 3224, the program sets the call states of the two conferees (parties) to NULL.

In the case where the message type is PARTY_DROP, then the program proceeds to block 3226 via block 3225. At block 3226, the program changes the call state to NULL. If the message type happens to be PARTY_HOLD, then the program proceeds to block 3228 via block 3227. At block 3228, the program changes the call state to HELD. Whereas, the program proceeds to block 3230 via block 3229 for a message type of PARTY RECONNECT. At block 3230, the program changes the call state of the particular party (conferee) to active.

It is seen from FIG. 32, that the program proceeds to block 3231 via path 3233 after it has changed, or updated the state of a call (call state). At block 3231, the program updates the various icons formed in control window 60 based on the current state of the call. For example, if the call state is NULL, CALL_INIT or CALL_PROC, then the respective party icons are shown in the idle state, as illustrated in FIG. 9 for icon 60-13. For the call state of ORIG_DELIV the originator's icon (60-11) is shown in the alerting state and the icon of the party being conferenced therewith (e.g., icon 60-12) is shown idle. For the call state of DEST_INIT, the originators icon 60-11 is shown active (FIG. 9), and the icon of the destination party being conferenced therewith is shown in the alerting state (e.g., icon 60-12 shown in FIG. 9).

For the call state of DISC_REQ or NULL the icon is shown idle. Whereas, it is shown active for the call state of CONF_REQ. For the call state of ACTIVE, then the state of the icons depend on the party state of each party (conferee). For the hold state, then the respective icon, e.g., icon 60-12, is shown in the hold state. In the remaining states discussed above, the respective icon is shown active.

Figure 33:
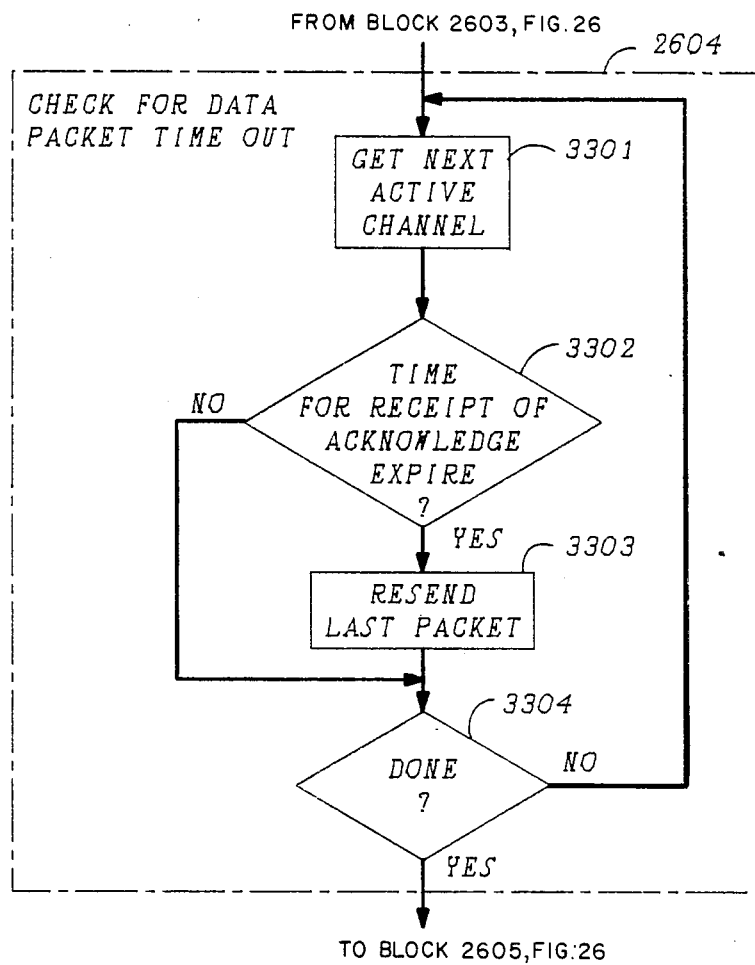

Having completed a discussion of block 2603, we now turn to a discussion of block 2604 of FIG. 26. At block 2604, the program checks for unacknowledged data packets previously sent to data bridge 110. A detailed version of block 2604 is shown in FIG. 33. It is noted that a data packet may be sent to data bridge 110 via each of the logical channels assigned to the associated PC, including those channels assigned to a subconference connection. Thus, the program could be awaiting receipt of more than one packet acknowledgement from data bridge 110. Accordingly, blocks 3301 through 3304 comprise a looping program which is traversed for each such packet.

In particular, at block 3301, the program checks to see if a data packet had been sent to data bridge 110 via a particular logical channel and proceeds to block 3302 if it finds that to be the case. Otherwise, the program proceeds to block 2605 of FIG. 26. At block 3302, the program determines if a predetermined period of time—illustratively one-half second—has elapsed since the packet was sent. The program does this by checking the contents of a counter associated with the respective channel. Such counters are stored in the memory of the PC, and are started when a packet is sent to data bridge 110. Memory checks to see if it has started a counter stored in memory for the respective packet. Thus, the program proceeds to block 3304 if it finds that the contents of the respective counter corresponds to one-half second. Otherwise, it increments the counter and stores it in memory and proceeds to block 3304. At block 3303, the program retransmits the packet, and restarts the associated counter. The program then proceeds to block 3304.

At block 3304, the program checks to see if a data packet had been sent to data bridge 110 via another one of the assigned logical channels and transfers to block 3301 if that is the case. Otherwise, the program proceeds to block 2605 of FIG. 26.

Figure 34:
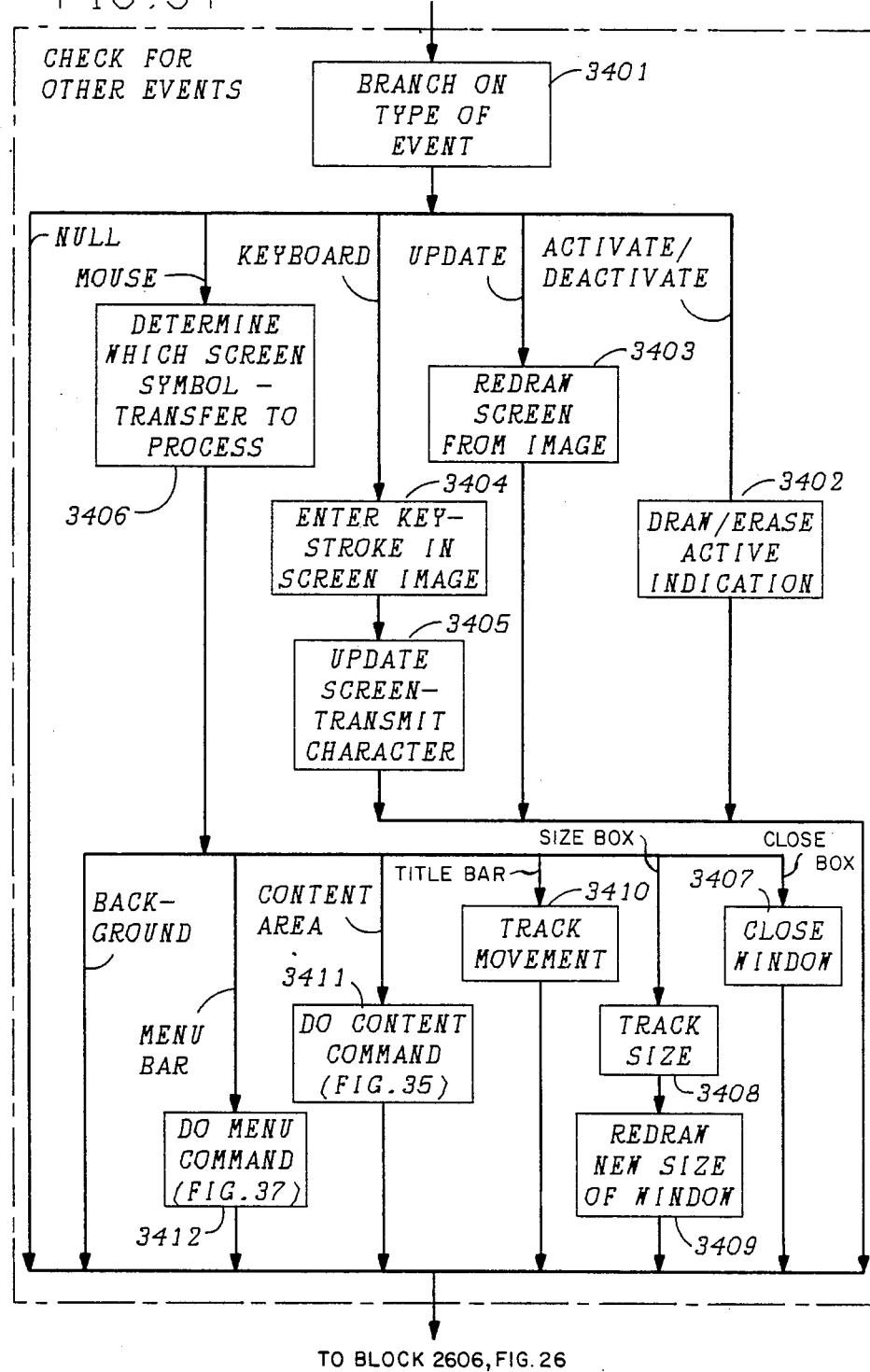

Block 2605 represents that portion of the program that is driven by various events that may occur during the course of a conference session. An event may be, for example, a keystroke inputted by the user operating the PC keyboard, the movement of the mouse cursor, the operation of the mouse key by the user, etc. Such events may occur at any time and in any order. The program stores each event in a PC memory queue and processes an event in order in the which it occurs. An expanded version of block 2605 is shown in FIG. 34.

At block 3401, the program branches to one of number of different locations in the program based on the type of event that has been unloaded (read) from the queue. If, one the other hand, the queue is empty, then the program proceeds to 2606 of FIG. 26.

Specifically, if the event is identified as being a so-called null event, such as no operation (NOP), then the programs disregards the event and proceeds to block 2606 of FIG. 26. It is noted that the events remaining in the queue are processed during succeeding entries into block 2605. If an event is identified as being a so/called activate-deactivate event, then the program proceeds to block 3402.

The program at block 3402 adjusts the appearance of a window based on whether the window is active or inactive. An active window, for example, window 20 shown in FIG. 3, is distinguished from an inactive window by having its title set-off by stripes 32. In addition, close box 23, size box 31 and scroll bars 24, 25, and 26 are displayed in a active window. These distinguishing features are not displayed in an inactive window, such as, for example, window 50 shown in FIG. 7. The underlying window system thus ensures that only those parts of a window not obscured by another window are actually drawn on a screen.

If the event is identified as being a redraw command, inputted by the user, then the program proceeds to block 3403 where it repaints the PC display using the graphics contained in the bit-map field and text contained in the text buffer. The program then proceeds to block 2606 of FIG. 26. Whereas, the program proceeds to block 3404 if the event is a keystroke entry. At block 3404 the program enters the keystroke in the text buffer and proceeds to block 3405 where it repaints the display using the current version of the text buffer. The program then transmits the keystroke to the other PCs via its conference channel and data bridge 110, as discussed above. The program then proceeds to block 2606 of FIG. 26.

Alternatively, the program proceeds to block 3406 if it finds that the event pertains to the movement of the mouse cursor and the user has operated the mouse control button. It is noted that currently there exists a number of well-known programs that are available which track the movement of the mouse cursor and respond to the operation of the mouse button when the mouse cursor is pointing to a displayed icon, object or function key. The portion of the instant program represented by blocks 3406 through 3412 is one version of such a program. It is noted that the program does not ordinarily track the movement of the mouse cursor. Such tracking is done by the PC operating system, which could be, for example, the well-known MSDOS operating system. As such, a discussion of blocks 3406 through 3412 and detailed versions thereof will be brief.

Continuing, at block 3406, the program proceeds to one of the blocks 3607 through 3612 based on whether, for example, the mouse cursor is pointing to a function key, such as one of the function keys 28-1 through 28-4 shown in FIG. 3, or an icon or is being "dragged" across the screen. It is noted that if the mouse cursor is found to be pointing to an area where a pattern, or image is not being displayed, (i.e., background) then the program does not respond thereto and proceeds to block 2606 of FIG. 26.

Specifically, the program proceeds to 3607 when it determines that the mouse cursor is pointing to Close Box icon 23, shown in FIG. 3. The program responsive thereto closes (erases) the window that is currently active, i.e. the window that is displayed in the foreground. The program then proceeds to block 2602 of FIG. 26. The program proceeds to block 3608 when it finds that the mouse cursor is pointing window icon 31, shown in FIG. 3. At block 3608, the program increases the size of the active window by redefining its size in the associated bit-map field. The program then proceeds to block 3609 where it refreshes (redraws) the display using the current version of the bit-map field. The program then proceeds to block 2606 of FIG. 26. It noted that the program will enter block 3608 during succeeding passes through the program as long as the user continues to point the mouse at window icon 31 and is operating the mouse control button.

The program proceeds to block 3410 when it determines that the user has operated the mouse control button when the mouse cursor is positioned in the title bar of the current window. Specifically, the program at block 3410 moves the position of the current window in response to and in the direction that the mouse cursor is moved by the user. When the user releases the mouse control button, the program erases the outline of the current window and redraws it at the current position of the mouse cursor. The program then proceeds to block 2606 of FIG. 26.

Figure 35:
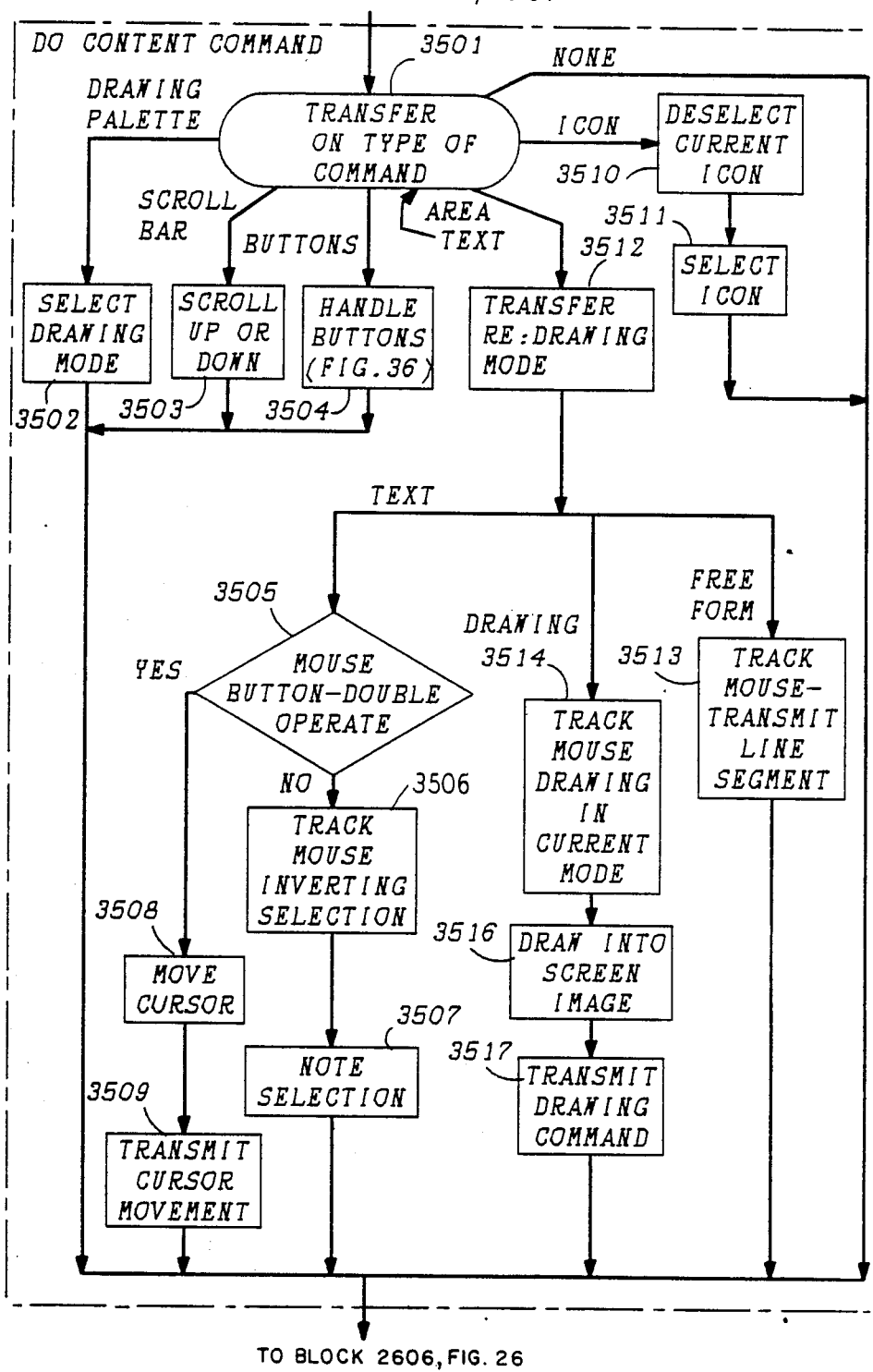

The program, on the other hand, proceeds to block 3411 when it determines that the user has operated the mouse control button and the mouse cursor is within the content area of the active window and is not pointing to background within that window. An expanded version of block 3411 is shown in FIG. 35.

At block 3501, the program determines which icon or object the mouse cursor is pointing to and then transfers to a particular software routine to process the event. If the program finds that the mouse cursor is pointing to background, then it proceeds to block 2606 of FIG. 26 via the "NONE" path.

Specifically, the program proceeds to block 3502 if finds that the mouse cursor is pointing to one of the drawing icons 21 shown in FIG. 3. The program at 3502 marks the selected drawing icon as being the current drawing mode, which the program thereafter uses in the event that the user begins to draw an image on the screen using the mouse cursor, as will be discussed below.

Alternatively, the program proceeds to block 3503 if it finds that the mouse cursor is pointing to the scroll bar icon 24 when the mouse control button is being operated. At block 3503, the program scrolls through the file displayed in the active window in the direction that the mouse cursor is moving (forwards or backwards, i.e, up or down) by displaying the appropriate next page of the file in the content area of the active window, as discussed above. The program then proceeds to block 2606 of FIG. 26.

Figure 36:
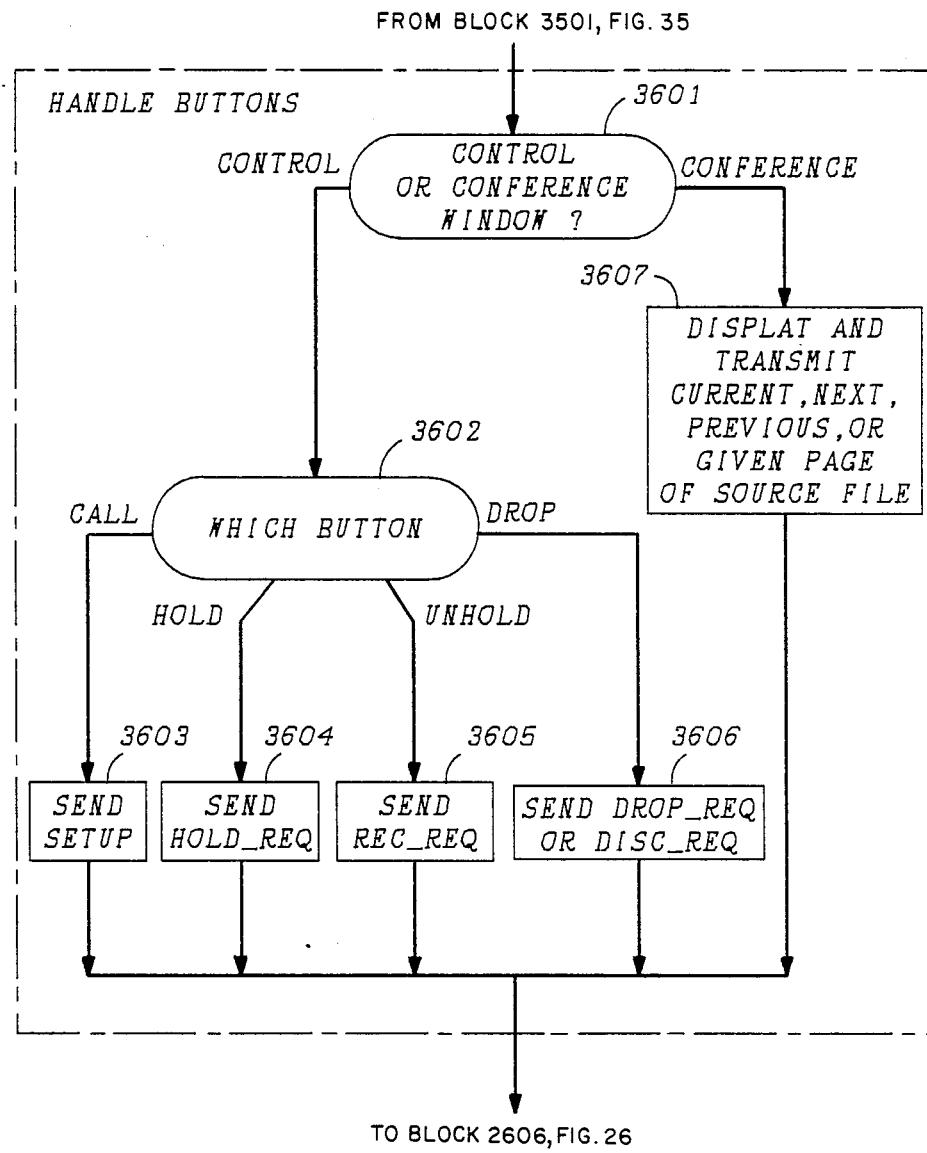

If the program at block 3501 finds, on the other hand, that the mouse cursor is pointing to one of the buttons 60-2 through 60-5 displayed in control window 60 or one of the file control keys 27 displayed along the bottom of work window 20 and conference window 50, then it proceeds to block 3504. An expanded version of block 3504 is shown in FIG. 36, turning then FIG. 36, program at block 3601 proceeds to block 3602 if the mouse cursor happens to be pointing to one of the control window buttons 60-2 through 60-5.

In particular, at block 3602, the program determines which one of the buttons 60-2 through 60-5 the mouse cursor is pointing to and then transfers to one of blocks 3603 through 3606, respectively. At each of the blocks 3603 through 3606, the program sends to processor 103 a third-party call control message requesting the action noted by the respective block relative to a prior action involving the mouse cursor. The prior action may be, for example, pointing the mouse cursor to one of the station set or PC icons and operating the mouse control button. For example, if the prior action involved station set icon 60-10 (FIG. 7) and the present action caused the program to arrive at block 3603, then the program sends to processor 103 a message requesting the latter to establish a telephone connection between station set S1 and S2, as discussed above.

If the program arrives at block 3604, then the message requests that station S2 be placed on hold. At block 3605 or 3606, on the other hand, the message requests that the hold state be removed or that the connection to station S2 be dropped (terminated), respectively. It is seen from FIG. 36, that the program proceeds to block 2604 of FIG. 26 when it completes the task described above in connection with each of the blocks 3603 through 3606.

Alternatively, the program proceeds to block 3607 if it finds that the mouse cursor is pointing to one of the file control keys 27, discussed above in connection with FIG. 3. The manner in which a program operates responsive to the mouse cursor pointing to one the file control keys is well-known and will not be discussed herein. However, it suffices to say that the program at block 3607 displays and transmits to the other conferenced PCs in the manner discussed above either the previous, current, next, or particlar page of a source file displayed in conference window 60 if the mouse cursor is pointing at either the "Prev", "Curr", "Next" or "Go To" key, respectively. Whereas, on the other hand, the source file displayed in the conference window is erased (cleared) if the mouse cursor if found to be pointing to the "Clear" key. The program proceeds to block 2604 of FIG. 26 when it completes the task defined in block 3607.

Returning to FIG. 35, the program at block 3501 proceeds to block 3512 if it finds that mouse cursor 22 is pointing to one of the drawing icons 21 (FIG. 3). At block 3512, the program selects one of three drawing modes, namely, text, drawing and free form, based on which one of the icons 21 that mouse cursor 22 is pointing to. In particular, the text (block 3505), blocking (block 3514) or free form (block 3513) mode is selected if mouse cursor 22 is pointing to one of the icons collectively designated 21a, icon 21b or icon 21c, respectively.

As such, the program at block 3505 determines if the mouse command is the second operation of the mouse control button, i.e., a so-called "double click" indicative of a command to move the screen cursor. If that is the case, then the program proceeds to block 3508 where it moves the screen cursor. The program then proceeds to block 3509 to transmit the new position of the screen cursor to the other conferees. If, on the other hand, the mouse command is indicative of a first operation of the mouse control button, i.e., a so-called "single click", then the program proceeds to block 3506.

At block 3506, the program inverts (changes black to white and vice versa) the area between the original position of the mouse cursor and its current position. The program continues tracking the mouse cursor and maintaining the inverted area as long as the mouse control button is held operated by the user. The program proceeds to block 3507 when the user releases the mouse control button. At block 3507, the program records the currently inverted area as the user's selection, and then proceeds to block 2606 of FIG. 26.

At blocks 3514 and 3516 (drawing mode), the program draws on the screen of the PC the shape of the icon that mouse cursor 22 is pointing to, the icon being one of the icons collectively designated 21a in FIG. 3. The program then proceeds to block 3517 where it transmits instructions to the other conferees to cause them to draw a corresponding shape on the their respective displays.

At block 3513 (free form mode), the program tracks the movement of mouse cursor 22 to determine its current position. Each time it does so, the program draws on the display a line segment from the previous position to the current position of the mouse cursor. The program continues in this manner as long as the user is operating the mouse control button. Similarly, each time the program draws a line segment it transmits that fact to the conferenced PCs.

At block 3510, the program de-selects the current drawing mode and proceeds to block 3511 to enter the latest mode selected by the user. The program then proceeds to block 2606 of FIG. 26.

Figure 37:
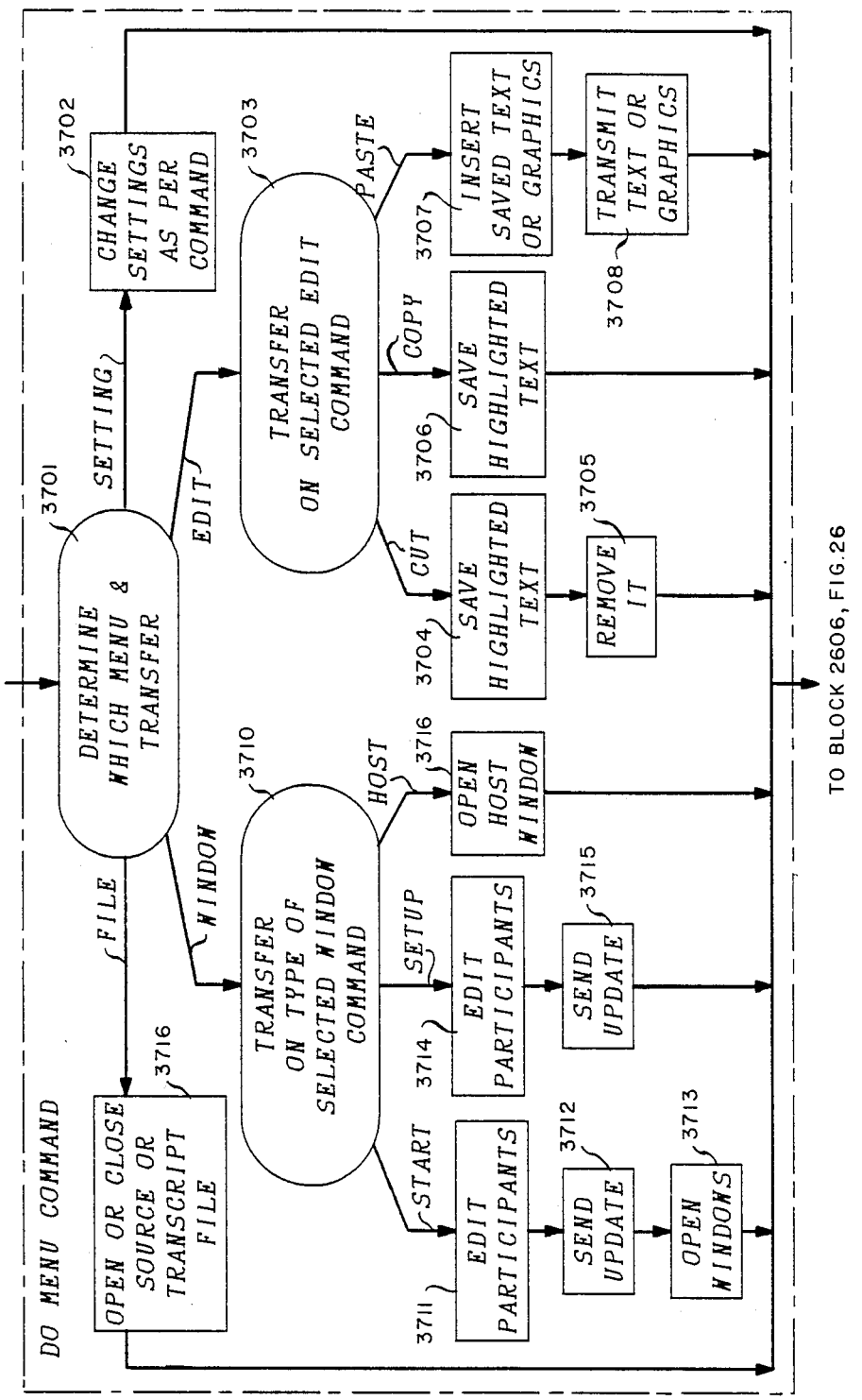

Continuing with FIG. 34, the program at block 3406 transfers to block 3412 if it finds that the mouse cursor is pointing to one of the pull-down menu keys 28-1 through 28-4 (FIG. 3) at the time the user is operating the mouse control button. An expanded version of block 3412 is shown in FIG. 37.

Specifically, the program at block 3701 displays the respective pull-dowm menu and proceeds to block 2606 of FIG. 26. On a subsequent entry into block 3701, the program will then process the particular menu command that the mouse cursor is pointing to at the time the user operates the mouse control button. For example, the program proceeds to block 3717 if pull-down menu 28 (shown in FIG. 11) had been brought up on the screen and the mouse cursor is pointing to one of the commands 28-11 through 28-15. At block 3717, the program either opens a transcript file or closes a previously opened transcript if the mouse cursor is pointing to either menu command 28-11 or 28-12, respectively. The program, on the other hand, either opens a source file, for example, a file in which the user enters text operating the PC keyboard, or closes a previously opened file if mouse cursor is pointing to either menu command 28-13 or 28-14, respecitively. The program removes menu 28 from the screen when the mouse cursor is found to be pointing to "Quit" command 28-15. It is noted that the way in which a program operates to manage to transcript file or opens a source file is well-known to the art and will not be discussed herein.

Alternatively, the program proceeds to block 3711, 3714 or 3716 via block 3710 if menu 35 (FIG. 4) is being displayed on the screen and the mouse cursor is pointing to a respective one of the commands 35-1 through 35-5 at the time the user operates the mouse control button. For example, if the mouse cursor happens to be pointing to menu command 35-1 or 35-2 then the program proceeds to block 3716 where it displays either coinference window 50 or host window 40, respectively. The program does this by moving a template of the respective window into the bit-map field and then redisplaying the content thereof. It is noted that the program operates to erase the active window from the screen if the mouse cursor happens to be pointing to menu command 35-3 (FIG. 3), as mentioned above. The program does this by removing the template of that screen from the bit-map field and refreshing the screen using the current contents of the field, thereby erasing the active window from the screen.

The program, on the other hand, proceeds to block 3711 or block 3714 if it finds that mouse cursor 22 is pointing to either menu command 35-4 (Start Conference) or command 35-5 (Set Participants), shown in FIG. 4, respectively. It is noted that the operation of the program is the same at either block 3511 or block 3514. In addition, the operation of the program is the same at either block 3712 or block 3715. Thus, a discussion of blocks 3711 and 3712 pertains equally well to blocks 3714 and 3715.

As such, the program at block 3711 (3714) displays conferees window 30 (FIG. 5). (It is noted that in the case of a subconference connection, the program displays conferees window 32 shown in FIG. 16.) The user may then enter the names of conferees and their respective telephone numbers for display in window 30, in the manner described above. The program continues to display window 30 (32) until the user selects the OK button 35-5 (32-5). The program then erases the conferees window and refreshes the screen, as described above. In addition, the program enters in an internal record the values (names and telephone numbers) that the user entered in the conferee window. The program then proceeds to block 3712 (3715) where it sends the values to the other conferees including itself. This action causes each conferenced PC to update its list of names that it maintains in association with control window 60. The program then proceeds to block 3713 where it opens conference window 50 and control window 60, as shown in FIG. 7 and in the manner described above. Thereafter, the program proceeds to block 2606 or FIG. 26.

Similarly, the program transfers to block 3703 if it finds that the mouse cursor is pointing to Edit key 28-3 (FIG. 3) at the time that the user is operation the mouse control button. At block 3703, the program displays a menu of editing functions, such as cut, copy and paste, as discussed above, and then waits for the user to select one of those functions. The manner in which a computer is programmed to perform editing functions is well-known and will not be discussed herein. However, it suffices to say that the program re-enters block 3703 and transfers to either block 3704, 3706 or 3707 based on which one of the editing function the user selects. For example, the program transfers to block 3704 if the user selects the "cut" editing function. At block 3704, the program responsive to the highlighting of text of a displayed file, saves the highlighted text in memory reserved for that purpose. The program then proceeds to block 3705 where it removes ("cut") the highlighted text from the displaed file.

The program, on the other hand, proceeds to either block 3706 or 3707 if the user selects the "copy" or "paste" editing function, respectively. At block 3706, the program saves in memory a copy of that portion of a displayed file (text) that is being highlighted. Whereas, at block 3707, the program inserts into the file displayed in the active window the text that was "cut" at blocks 3704 and 3705. The program then proceeds to block 3708. At block 3708, the program forms a message containing the inserted text including instructions for the insertion of the text in the active window and transmits the message to other conferenced PCs in the channel assigned to the active window.

The program proceeds to block 2606 of FIG. 26 when it completes the task specified at either of the blocks 3705, 3706 or 3708.

Returning to block 3701, the program thereat proceeds to block 3702 if it finds that the mouse cursor is pointing to Settings key 28-4 (FIG. 3) at the time that the user is operating the mouse control button. At block 3702, the program displays a menu (not shown) of respective transmission parameters, such as parrity, baud rate, etc., which the user may preset by pointing to and then entering the value of the particlar parameter, as briefly mentioned above. The program stores each such entry in memory reserved for that purpose. The program then proceeds to block 2606 of FIG. 26 when the user completes the entry of the parameters, as signified by the closing of the Settings menu. Thereafter, the PC operating system uses the stored parameters in connection with the exchange of messages between itself and a PC which is connected to system 10 via the public switched netword, such as PC4 shown FIG. 1.

Having completed a discussion of block 2605 of FIG. 26, we now focus on the remainder of the flow chart depicted therein. Specifically, the program at block 2606 checks the input it has received to determine if it corresponds to a so-called "quit" command and proceeds to block 2607 if it finds that to be the case. Otherwise, the program proceeds to block 2602 to begin another pass through the program. At block 2607, the program closes the various windows that had been brought up on the screen as a result of establishing the audiographics connection, as discussed above. The program then returns control to the operating system, which awaits entry of next event or command.

The foregoing is merely illustrative of the principles of the invention. Those skilled in the art will be able to devise numerous arrangements which although not explicitly shown or described herein, embody those principles and are within its scope and spirit. For example, in the foregoing discussion of the illustrative embodiment of the invention the audio portion of the audiographics conference connection was established prior to the graphics portion of the connection. Alternatively, the graphics portion could have been established prior to the audio portion. As another example, the foregoing discussion centered around establishing an audiographics conference connection among three data terminals and their associated station sets. It is to be understood that such a connection could involve more than three data terminals and associated station sets. The same holds true for the second conference connection discussed above.

As a further example, and although not discussed above, it is obvious that a conferee having just a telephone station set could be included in the audio portion of an audiographics conference connection. Moreover, a conferee having a telephone station set and associated data terminal could be excluded from the graphics portion of the audiographics conference connection, and vice-versa.

We claim:

1. An arrangement for establishing an audiographics conference connection among a plurality of telephone station sets and associated data terminals served by a communication system having a common bus, said telephone station sets and associated data terminals having access to said common bus via respective port circuits, said arrangement comprising;

a data bridge having a plurality of port circuits, each of said port circuits having access to said common bus;

means for establishing with respect to said common bus a plurality of time slots, each time slot defining a period of time in which a signal may be placed onto said bus by any one of said port circuits and obtained from said bus by one or more other port circuits;

means responsive to a request inputted by a user at one of said data terminals for establishing a communication path between said one data terminal and said data bridge by assigning respective time slots to said one data terminal and one of said data bridge port circuits;

means responsive to receipt of a first series of individual requests respectively identifying the telephone station set associated with said one data terminal and other ones of said telephone station sets for establishing a conference connection among said identified station sets by assigning respective time slots to said station sets as they are identified, means responsive to receipt of a second series of individual requests for establishing a communication path between each of the data terminals associated with said other station sets and respective ones of a group of data bridge ports by assigning respective time slots to those data terminals and said ones of said data bridge ports, said first and second series of individual requests being inputted by said user, and means operative for allocating to each of said data terminals as they are connected to said data bridge a group of logical channels for use in exchanging respective categories of messages, said messages being indicative of respective categories of information displayed on said data terminals.

2. The arrangement set forth in claim 1 wherein each of said data terminals is operative for multiplexing its allocated logical channels over its respective communication path to said data bridge.

3. The arrangement set forth in claim 1 wherein at least one of said conferenced telephone station sets and its associated one of said data terminals are not directly served by said communication system but are connected thereto via the public switched network.

4. The arrangement set forth in claim 1 wherein each of said logical channels is identified by a respective address and wherein said data bridge include means responsive to receipt of a message from any one of said data terminals for identifying the category of said message from the address of the logical channel in which said message was received and for distributing said message to the remaining ones of said connected data terminals via their respective communication paths and in their assigned logical channels as identified by the category of said message.

5. The arrangement set forth in claim 1 wherein said group of logical channels includes a conference channel for the transmission of messages indicative of text and/or graphics and a status channel for the transmission of information pertaining to the status of said audiographics conference connection.

6. The arrangement set forth in claim 5 wherein each of said data terminals has a display and wherein said arrangement further comprises means contained in each of said connected data terminals for displaying conference and status windows responsive to being allocated said conference and status channels, respectively, said conference window being used to display text and/or graphics and said status window being used to display icons indicative of the status of each of said station sets and data terminals involved in said audiographics conference connection.

7. The arrangement set forth in claim 6 wherein said means for displaying includes means responsive to changes either in the content of text and/or graphics displayed in said conference window or changes in the icons displayed in said status window for transmitting to said data bridge such changes in said conference and status channels, respectively.

8. The arrangement set forth in claim 5 wherein said one data terminal is also allocated control and communication channels, said control channel being used for exchanging third-party call control messages with said communication system via said data bridge and said communication channel being used for exchanging messages with said data bridge.

9. The arrangement set forth in claim 8 wherein said arrangement includes a third-party call control link connected between said data bridge and said communication system, and wherein said one data terminal includes means for forming each of said first and second series of requests into respective third-party call control messages, each of said third-party call control messages being transmitted to said communication system via said thrid-party cal control link.

10. The arrangement set forth in claim 9 further comprising means for establishing concurrent with said audiographics conference connection another conference connection among said one data terminal and at least another one of said data terminals not connected to said data bridge by establishing a communication path between said one data terminal and said data bridge responsive to a third series of requests inputted by said user, said other data terminal being allocated conference and status channels and said one data terminal being allocated a second conference channel and second status channel as a result establishing said other conference connection.

11. The arrangement set forth in claim 10 further comprising means contained in said one data terminal for notifying said data bridge via the communication channel allocated to said ne data terminal as to which conference connection said other one of said data terminals is to be associated with.

12. The arrangement set forth in claim 9 further comprising means contained in said one data terminal for distributing to the other data terminals of said audiographics conference connection messages obtained from said other one of said data terminals.

13. The arrangement set forth in claim 1 wherein said logical channels are identified by respective addresses and wherein said arrangement further comprises means contained in said data bridge for establishing a routing table containing the logical channels allocated to each of said connected data terminals, said data bridge using said routing table to distributs a message received from one of said conferenced data terminals to the other ones of said conferenced data terminals.

14. An audiographics conferencing arrangement for use in a business communication system serving a plurality of data terminals, said arrangemetn comprising;
   a data bridge,
   means responsive to receipt of a series of requests inputted by a user positioned at one of said data terminals for established a conference connection among said one data terminal and other ones of said data terminals by connecting each of said conferenced data terminals to said data bridge via respective communication paths responsive to respective ones of said requests, and
   means operative for assigning to each of said data terminals as they are connected to said data bridge a group of logical channels identifying respective catagories of messages, said data terminals multiplexing their assigned logical channels over their respective communications paths when exchanging message with each other.

15. The arrangement set forth in claim 14 wherein each of said logical channels is identified by a respective address and wherein said data bridge includes means responsive to receipt ofa message from any one of said conferenced data terminals for identifying the category of said message from the address of the logical channel in which said message was received and for distributing said message to the other ones of said conferenced data terminals via their respective communication paths and in their assigned logical channels as identified by the category of said message.

16. The arrangement set forth in claim 14 wherein said communication system also serves a plurality of telephone station sets associated with respective ones of said plurality of data sets and wherein said arrangement further comprises means for establishing a conference connection among the telephone stations sets associated with said conferenced data terminals responsive to respective ones of another series of requests inputted by said user.

17. The arrangement set forth in claim 14 wherein said group of logical channels includes a conference channel for the transmission of text and/or graphics and a status channel for the transmission of information pertaining to the status of said conference connection.

18. The arrangement set forth in claim 17 wherein each of said conferenced data terminals has a display and wherein said arrangement further comprises means contained in each of said conferenced data terminals for displaying conference and status windows responsive to being assigned said conference and status channels, respectively, said conference window being used to display text and/or graphics and said status window being used to display icons indicative of the status of said conference connection.

19. The arrangement set forth in claim 18 wherein said means for displaying includes means responsive to changes in the content of text and/or graphics displayed in said conference window and/or changes in the icons displayed in said status window for transmitting to said data bridge such changes in said conference and status channels, respectively.

20. The arrangement set forth in claim 17 wherein said one data terminal is also assigned control and communication channels, said control channel being used for exchanging third-party call control messages with said communication system via said data bridge and said communication channel being used for exchanging messages with said data bridge.

21. The arrangement set forth in claim 20 wherein said arrangement includes a third-party call control link connected between said data bridge and said communication system, and wherein said one data terminal includes means for forming each of said series of requests into respective third-party call control messages, each of said third-party call control messages being transmitted to said communication system via said control channel and said third-party call control link.

22. The arrangement set forth in claim 14 further comprising means for establishing concurrent with sid conference connection another conference connection among said one data terminal and at least one other one of said plurality of data terminals by connecting said other one of said data terminals to said data bridge via a respective communication path responsive to respective ones of another series of requests inputted by said user and for assigning to said other one of said data terminals said group of logical channels for use in exchanging messages with said one data terminal.

23. The arrangement set forth in claim 22 further comprising means contained in said one data terminal for notifying said data bridge as to which conference connection said one other one of said data terminals is to be assiciated with.

24. The arrangement set forth in claim 22 further comprising means contained in said one data terminal for distributing to said other data terminals messages obtained from said other conference connection.

25. The arrangement set forth in claim 14 wherein said logical channels are identified by respective addresses and wherein said arrangement further comprises means contained in said data bridge for establishing a routing table containing the logical channels assigned to each of said conferenced data terminals, said data bridge using said routing table to distribute a message received from one of said conferenced data terminals to the other ones of said conferenced data terminals.

26. An arrangements for processing different categories of messages received via associated logical channels multiplexed over respective communications paths, individual ones of said communications paths being associated with respective ones of a group of data terminals, said arrangement comprising;
   means responsive to receipt of a message from one of said data terminals via its respective one of said communication paths for identifying the category of a message based on the logical channel in which said message was received, and
   means thereafter operative for distributing to other ones of said group of data terminals said received message, said message being sent to said other data terminals via their respective communication paths and in their logical channels identifying category of said message.

27. The arrangement set forth in claim 26 wherein said arrangement includes a data bridge and wherein one end of each of said communication paths terminate at said data bridge to form a conference connection among said group of data terminals and wherein said means for identifying and said means for distributing are contained in said data bridge.

28. The arrangement set forth in claim 26 wherein said arrangement includes a business communication system operative for establishing said communication paths responsive to receipt of respective ones of a series of requests inputted by a user positioned at one of said data terminals.

29. The arrangement set forth in claim 28 wherein said communication system serves a plurality of telephone station sets associated with respective ones of said data terminals and wherein said arrangement further comprises means responsive to respective ones of another series of requests inputted by said user for establishing a conference connection among the telephone stations sets associated with respective ones of said group of data terminals.

30. The arrangement set forth in claim 7 wherein each of said conferenced data terminals is assigned a group of said logical channels and wherein said group of logical channels includes a conference channel for the transmission of text and/or graphics and a status channel for the transmission of information pertaining to the status of said conference connection.

31. The arrangement set forth in claim 30 wherein each of said data terminals has a display and wherein said arrangement further comprises means contained in each of said data terminals for displaying conference and status windows responsive to being assigned said conference and status channels, respectively, said conference window being used to display text and/or graphics and said status window being used to display icons indicative of the status of said conference connection.

32. The arrangement set forth in claim 31 wherein said means for displaying includes means responsive to changes in the content of text and/or graphics displayed in said conference window and/or changes in the icons displayed in said status window for transmitting to said data bridge such changes in said assigned conference and status channels, respectively.

33. The arrangement set forth in claim 32 wherein said one data terminal is also assigned control and communication channels, said control channel being used for exchanging third-party call control messages with said communication system via said data bridge and said communication channel being used for exchanging messages with said data bridge.

34. The arrangement set forth in claim 33 wherein said arrangement includes a third-party call control link connected between said data bridge and said communication system, and wherein said one data terminal includes means for forming each of said series of requests into respective third-party call control messages, each of said third-party call control messages being transmitted to said communication system via said third-party call control link.

35. The arrangement set forth in claim 28 further comprising means responsive to another series of requests inputted by said user for concurrently establishing a conference connection among said one data teriminal and at least one other data terminal by connecting said other data terminal to said data bridge via a respective communication path responsive to a respective one of said other series of requests and for assigning to said other data terminal a group of logical channels for use in exchanging messages with said one data terminal.

36. The arrangement set forth in claim 35 further comprising means contained in said ne data terminal for notifying said data bridge as to which conference connection said other said data terminal is to be associated with.

37. The arrangement set forth in claim 36 further comprising means contained in said one data terminal for distributing to the other ones of said groups of data terminals messages obtained from said other conference connection.

38. The arrangement set forth in claim 27 further comprising means contained in said data bridge for establishing a routing table identifying the logical channels assigned to each of said conferenced data terminals, said data bridge using said routing table to identify the logical channels assigned to said terminals.

39. The arrangement set forth in claim 26 wherein each of said data terminals is a personal computer.

* * * * *